United States Patent
Campos et al.

(10) Patent No.: US 11,599,873 B2
(45) Date of Patent: Mar. 7, 2023

(54) SYSTEMS AND METHODS FOR PROXY CARD AND/OR WALLET REDEMPTION CARD TRANSACTIONS

(71) Applicant: Blackhawk Network, Inc., Pleasanton, CA (US)

(72) Inventors: Tomas Ariel Campos, Berkeley, CA (US); Tushar Vaish, Milpitas, CA (US); Pranav Sheth, Dublin, CA (US)

(73) Assignee: Blackhawk Network, Inc., Pleasanton, CA (US)

(*) Notice: Subject to any disclaimer, the term of this patent is extended or adjusted under 35 U.S.C. 154(b) by 1084 days.

(21) Appl. No.: 14/205,065

(22) Filed: Mar. 11, 2014

(65) Prior Publication Data

US 2014/0195425 A1      Jul. 10, 2014

Related U.S. Application Data

(63) Continuation-in-part of application No. 14/147,330, filed on Jan. 3, 2014, now Pat. No. 11,475,436, and a
(Continued)

(51) Int. Cl.
*G06Q 20/36* (2012.01)
*G06Q 20/20* (2012.01)
(Continued)

(52) U.S. Cl.
CPC ....... *G06Q 20/36* (2013.01); *G06K 19/06206* (2013.01); *G06Q 20/20* (2013.01);
(Continued)

(58) Field of Classification Search
CPC ...... G06Q 20/36; G06Q 20/20; G06Q 20/351; G06Q 20/3674; G06Q 20/40; G06Q 20/4018; G06K 19/06206
(Continued)

(56) References Cited

U.S. PATENT DOCUMENTS 4,359,631 A    11/1982    Lockwood et al.
4,567,359 A    1/1986    Lockwood
(Continued)

FOREIGN PATENT DOCUMENTS

CA    2837208 A1    12/2012
DE    4017264 A1    12/1991
(Continued)

OTHER PUBLICATIONS

Security of Proximity Mobile Payments, downloaded from https://www.securetechalliance.org/resources/pdf/Security_of_Proximity_Mobile_Payments.pdf, attached as PDF file (Year: 2009).*
(Continued)

*Primary Examiner* — James D Nigh
(74) *Attorney, Agent, or Firm* — Barnes & Thornburg LLP; Jerry C. Harris, Jr.

(57) ABSTRACT

Systems and methods for associating a proxy card with an electronic wallet are disclosed. A computer implemented method may include receiving an authentication information of a proxy card, and associating the proxy card with an electronic wallet, wherein associating the proxy card with the electronic wallet allows secure access to the electronic wallet when the proxy card is presented at a point of sale. A system may include a proxy card comprising authentication information, and an electronic wallet associated with the proxy card, wherein the association of the electronic wallet with the proxy card allows secure access to the electronic wallet when the proxy card is presented at a point of sale. A wallet redemption card may comprise a rewriteable magnetic stripe, a smart chip, a wireless communicator operably connected to the smart chip, and an interface operably connected between the rewriteable magnetic stripe and the smart chip.

20 Claims, 18 Drawing Sheets

Related U.S. Application Data continuation-in-part of application No. 13/483,711, filed on May 30, 2012, and a continuation-in-part of application No. PCT/US2011/049338, filed on Aug. 26, 2011, and a continuation-in-part of application No. PCT/US2011/040055, filed on Jun. 10, 2011, and a continuation of application No. PCT/US2011/020570, filed on Jan. 7, 2011.

(60) Provisional application No. 61/799,500, filed on Mar. 15, 2013, provisional application No. 61/779,334, filed on Mar. 13, 2013, provisional application No. 61/776,594, filed on Mar. 11, 2013, provisional application No. 61/748,679, filed on Jan. 3, 2013, provisional application No. 61/496,397, filed on Jun. 13, 2011, provisional application No. 61/496,404, filed on Jun. 13, 2011, provisional application No. 61/491,791, filed on May 31, 2011, provisional application No. 61/491,813, filed on May 31, 2011, provisional application No. 61/377,800, filed on Aug. 27, 2010, provisional application No. 61/360,327, filed on Jun. 30, 2010, provisional application No. 61/354,470, filed on Jun. 14, 2010, provisional application No. 61/354,469, filed on Jun. 14, 2010, provisional application No. 61/293,413, filed on Jan. 8, 2010.

(51) Int. Cl.
*G06Q 20/34* (2012.01)
*G06Q 20/40* (2012.01)
*G06K 19/06* (2006.01)

(52) U.S. Cl.
CPC ....... *G06Q 20/351* (2013.01); *G06Q 20/3674* (2013.01); *G06Q 20/40* (2013.01); *G06Q 20/4018* (2013.01)

(58) Field of Classification Search
USPC ..................................................... 705/50–79
See application file for complete search history.

(56) References Cited

U.S. PATENT DOCUMENTS

| | | |
|---|---|---|
| RE32,115 E | 4/1986 | Lockwood et al. |
| 4,694,397 A | 9/1987 | Grant et al. |
| 4,951,196 A | 8/1990 | Jackson |
| 5,220,501 A | 6/1993 | Lawlor et al. |
| 5,291,017 A | 3/1994 | Wang et al. |
| 5,309,355 A | 5/1994 | Lockwood |
| 5,334,823 A | 8/1994 | Noblett, Jr. |
| 5,350,906 A | 9/1994 | Brody et al. |
| 5,468,958 A | 11/1995 | Franzen et al. |
| 5,477,038 A | 12/1995 | Levine et al. |
| 5,500,514 A | 3/1996 | Veeneman et al. |
| 5,534,683 A | 7/1996 | Rankl et al. |
| 5,557,516 A | 9/1996 | Hogan |
| 5,569,917 A | 10/1996 | Buttrill, Jr. et al. |
| 5,576,951 A | 11/1996 | Lockwood |
| 5,577,100 A | 11/1996 | McGregor et al. |
| 5,577,109 A | 11/1996 | Stimson et al. |
| 5,578,808 A | 11/1996 | Taylor |
| 5,621,787 A | 4/1997 | McKoy et al. |
| 5,645,434 A | 7/1997 | Leung |
| 5,650,604 A | 7/1997 | Marcous et al. |
| 5,689,100 A | 11/1997 | Carrithers et al. |
| 5,693,941 A | 12/1997 | Barlow et al. |
| 5,696,908 A | 12/1997 | Muehlberger et al. |
| 5,701,301 A | 12/1997 | Weisser, Jr. |
| 5,714,755 A | 2/1998 | Wells et al. |
| 5,722,067 A | 2/1998 | Fougnies et al. |
| 5,744,787 A | 4/1998 | Teicher |
| 5,748,737 A | 5/1998 | Daggar |
| 5,763,878 A | 6/1998 | Franzen |
| 5,778,313 A | 7/1998 | Fougnies |
| 5,796,832 A | 8/1998 | Kawan |
| 5,812,773 A | 9/1998 | Norin |
| 5,815,657 A | 9/1998 | Williams et al. |
| 5,826,185 A | 10/1998 | Wise et al. |
| 5,828,740 A | 10/1998 | Khuc et al. |
| 5,845,259 A | 12/1998 | West et al. |
| 5,854,975 A | 12/1998 | Fougnies et al. |
| 5,868,236 A | 2/1999 | Rademacher |
| 5,884,292 A | 3/1999 | Baker et al. |
| 5,892,827 A | 4/1999 | Beach et al. |
| 5,897,625 A | 4/1999 | Gustin et al. |
| 5,903,633 A | 5/1999 | Lorsch |
| 5,915,007 A | 6/1999 | Klapka |
| 5,920,847 A | 7/1999 | Kolling et al. |
| 5,937,396 A | 8/1999 | Konya |
| 5,943,424 A | 8/1999 | Berger et al. |
| 5,945,653 A | 8/1999 | Walker et al. |
| 5,953,398 A | 9/1999 | Hill |
| 5,969,318 A | 10/1999 | Mackenthun |
| 5,984,180 A | 11/1999 | Albrecht |
| 5,987,438 A | 11/1999 | Nakano et al. |
| 5,991,380 A | 11/1999 | Bruno et al. |
| 5,991,381 A | 11/1999 | Bouanaka et al. |
| 5,991,413 A | 11/1999 | Arditti et al. |
| 5,991,749 A | 11/1999 | Morrill, Jr. |
| 5,991,809 A | 11/1999 | Kriegsman |
| 6,000,608 A | 12/1999 | Dorf |
| 6,012,048 A | 1/2000 | Gustin et al. |
| 6,035,025 A | 3/2000 | Hanson |
| 6,044,360 A | 3/2000 | Picciallo |
| 6,049,774 A | 4/2000 | Roy |
| 6,058,300 A | 5/2000 | Hanson |
| 6,064,990 A | 5/2000 | Goldsmith |
| 6,081,791 A | 6/2000 | Clark |
| 6,081,840 A | 6/2000 | Zhao |
| 6,157,823 A | 12/2000 | Fougnies et al. |
| 6,169,975 B1 | 1/2001 | White et al. |
| 6,182,138 B1 | 1/2001 | Aoki |
| 6,185,545 B1 | 2/2001 | Resnick et al. |
| 6,188,752 B1 | 2/2001 | Lesley |
| 6,191,699 B1 | 2/2001 | Sawada |
| 6,209,032 B1 | 3/2001 | Dutcher et al. |
| 6,264,104 B1 | 7/2001 | Jenkins et al. |
| 6,269,343 B1 | 7/2001 | Pallakoff |
| 6,289,319 B1 | 9/2001 | Lockwood |
| 6,289,320 B1 | 9/2001 | Drummond et al. |
| 6,294,780 B1 | 9/2001 | Wells et al. |
| 6,299,062 B1 | 10/2001 | Hwang |
| 6,315,195 B1 | 11/2001 | Ramachandran |
| 6,317,754 B1 | 11/2001 | Peng |
| 6,320,947 B1 | 11/2001 | Joyce et al. |
| 6,323,980 B1 | 11/2001 | Bloom |
| 6,327,363 B1 | 12/2001 | Henderson et al. |
| 6,330,978 B1 | 12/2001 | Molano et al. |
| 6,386,457 B1 | 5/2002 | Sorie |
| 6,398,115 B2 * | 6/2002 | Krause .................. G06K 7/084 235/492 |
| 6,453,162 B1 | 9/2002 | Gentry |
| 6,467,684 B2 | 10/2002 | Fite et al. |
| 6,502,191 B1 | 12/2002 | Smith et al. |
| 6,510,983 B2 | 1/2003 | Horowitz et al. |
| 6,526,130 B1 | 2/2003 | Paschini |
| 6,526,275 B1 | 2/2003 | Calvert |
| 6,574,617 B1 | 6/2003 | Immerman et al. |
| 6,581,827 B2 | 6/2003 | Welton |
| 6,596,990 B2 | 7/2003 | Kasten et al. |
| 6,615,189 B1 | 9/2003 | Phillips et al. |
| 6,628,766 B1 | 9/2003 | Hollis et al. |
| 6,651,885 B1 | 11/2003 | Arias |
| 6,742,023 B1 | 5/2004 | Fanning et al. |
| 6,759,899 B2 | 7/2004 | Lennartson et al. |
| 6,827,260 B2 | 12/2004 | Stoutenburg et al. |
| 6,829,596 B1 | 12/2004 | Frazee |
| 6,842,749 B2 | 1/2005 | Zara et al. |
| 6,910,053 B1 | 6/2005 | Pauly et al. |
| 6,934,529 B2 | 8/2005 | Bagoren et al. |

(56) References Cited

U.S. PATENT DOCUMENTS

| | | | |
|---|---|---|---|
| 6,941,285 B2 | 9/2005 | Sarcanin | |
| 6,965,667 B2 | 11/2005 | Trabandt et al. | |
| 6,973,172 B1 | 12/2005 | Bitove et al. | |
| 6,999,943 B1 | 2/2006 | Johnson et al. | |
| 7,003,499 B2 | 2/2006 | Arditti et al. | |
| 7,006,993 B1 | 2/2006 | Cheong et al. | |
| 7,014,108 B2 | 3/2006 | Sorenson et al. | |
| 7,031,693 B2 | 4/2006 | Öhrström et al. | |
| 7,069,251 B1* | 6/2006 | Bartz | G06Q 20/20 235/462.46 |
| 7,083,084 B2 | 8/2006 | Graves et al. | |
| 7,089,209 B1 | 8/2006 | Kolls | |
| 7,092,916 B2 | 8/2006 | Diveley et al. | |
| 7,093,761 B2 | 8/2006 | Smith et al. | |
| 7,103,575 B1 | 9/2006 | Linehan | |
| 7,106,843 B1 | 9/2006 | Gainsboro et al. | |
| 7,118,030 B2 | 10/2006 | Phillips et al. | |
| 7,127,426 B1 | 10/2006 | Coyle | |
| 7,131,578 B2 | 11/2006 | Paschini et al. | |
| 7,131,582 B2 | 11/2006 | Welton | |
| 7,181,416 B2 | 2/2007 | Arias | |
| 7,191,939 B2 | 3/2007 | Beck et al. | |
| 7,197,662 B2 | 3/2007 | Bullen et al. | |
| 7,206,769 B2 | 4/2007 | Laurent et al. | |
| 7,209,890 B1 | 4/2007 | Peon et al. | |
| 7,210,620 B2 | 5/2007 | Jones | |
| 7,210,624 B1 | 5/2007 | Birjandi et al. | |
| 7,212,976 B2 | 5/2007 | Scheer | |
| 7,216,091 B1 | 5/2007 | Blandina et al. | |
| 7,248,855 B2 | 7/2007 | Joyce et al. | |
| 7,255,268 B2 | 8/2007 | Dentlinger | |
| 7,260,557 B2 | 8/2007 | Chavez | |
| 7,268,901 B2 | 9/2007 | Brewster et al. | |
| 7,280,644 B2 | 10/2007 | Tamari et al. | |
| 7,280,645 B1 | 10/2007 | Allen et al. | |
| 7,308,087 B2 | 12/2007 | Joyce et al. | |
| 7,325,722 B2 | 2/2008 | Hosnedl et al. | |
| 7,333,955 B2 | 2/2008 | Graves et al. | |
| 7,363,265 B2 | 4/2008 | Horgan | |
| 7,401,049 B2 | 7/2008 | Hobbs et al. | |
| 7,404,011 B2 | 7/2008 | Hansmann et al. | |
| 7,413,117 B2 | 8/2008 | Caven et al. | |
| 7,433,212 B2 | 10/2008 | Igarashi et al. | |
| 7,440,922 B1 | 10/2008 | Kempkes et al. | |
| 7,454,200 B2 | 11/2008 | Cai et al. | |
| 7,477,731 B2 | 1/2009 | Tamari et al. | |
| 7,483,858 B2 | 1/2009 | Foran et al. | |
| 7,522,716 B2 | 4/2009 | Paschini | |
| 7,529,563 B1 | 5/2009 | Pitroda | |
| 7,562,051 B1 | 7/2009 | Donner | |
| 7,574,376 B1 | 8/2009 | Berman et al. | |
| 7,577,613 B2 | 8/2009 | Tramontano et al. | |
| 7,578,439 B2 | 8/2009 | Graves et al. | |
| 7,580,859 B2 | 8/2009 | Economy et al. | |
| 7,580,892 B2 | 8/2009 | Blosser et al. | |
| 7,581,674 B2 | 9/2009 | Cohen et al. | |
| 7,594,855 B2 | 9/2009 | Meyerhofer | |
| 7,603,316 B1 | 10/2009 | Fife et al. | |
| 7,607,574 B2 | 10/2009 | Kingsborough et al. | |
| 7,613,284 B2 | 11/2009 | New | |
| 7,614,549 B2 | 11/2009 | Hogg et al. | |
| 7,617,152 B2 | 11/2009 | Chai et al. | |
| 7,630,926 B2 | 12/2009 | Chakiris et al. | |
| 7,641,113 B1* | 1/2010 | Alvarez | G06Q 20/28 705/79 |
| 7,647,627 B2 | 1/2010 | Maida-Smith et al. | |
| 7,669,758 B2 | 3/2010 | Erikson | |
| 7,676,030 B2 | 3/2010 | New et al. | |
| 7,698,231 B2 | 4/2010 | Clinesmith et al. | |
| 7,707,113 B1 | 4/2010 | DiMartino et al. | |
| 7,739,162 B1 | 6/2010 | Pettay et al. | |
| 7,740,170 B2 | 6/2010 | Singh et al. | |
| 7,797,233 B2 | 9/2010 | Sobek | |
| 7,813,822 B1 | 10/2010 | Hoffberg | |
| 7,822,640 B2 | 10/2010 | Arthur et al. | |
| 7,865,432 B2 | 1/2011 | Doran et al. | |
| 7,890,422 B1 | 2/2011 | Hirka et al. | |
| 7,891,563 B2 | 2/2011 | Oder, II et al. | |
| 7,909,242 B2 | 3/2011 | Paschini et al. | |
| 7,922,082 B2 | 4/2011 | Muscato | |
| 7,925,531 B1 | 4/2011 | Cunningham et al. | |
| 7,945,238 B2 | 5/2011 | Baker et al. | |
| 7,945,512 B2 | 5/2011 | Scipioni et al. | |
| 7,966,496 B2 | 6/2011 | Ellmore | |
| 7,991,694 B2 | 8/2011 | Takayama | |
| 8,020,754 B2 | 9/2011 | Schwarz, Jr. | |
| 8,041,338 B2 | 10/2011 | Chen et al. | |
| 8,041,642 B2 | 10/2011 | Lenard et al. | |
| 8,060,413 B2 | 11/2011 | Castell et al. | |
| 8,086,530 B2 | 12/2011 | Resnick et al. | |
| 8,090,792 B2 | 1/2012 | Dubnicki et al. | |
| 8,095,113 B2 | 1/2012 | Kean et al. | |
| 8,109,436 B1 | 2/2012 | Hopkins, III | |
| 8,135,640 B2 | 3/2012 | Bayne | |
| 8,195,565 B2 | 6/2012 | Bishop et al. | |
| 8,245,910 B2 | 8/2012 | Sullivan et al. | |
| 8,271,343 B2 | 9/2012 | Schorr et al. | |
| 8,297,498 B2 | 10/2012 | Vriheas et al. | |
| 8,306,912 B2 | 11/2012 | Galit | |
| 8,321,270 B2 | 11/2012 | Antonucci | |
| 8,341,045 B2 | 12/2012 | Kravitz et al. | |
| 8,355,982 B2 | 1/2013 | Hazel et al. | |
| 8,359,239 B1 | 1/2013 | Cook et al. | |
| 8,371,502 B1 | 2/2013 | Galit et al. | |
| 8,452,880 B2 | 5/2013 | Jain | |
| 8,458,016 B1 | 6/2013 | Medina, III et al. | |
| 8,472,594 B2 | 6/2013 | New et al. | |
| 8,479,980 B2 | 7/2013 | Paschini et al. | |
| 8,523,054 B2 | 9/2013 | Yankovich et al. | |
| 8,594,286 B2 | 11/2013 | New et al. | |
| 8,595,074 B2 | 11/2013 | Sharma et al. | |
| 8,626,617 B1 | 1/2014 | Bhatt | |
| 8,682,715 B1 | 3/2014 | Cedeno | |
| 8,762,236 B1 | 6/2014 | Shirey et al. | |
| 8,768,817 B2 | 7/2014 | Takeo et al. | |
| 9,031,880 B2 | 5/2015 | Bishop et al. | |
| 9,542,553 B1 | 1/2017 | Burger et al. | |
| 9,558,484 B2 | 1/2017 | Paschini et al. | |
| 9,852,414 B2 | 12/2017 | Llach | |
| 2001/0021927 A1 | 9/2001 | Laurent et al. | |
| 2001/0027441 A1* | 10/2001 | Wankmueller | G06Q 20/367 705/41 |
| 2001/0027446 A1 | 10/2001 | Metcalfe | |
| 2001/0037291 A1 | 11/2001 | Allen, II | |
| 2001/0039535 A1 | 11/2001 | Tsiounis et al. | |
| 2001/0042784 A1 | 11/2001 | Fite et al. | |
| 2002/0010659 A1 | 1/2002 | Cruse et al. | |
| 2002/0046122 A1 | 4/2002 | Barber et al. | |
| 2002/0059114 A1 | 5/2002 | Cockrill et al. | |
| 2002/0077973 A1 | 6/2002 | Ronchi et al. | |
| 2002/0099667 A1 | 7/2002 | Diamandis et al. | |
| 2002/0116280 A1 | 8/2002 | Boies et al. | |
| 2002/0128938 A1 | 9/2002 | Schofield et al. | |
| 2002/0152124 A1 | 10/2002 | Guzman et al. | |
| 2002/0152175 A1 | 10/2002 | Armstrong et al. | |
| 2002/0156696 A1 | 10/2002 | Teicher | |
| 2002/0161650 A1 | 10/2002 | Buchanan et al. | |
| 2002/0165820 A1 | 11/2002 | Anvekar et al. | |
| 2002/0169648 A1 | 11/2002 | Zara et al. | |
| 2002/0174034 A1 | 11/2002 | Au et al. | |
| 2002/0181600 A1 | 12/2002 | Matsuura et al. | |
| 2003/0028481 A1 | 2/2003 | Flitcroft | |
| 2003/0046231 A1 | 3/2003 | Wu | |
| 2003/0046249 A1 | 3/2003 | Wu | |
| 2003/0050041 A1 | 3/2003 | Wu | |
| 2003/0083946 A1 | 5/2003 | Nishiyama | |
| 2003/0110104 A1 | 6/2003 | King et al. | |
| 2003/0126075 A1 | 7/2003 | Mascavage, III et al. | |
| 2003/0144910 A1 | 7/2003 | Flaherty et al. | |
| 2003/0177028 A1 | 9/2003 | Cooper et al. | |
| 2003/0191945 A1 | 10/2003 | Keech | |
| 2003/0200179 A1 | 10/2003 | Kwan | |
| 2003/0200465 A1 | 10/2003 | Bhat et al. | |
| 2003/0212595 A1 | 11/2003 | Antonucci | |

(56) References Cited

U.S. PATENT DOCUMENTS

| | | |
|---|---|---|
| 2003/0236755 A1 | 12/2003 | Dagelet, Jr. |
| 2004/0011866 A1 | 1/2004 | Saad |
| 2004/0019571 A1 | 1/2004 | Hurwitz et al. |
| 2004/0049598 A1 | 3/2004 | Tucker et al. |
| 2004/0078332 A1 | 4/2004 | Ferguson et al. |
| 2004/0086098 A1 | 5/2004 | Craft |
| 2004/0088250 A1 | 5/2004 | Bartter et al. |
| 2004/0128508 A1 | 7/2004 | Wheeler et al. |
| 2004/0133511 A1 | 7/2004 | Smith et al. |
| 2004/0153410 A1 | 8/2004 | Nootebos et al. |
| 2004/0185827 A1 | 9/2004 | Parks |
| 2004/0205023 A1 | 10/2004 | Hafer et al. |
| 2004/0210489 A1 | 10/2004 | Jackson et al. |
| 2004/0215560 A1 | 10/2004 | Amalraj et al. |
| 2004/0230489 A1 | 11/2004 | Goldthwaite et al. |
| 2004/0254891 A1 | 12/2004 | Blinn et al. |
| 2005/0008132 A1 | 1/2005 | Paschini et al. |
| 2005/0010452 A1 | 1/2005 | Lusen |
| 2005/0018824 A1 | 1/2005 | Richardson |
| 2005/0038714 A1 | 2/2005 | Bonet et al. |
| 2005/0038718 A1 | 2/2005 | Barnes et al. |
| 2005/0086168 A1 | 4/2005 | Alvarez et al. |
| 2005/0192893 A1 | 9/2005 | Keeling et al. |
| 2005/0229003 A1 | 10/2005 | Paschini et al. |
| 2005/0234822 A1* | 10/2005 | VanFleet ............... G06Q 20/04 705/40 |
| 2006/0026073 A1 | 2/2006 | Kenny, Jr. et al. |
| 2006/0043171 A1 | 3/2006 | New et al. |
| 2006/0045244 A1 | 3/2006 | New |
| 2006/0064344 A1 | 3/2006 | Lidow |
| 2006/0074783 A1 | 4/2006 | Agarwal et al. |
| 2006/0074799 A1 | 4/2006 | Averyt et al. |
| 2006/0078100 A1 | 4/2006 | Risafi et al. |
| 2006/0129419 A1 | 6/2006 | Flaxer et al. |
| 2006/0184613 A1 | 8/2006 | Stienessen et al. |
| 2006/0202012 A1 | 9/2006 | Grano et al. |
| 2006/0242087 A1 | 10/2006 | Naehr et al. |
| 2006/0248017 A1 | 11/2006 | Koka et al. |
| 2006/0253335 A1 | 11/2006 | Keena et al. |
| 2006/0269722 A1 | 11/2006 | Yamada |
| 2007/0023504 A1 | 2/2007 | Blankenship et al. |
| 2007/0073586 A1 | 3/2007 | Dev et al. |
| 2007/0090183 A1 | 4/2007 | Hursta et al. |
| 2007/0101351 A1 | 5/2007 | Bagsby et al. |
| 2007/0125838 A1 | 6/2007 | Law et al. |
| 2007/0125840 A1 | 6/2007 | Law et al. |
| 2007/0198437 A1 | 8/2007 | Eisner et al. |
| 2007/0210152 A1 | 9/2007 | Read |
| 2007/0255662 A1 | 11/2007 | Tumminaro |
| 2007/0272743 A1 | 11/2007 | Christie et al. |
| 2007/0276765 A1 | 11/2007 | Hazel et al. |
| 2007/0293309 A1 | 12/2007 | Jorasch et al. |
| 2008/0040284 A1 | 2/2008 | Hazel et al. |
| 2008/0059302 A1 | 3/2008 | Fordyce, III et al. |
| 2008/0059379 A1 | 3/2008 | Ramaci et al. |
| 2008/0078831 A1 | 4/2008 | Johnson et al. |
| 2008/0099551 A1 | 5/2008 | Harper et al. |
| 2008/0114696 A1 | 5/2008 | Singh et al. |
| 2008/0147546 A1 | 6/2008 | Weichselbaumer et al. |
| 2008/0147552 A1 | 6/2008 | Morsillo et al. |
| 2008/0162360 A1 | 7/2008 | Bantz et al. |
| 2008/0169344 A1 | 7/2008 | Huh |
| 2008/0177655 A1 | 7/2008 | Zalik |
| 2008/0189214 A1 | 8/2008 | Mueller et al. |
| 2008/0195499 A1 | 8/2008 | Meredith et al. |
| 2008/0208748 A1 | 8/2008 | Ozment et al. |
| 2008/0222417 A1 | 9/2008 | Downes et al. |
| 2008/0223920 A9 | 9/2008 | Duke |
| 2008/0228637 A1 | 9/2008 | Scipioni et al. |
| 2008/0255992 A1 | 10/2008 | Lin |
| 2008/0270246 A1 | 10/2008 | Chen |
| 2008/0270253 A1 | 10/2008 | Huang |
| 2008/0288405 A1 | 11/2008 | John |
| 2008/0319914 A1 | 12/2008 | Carrott |
| 2009/0030836 A1 | 1/2009 | Blandina et al. |
| 2009/0031407 A1 | 1/2009 | Kuang |
| 2009/0037326 A1 | 2/2009 | Chitti et al. |
| 2009/0037333 A1 | 2/2009 | Flitcroft et al. |
| 2009/0043702 A1* | 2/2009 | Bennett ............... G06Q 40/02 705/41 |
| 2009/0048953 A1 | 2/2009 | Hazel et al. |
| 2009/0048963 A1 | 2/2009 | Bishop et al. |
| 2009/0050688 A1 | 2/2009 | Kon et al. |
| 2009/0084842 A1 | 4/2009 | Vriheas et al. |
| 2009/0106160 A1 | 4/2009 | Skowronek |
| 2009/0119190 A1 | 5/2009 | Realini |
| 2009/0164320 A1 | 6/2009 | Galit |
| 2009/0177563 A1 | 7/2009 | Bernstein et al. |
| 2009/0234751 A1 | 9/2009 | Chan et al. |
| 2009/0254441 A1 | 10/2009 | Ahlers et al. |
| 2009/0288012 A1 | 11/2009 | Hertel et al. |
| 2009/0299841 A1 | 12/2009 | Bishop et al. |
| 2009/0319348 A1 | 12/2009 | Khosravy et al. |
| 2009/0319784 A1 | 12/2009 | Faith et al. |
| 2009/0327067 A1 | 12/2009 | Berger et al. |
| 2010/0036743 A1 | 2/2010 | Tamari et al. |
| 2010/0043008 A1 | 2/2010 | Marchand |
| 2010/0057580 A1* | 3/2010 | Raghunathan ...... G06Q 20/3572 705/17 |
| 2010/0076877 A1 | 3/2010 | Lenahan et al. |
| 2010/0094674 A1 | 4/2010 | Marriner et al. |
| 2010/0114731 A1* | 5/2010 | Kingston ............... G06Q 20/10 705/26.1 |
| 2010/0114773 A1 | 5/2010 | Skowronek |
| 2010/0125510 A1 | 5/2010 | Smith et al. |
| 2010/0154027 A1 | 6/2010 | Sobel et al. |
| 2010/0200652 A1 | 8/2010 | Wolfe et al. |
| 2010/0260388 A1* | 10/2010 | Garrett ............... G06Q 20/32 345/173 |
| 2010/0268645 A1 | 10/2010 | Martino et al. |
| 2010/0293093 A1 | 11/2010 | Karpenko |
| 2010/0299194 A1 | 11/2010 | Snyder et al. |
| 2010/0299195 A1 | 11/2010 | Nix et al. |
| 2010/0299221 A1 | 11/2010 | Paschini et al. |
| 2010/0299733 A1 | 11/2010 | Paschini et al. |
| 2010/0325006 A1 | 12/2010 | White |
| 2011/0035446 A1 | 2/2011 | Goermer et al. |
| 2011/0041006 A1 | 2/2011 | Fowler |
| 2011/0068170 A1 | 3/2011 | Lehman |
| 2011/0099055 A1 | 4/2011 | Khalil |
| 2011/0099107 A1* | 4/2011 | Saxena ............... G06Q 20/108 705/42 |
| 2011/0101093 A1 | 5/2011 | Ehrensvard |
| 2011/0125645 A1 | 5/2011 | Benkert et al. |
| 2011/0131275 A1 | 6/2011 | Maida-Smith et al. |
| 2011/0161229 A1 | 6/2011 | Mastrangelo et al. |
| 2011/0208656 A1 | 8/2011 | Alba et al. |
| 2011/0218911 A1 | 9/2011 | Spodak |
| 2011/0226620 A1 | 9/2011 | Tadayoni-Rebek et al. |
| 2011/0231272 A1 | 9/2011 | Englund et al. |
| 2011/0302646 A1 | 12/2011 | Ronda et al. |
| 2011/0307377 A1 | 12/2011 | Nelsen et al. |
| 2012/0123937 A1* | 5/2012 | Spodak ............... G06Q 20/105 705/41 |
| 2012/0150553 A1 | 6/2012 | Wade |
| 2012/0221468 A1 | 8/2012 | Kumnick et al. |
| 2012/0259718 A1 | 10/2012 | Miller et al. |
| 2012/0265681 A1 | 10/2012 | Ross |
| 2012/0317028 A1 | 12/2012 | Ansari |
| 2013/0013510 A1 | 1/2013 | Ansari |
| 2013/0018783 A1 | 1/2013 | Ansari |
| 2013/0018793 A1 | 1/2013 | Wong et al. |
| 2013/0030941 A1 | 1/2013 | Meredith et al. |
| 2013/0036019 A1 | 2/2013 | Tamari et al. |
| 2013/0041768 A1 | 2/2013 | Llach |
| 2013/0054470 A1 | 2/2013 | Campos et al. |
| 2013/0066735 A1 | 3/2013 | Llach |
| 2013/0091060 A1 | 4/2013 | Kundu |
| 2013/0117138 A1 | 5/2013 | Hazel et al. |
| 2013/0185214 A1 | 7/2013 | Azen et al. |
| 2013/0191136 A1 | 7/2013 | Apshago et al. |
| 2013/0191213 A1 | 7/2013 | Beck et al. |
| 2013/0036048 A1 | 8/2013 | Campos et al. |
| 2013/0262316 A1 | 10/2013 | Hruska |

(56) References Cited

U.S. PATENT DOCUMENTS

| | | | |
|---|---|---|---|
| 2013/0268437 | A1 | 10/2013 | Desai et al. |
| 2013/0304642 | A1 | 11/2013 | Campos |
| 2014/0006277 | A1* | 1/2014 | Rao .................... G06Q 20/3572 |
| | | | 705/41 |
| 2014/0019352 | A1 | 1/2014 | Shrivastava |
| 2014/0025519 | A1 | 1/2014 | Thomas |
| 2014/0108170 | A1 | 4/2014 | Tamari et al. |
| 2014/0143089 | A1 | 5/2014 | Campos et al. |
| 2014/0214656 | A1 | 7/2014 | Williams et al. |
| 2015/0302394 | A1 | 10/2015 | Harper |
| 2015/0348018 | A1 | 12/2015 | Campos et al. |
| 2017/0236117 | A1 | 8/2017 | Paschini et al. |

FOREIGN PATENT DOCUMENTS

| | | |
|---|---|---|
| EP | 0863537 A1 | 9/1998 |
| EP | 1286317 A2 | 2/2003 |
| EP | 1829352 A2 | 9/2007 |
| EP | 1829354 A2 | 9/2007 |
| EP | 2521999 A1 | 11/2012 |
| GB | 2215897 A | 9/1989 |
| GB | 2287565 A | 9/1995 |
| JP | 5225221 A | 9/1993 |
| JP | 10155040 A | 6/1998 |
| JP | 10174009 A | 6/1998 |
| JP | 11259576 A | 9/1999 |
| JP | 2003016368 A | 1/2003 |
| KR | 20020020773 A | 3/2002 |
| WO | 9641462 A1 | 12/1996 |
| WO | 9746961 A1 | 12/1997 |
| WO | 9847112 A1 | 10/1998 |
| WO | 0111857 A1 | 2/2001 |
| WO | 0116905 A1 | 3/2001 |
| WO | 03071386 A2 | 8/2003 |
| WO | 03083792 A2 | 10/2003 |
| WO | 2004107280 A2 | 12/2004 |
| WO | 2004107280 A3 | 12/2004 |
| WO | 2006062832 A2 | 6/2006 |
| WO | 2006062832 A3 | 6/2006 |
| WO | 2006062842 A2 | 6/2006 |
| WO | 2006062842 A3 | 6/2006 |
| WO | 2007127729 A2 | 11/2007 |
| WO | 2008008671 A2 | 1/2008 |
| WO | 2011085241 A1 | 7/2011 |
| WO | 2011159571 A1 | 12/2011 |
| WO | 2011159579 A2 | 12/2011 |
| WO | 2011159579 A3 | 12/2011 |
| WO | 2012027664 A1 | 3/2012 |
| WO | 2012166790 A1 | 12/2012 |
| WO | 2013123438 A1 | 8/2013 |
| WO | 2014081822 A2 | 5/2014 |
| WO | 2014081822 A3 | 5/2014 |
| WO | 2014107594 A2 | 7/2014 |
| WO | 2014107594 A3 | 7/2014 |

OTHER PUBLICATIONS

EMV Mobile Contactless Payment: Technical Issues and Position Paper, Version 1.0, Oct. 2007, EMVCo, 37 pages (Year: 2007).*
EMV Contactless Specifications for Payment Systems: EMV Contactless Communication Protocol Specification, Version 2.0, Aug. 2007, 159 pages (Year: 2007).*
Global Platform Card Specification, Version 2.2.1, Public Release, Jan. 2011, 303 pages (Year: 2011).*
Office Action (Final) dated Jun. 18, 2015 (32 pages), U.S. Appl. No. 13/617,751, filed Sep. 14, 2012.
Office Action dated Jun. 29, 2015 (37 pages), U.S. Appl. No. 13/704,084, filed Dec. 13, 2012.
Advisory Action dated Jul. 9, 2015 (8 pages), U.S. Appl. No. 12/538,083, filed Aug. 7, 2009.
Office Action dated Jul. 15, 2015 (8 pages), U.S. Appl. No. 13/619,176, filed Sep. 14, 2012.
Foreign communication from a related counterpart application—International Preliminary Report on Patentability, PCT/US2014/010206, dated Jul. 7, 2015, 7 pages.
Foreign communication from a related counterpart application—International Preliminary Report on Patentability, PCT/US2013/070991, dated May 26, 2015, 8 pages.
Advisory Action dated Jul. 24, 2015 (13 pages), U.S. Appl. No. 14/106,494, filed Dec. 13, 2013.
Advisory Action dated Aug. 19, 2015 (3 pages), U.S. Appl. No. 14/085,394, filed Nov. 20, 2013.
Office Action dated Jul. 29, 2015 (36 pages), U.S. Appl. No. 14/452,829, filed Aug. 6, 2014.
Office Action dated Oct. 5, 2015 (17 pages), U.S. Appl. No. 13/520,849, filed Jul. 6, 2012.
Office Action dated Oct. 5, 2015 (15 pages), U.S. Appl. No. 13/617,751, filed Sep. 14, 2012.
Advisory Action dated Sep. 23, 2015 (4 pages), U.S. Appl. No. 10/821,815, filed Apr. 9, 2004.
Office Action dated Dec. 31, 2015 (17 pages), U.S. Appl. No. 10/821,815, filed Apr. 9, 2004.
Office Action (Final) dated Sep. 9, 2015 (73 pages), U.S. Appl. No. 12/786,403, filed May 24, 2010.
Advisory Action dated Dec. 16, 2015 (3 pages), U.S. Appl. No. 12/786,403, filed May 24, 2010.
Office Action (Final) dated Oct. 20, 2015 (34 pages), U.S. Appl. No. 12/711,211, filed Feb. 23, 2010.
Office Action dated Sep. 15, 2015 (78 pages), U.S. Appl. No. 14/636,092, filed Mar. 2, 2015.
Office Action dated Oct. 2, 2015 (20 pages), U.S. Appl. No. 12/538,083, filed Aug. 7, 2009.
Office Action (Final) dated Jan. 29, 2016 (21 pages), U.S. Appl. No. 13/619,176, filed Sep. 14, 2012.
Office Action (Final) dated Jan. 13, 2016 (45 pages), U.S. Appl. No. 13/704,084, filed Dec. 13, 2012.
Office Action dated Sep. 29, 2015 (104 pages), U.S. Appl. No. 13/819,469, filed Jul. 1, 2013.
Office Action dated Oct. 1, 2015 (29 pages), U.S. Appl. No. 13/619,226, filed Sep. 14, 2012.
Office Action dated Nov. 5, 2015 (111 pages), U.S. Appl. No. 13/857,048, filed Apr. 4, 2013.
Office Action dated Nov. 17, 2015 (15 pages), U.S. Appl. No. 14/085,394, filed Nov. 20, 2013.
Office Action dated Feb. 2, 2016 (106 pages), U.S. Appl. No. 14/213,448, filed Mar. 14, 2014.
Office Action (Final) dated Sep. 26, 2016 (37 pages), U.S. Appl. No. 13/520,849, filed Jul. 6, 2012.
Advisory Action dated Oct. 20, 2016, (3 pages), U.S. Appl. No. 10/821,815, filed Apr. 9, 2004.
Examiner's Answer dated Oct. 19, 2016 (9 pages), U.S. Appl. No. 12/786,403, filed May 24, 2010.
Office Action dated Oct. 5, 2016 (19 pages), U.S. Appl. No. 12/711,211, filed Feb. 23, 2010.
Notice of Allowance dated Sep. 29, 2016 (7 pages), U.S. Appl. No. 14/636,092, filed Mar. 2, 2015.
Office Action (Final) dated Nov. 29, 2016 (25 pages), U.S. Appl. No. 12/538,083, filed Aug. 7, 2009.
Office Action dated Oct. 19, 2016 (54 pages), U.S. Appl. No. 13/704,084, filed Dec. 13, 2012.
Advisory Action dated Oct. 13, 2016 (3 pages), U.S. Appl. No. 13/483,711, filed May 30, 2012.
Examiner's Answer dated Nov. 25, 2016 (16 pages), U.S. Appl. No. 13/619,226, filed Sep. 14, 2012.
Office Action dated Nov. 2, 2016 (33 pages). U.S. Appl. No. 13/857,048, filed Apr. 4, 2013.
Office Action dated Sep. 30, 2016 (27 pages), U.S. Appl. No. 14/085,394, filed Nov. 20, 2013.
Advisory Action dated Oct. 19, 2016 (3 pages), U.S. Appl. No. 14/213,448, filed Mar. 14, 2014.
Office Action dated Nov. 28, 2016 (39 pages), U.S. Appl. No. 14/213,448, filed Mar. 14, 2014.
Filing receipt and specification for provisional patent application entitled "Systems and Methods for Proxy Card and/or Wallet

(56) References Cited

OTHER PUBLICATIONS

Redemption Card Transactions," by Pranav Sheth, et al., filed Mar. 13, 2013 as U.S. Appl. No. 61/779,334.
Filing receipt and specification for patent application entitled "System for Processing, Activating and Redeeming Value Added Prepaid Cards," by Teri Llach, et al., filed Mar. 14, 2014 as U.S. Appl. No. 14/213,448.
Foreign communication from a related counterpart application—Invitation to Pay Additional Fees, PCT/US2014/010206, dated Mar. 27, 2014, 2 pages.
Office Action dated May 19, 2014 (52 pages), U.S. Appl. No. 14/106,494, filed Dec. 13, 2013.
Office Action dated May 9, 2014 (58 pages), U.S. Appl. No. 13/914,360, filed Jun. 10, 2013.
AFX-Asia, Company News, "Tata Hydro-Electric Q2 to Sept net profit 265.8 mln rupees vs 212.4," Oct. 28, 1999, pp. 1-2, AFX News Limited.
Ameritech Corp., "Ameritech debuts its prepaid cellular," Abstract, RCR Radio Communications Report 15, No. 31, Ref. 7, Aug. 5, 1996, 1 page, Ameritech & ATM, PINS, or Prepaid Cards, 1994-1997, Lexis/Nexis Database.
Ameritech Corp., et al., "Ameritech in Prepaid Card Venture," Abstract, American Banker CLX, No. 205, Ref. 9, Oct. 24, 1995, 1 page, Ameritech & ATM, PINs, or Prepaid Cards, 1994-1997, Lexis/Nexis Database.
Ameritech Corp., "Phone Cards Meet ATMs," Abstract, Bank Technology News 8, No. 12, Ref. 8, Dec. 1995, 2 pages, Ameritech & ATM, PINs, or Prepaid Cards, 1994-1997, Lexis/Nexis Database.
Beach, Kirk W., et al., U.S. Pat. No. 5,892,827, Abstract, Ref. 7, Apr. 6, 1999, 1 page, Catalina Marketing International, Inc., 1994-1997, Lexis/Nexis Database.
Bernkopf, Mark, "Electronic Cash and Monetary Policy," http://ojphi.org/htbin/cgiwrap/bin/ojs/index.php/fm/article/viewFile/465/822, May 6, 1996, pp. 1-6, vol. 1, No. 1, First Monday.
Browne, F. X., et al., "Payments Technologies, Financial Innovation, and Laissez-Faire Banking," The Cato Journal, http://www.cato.org/pubs/journal/cj15n1-6.html, Spring/Summer 1995, 12 pages, vol. 15, No. 1, Cato Institute.
Business Wire entitled "The Winner's Edge.com Announces Purchase Agreement," Nov. 1, 1999, pp. 1-2, West.
Business Wire entitled "Easy Wireless Unveils Its New Internet Powered Accessory Express Kiosk Station," Feb. 25, 2000, pp. 1-2, West.
Business Wire entitled "Easy Wireless Unveils Its Revolutionary Pre-Paid PIN Dispensing Kiosk," Feb. 28, 2000, pp. 1-2, West.
"Card Briefs: Sprint is Using EDS for Phone-Card Plan," Abstract, The American Banker, Section: Credit/Debit/ATMs: p. 19, Mar. 13, 1995, 1 page, Ref. 4, EDS (Electronic Data Systems), 1994-1997, Lexis/Nexis Database.
"Codax Activation System," http://www.carkleen.co.nz/Products/Codax, Car Kleen—Leaders in Vehicle Wash Technology, 2 pages. (no date is available).
Congressional Budget Office Study entitled "Emerging Electronic Methods for Making Retail Payments," Jun. 1996, 63 pages, The Congress of the United States.
Derfler, Jr., Frank J., et al., "How Networks Work," Bestseller Edition, 1996, 69 pages, Ziff-Davis Press, an imprint of Macmillan Computer Publishing, USA.
Filing receipt and specification for provisional patent application entitled "System for Processing, Activating and Redeeming Value Added Prepaid Cards," by Teri Llach, filed Jan. 8, 2010 as U.S. Appl. No. 61/293,413.
Filing receipt and specification for provisional patent application entitled "Efficient Stored-Value Card Transactions," by Ansar Ansari, filed Jun. 14, 2010 as U.S. Appl. No. 61/354,469.
Filing receipt and specification for provisional patent application entitled "Efficient Stored-Value Card Transactions," by Ansar Ansari, filed Jun. 14, 2010 as U.S. Appl. No. 61/354,470.

Filing receipt and specification for provisional patent application entitled "System and Method for Configuring Risk Tolerance in Transaction Cards," by Arindam Kundu, filed Jun. 14, 2010 as U.S. Appl. No. 61/354,474.
Filing receipt and specification for provisional patent application entitled "System and Method for Configuring Risk Tolerance in Transaction Cards," by Arindam Kundu, filed Jun. 30, 2010 as U.S. Appl. No. 61/360,326.
Filing receipt and specification for provisional patent application entitled "Efficient Stored-Value Card Transactions," by Ansar Ansari, filed Jun. 30, 2010 as U.S. Appl. No. 61/360,327.
Filing receipt and specification for provisional patent application entitled "Prepaid Card with Savings Feature," by Kellie D. Harper, filed Aug. 27, 2010 as U.S. Appl. No. 61/377,800.
Filing receipt and specification for provisional patent application entitled "System for Payment via Electronic Wallet," by Tomas Ariel Campos, filed May 31, 2011 as U.S. Appl. No. 61/491,791.
Filing receipt and specification for provisional patent application entitled "System for Payment via Electronic Wallet," by Tomas Ariel Campos, filed May 31, 2011 as U.S. Appl. No. 61/491,813.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,397.
Filing receipt and specification for provisional patent application entitled "System, Method, and Apparatus for Creating and Distributing a Transaction Credit," by Ansar Ansari, filed Jun. 13, 2011 as U.S. Appl. No. 61/496,404.
Filing receipt and specification for provisional patent application entitled "Stored-Value Card Transaction Systems and Methods," by Ansar Ansari, filed Aug. 31, 2011 as U.S. Appl. No. 61/529,813.
Filing receipt and specification for provisional patent application entitled "Universal Interactive eGift Registration Button aka The Digital Sticker," by Tomas Ariel Campos, filed Feb. 15, 2012 as U.S. Appl. No. 61/599,249.
Filing receipt and specification for provisional patent application entitled "Universal Interactive eGift Registration Button aka The Digital Sticker," by Tomas Ariel Campos, filed Feb. 22, 2012 as U.S. Appl. No. 61/601,911.
Filing receipt and specification for provisional patent application entitled "eWallet with QR Code," by Tomas Ariel Campos, filed Apr. 4, 2012 as U.S. Appl. No. 61/620,173.
Filing receipt and specification for provisional patent application entitled System for Manging CVV Information in Electronic Wallet, by Tushar Vaish, filed Jan. 3, 2012 as U.S. Appl. No. 61/748,679.
Filing receipt and specification for provisional patent application entitled "System and Method for Providing a Security Code," by Tushar Vaish, et al., filed Mar. 15, 2013 as U.S. Appl. No. 61/799,500.
Filing receipt and specification for provisional patent application entitled "System and Method for Using QR Codes in Conjunction with Electronic Stored-Value Cards," by Tomas Ariel Campos, et al., filed Mar. 15, 2013 as U.S. Appl. No. 61/800,704.
Filing receipt and specification for patent application entitled "Transaction Processing Platform for Facilitating Electronic Distribution of Plural Prepaid Services," by Roni Dolev Tamari, et al., filed Dec. 18, 2008 as U.S. Appl. No. 12/338,854.
Filing receipt and specification for patent application entitled "System and Method for Using Intelligent Codes to Add a Stored-Value Card to an Electronic Wallet," by Tomas Ariel Campos, filed Apr. 4, 2013 as U.S. Appl. No. 13/857,048.
Filing receipt and specification for patent application entitled "System and Method for Electronic Prepaid Account Replenishment," by Miles Paschini, filed Jun. 10, 2013 as U.S. Appl. No. 13/914,360.
Foreign communication from a related counterpart application—Search Report, European Application No. 05825880.7, dated Jun. 8, 2011, 6 pages.
Foreign communication from a related counterpart application—Communication, European Application No. 05825880.7, dated Jun. 27, 2011, 1 page.
Foreign communication from a related counterpart application—Search Report, European Application No. 05852818.3, dated Jan. 22, 2009, 9 pages.

(56) References Cited

OTHER PUBLICATIONS

Foreign communication from a related counterpart application—Communication, European Application No. 05852818.3, dated May 11, 2009, 1 page.
Foreign communication from a related counterpart application—International Search Report and Written Opinion, PCT/US2004/015658, dated Jun. 22, 2005, 8 pages.
Foreign communication from a related counterpart application—International Preliminary Examination Report, PCT/US2004/015658, dated Mar. 17, 2006, 6 pages.
Foreign communication from a related counterpart application—International Search Report and Written Opinion, PCT/US2005/043705, dated Aug. 10, 2006, 7 pages.
Foreign communication from a related counterpart application—International Preliminary Report on Patentability, PCT/US2005/043705, dated Jun. 13, 2007, 6 pages.
Foreign communication from a related counterpart application—International Search Report and Written Opinion, PCT/US2005/043756, dated Oct. 3, 2006, 6 pages.
Foreign communication from a related counterpart application—International Preliminary Report on Patentability, PCT/US2005/043756, dated Jun. 13, 2007, 6 pages.
Foreign communication from a related counterpart application—International Search Report and Written Opinion, PCT/US2011/020570, dated Mar. 7, 2011, 11 pages.
Foreign communication from a related counterpart application—International Preliminary Report on Patentability, PCT/US2011/020570, dated Jul. 10, 2012, 8 pages.
Foreign communication from a related counterpart application—International Search Report and Written Opinion, PCT/US2012/039981, dated Nov. 5, 2012, 35 pages.
Foreign communication from a related counterpart application—Invitation to Pay Additional Fees, PCT/US2012/039981, dated Aug. 28, 2012, 2 pages.
Foreign communication from a related counterpart application—International Search Report and Written Opinion, PCT/US2011/039996, dated Oct. 24, 2011, 8 pages.
Foreign communication from a related counterpart application—International Preliminary Report on Patentability, PCT/US2011/039996, dated Dec. 14, 2012, 7 pages.
Foreign communication from a related counterpart application—International Search Report and Written Opinion, PCT/US2011/040055, dated Jan. 27, 2012, 12 pages.
Foreign communication from a related counterpart application—International Preliminary Report on Patentability, PCT/US2011/040055, dated Dec. 14, 2012, 8 pages.
Foreign communication from a related counterpart application—Invitation to Pay Additional Fees, PCT/US2011/040055, dated Nov. 16, 2011, 2 pages.
Foreign communication from a related counterpart application—International Search Report and Written Opinion, PCT/US2011/049338, dated Jan. 24, 2012, 7 pages.
Foreign communication from a related counterpart application—International Preliminary Report on Patentability, PCT/US2011/049338, dated Mar. 5, 2013, 6 pages.
Foreign communication from a related counterpart application—Invitation to Pay Additional Fees, PCT/US2013/026501, dated Apr. 16, 2013, 2 pages.
Foreign communication from a related counterpart application—Office Action, Mexican Patent Application No. MX/a/2007/006924, dated Jul. 28, 2010, 3 pages.
Gill, Lynn A., et al., "In Situ Optimization of the Electrode Geometry of the Quadrupole Ion Trap," International Journal of Mass Spectrometry, 1999, pp. 87-93, vol. 188, Elsevier Science B.V.
Gralla, Preston, "How the Internet Works," Millennium Edition, 1999, 35 pages, Que Corporation, A Division of Macmillan Computer Publishing, USA.
Harrop, Peter, "The Electronic Purse," IEE Review, Jun. 1992, pp. 227-231, IEE.

"Innovative Telecom Corp. and Catalina Marketing Corporation to Make Prepaid Long Distance Certificates Available to 120 Million Shoppers," Abstract, PR Newswire, Sep. 28, 1995, 3 pages, Section: Financial News, Ref. 4, Catalina Marketing, 1994-1997, Lexis/Nexis Database.
"Innovative Telecom Corporation Receives Contract from NYNEX to Provide Prepaid Phone Card Services," Abstract, PR Newswire, Sep. 28, 1995, 1 page, Section: Financial News, Ref. 4, Innovative Telecom, 1994-1997, Lexis/Nexis Database.
Knowles, Francine, "ATMs to Dispense Calling Cards; Ameritech, Cash Station in Venture," Abstract, Financial Section, Chicago Sun-Times, Oct. 18, 1995, 2 pages, Ref. 1, Ameritech & ATM, PINs, or Prepaid Cards, 1994-1997, Lexis/Nexis Database.
Kreyer, Nina, et al., "Standardized Payment Procedures as Key Enabling Factor for Mobile Commerce," Proceedings of the Third International Conference on E-Commerce and Web Technologies, 2002, pp. 400-409, Springer-Verlag Berlin Heidelberg.
Levy, Steven, "E-Money (That's What I Want)," Wired, 1994, 11 pages, © The Condé Nast Publications Inc., © Wired Digital, Inc.
Lilge, Manfred, "Evolution of Prepaid Service Towards a Real-Time Payment System," 2001, pp. 195-198, IEEE.
Lin, Yi-Bing, et al., "Mobile Prepaid Phone Services," IEEE Personal Communications, Jun. 2000, pp. 6-14, IEEE.
"Loose Change," Abstract, U.S. Banker, Sep. 1995, 1 page, National Edition, Section USB News, Industry, p. 12, Ref. 1, EDS (Electronic Data Systems), 1994-1997, Lexis/Nexis Database.
Marcous, Neil P., et al., Abstract, U.S. Pat. No. 5,650,604, Jul. 22, 1997, 1 page, Ref. 10, EDS (Electronic Data Systems), 1994-1997, Lexis/Nexis Database.
"Model 5008C Eight Selection Card Vending Machine," http://www.vendapin.com/5008.html, downloaded from Internet on May 9, 2013, 1 page.
Muller, Nathan J., "Desktop Encyclopedia of the Internet," 1999, 51 pages, Artech House Inc., Norwood, MA.
Office Action (Final) dated Nov. 23, 2009 (21 pages), U.S. Appl. No. 10/821,405, filed Apr. 9, 2004.
Office Action dated Jan. 14, 2009 (19 pages), U.S. Appl. No. 10/821,405, filed Apr. 9, 2004.
Advisory Action dated Apr. 12, 2013 (3 pages), U.S. Appl. No. 10/821,815, filed Apr. 9, 2004.
Advisory Action dated Apr. 19, 2012 (3 pages), U.S. Appl. No. 10/821,815, filed Apr. 9, 2004.
Advisory Action dated Apr. 28, 2009 (3 pages), U.S. Appl. No. 10/821,815, filed Apr. 9, 2004.
Office Action (Final) dated Jan. 25, 2013 (15 pages), U.S. Appl. No. 10/821,815, filed Apr. 9, 2004.
Office Action dated Jul. 16, 2012 (15 pages), U.S. Appl. No. 10/821,815, filed Apr. 9, 2004.
Office Action (Final) dated Feb. 1, 2012 (15 pages), U.S. Appl. No. 10/821,815, filed Apr. 9, 2004.
Office Action dated May 9, 2011 (12 pages), U.S. Appl. No. 10/821,815, filed Apr. 9, 2004.
Office Action dated Aug. 4, 2010 (14 pages), U.S. Appl. No. 10/821,815, filed Apr. 9, 2004.
Office Action dated Aug. 5, 2009 (11 pages), U.S. Appl. No. 10/821,815, filed Apr. 9, 2004.
Office Action (Final) dated Feb. 4, 2009 (9 pages), U.S. Appl. No. 10/821,815, filed Apr. 9, 2004.
Office Action dated May 14, 2008 (10 pages), U.S. Appl. No. 10/821,815, filed Apr. 9, 2004.
Advisory Action dated Apr. 11, 2013 (3 pages), U.S. Appl. No. 12/786,403, filed May 24, 2010.
Advisory Action dated May 8, 2012 (2 pages), U.S. Appl. No. 12/786,403, filed May 24, 2010.
Office Action (Final) dated Jan. 16, 2013 (15 pages), U.S. Appl. No. 12/786,403, filed May 24, 2010.
Office Action dated Jun. 6, 2012 (14 pages), U.S. Appl. No. 12/786,403, filed May 24, 2010.
Office Action (Final) dated Feb. 14, 2012 (13 pages), U.S. Appl. No. 12/786,403, filed May 24, 2010.
Office Action dated May 12, 2011 (15 pages), U.S. Appl. No. 12/786,403, filed May 24, 2010.

(56) References Cited

OTHER PUBLICATIONS

Advisory Action dated Jan. 8, 2013 (3 pages), U.S. Appl. No. 12/711,211, filed Feb. 23, 2010.
Advisory Action dated Feb. 15, 2012 (3 pages), U.S. Appl. No. 12/711,211, filed Feb. 23, 2010.
Office Action (Final) dated May 22, 2013 (12 pages), U.S. Appl. No. 12/711,211, filed Feb. 23, 2010.
Office Action (Final) dated Oct. 26, 2012 (11 pages), U.S. Appl. No. 12/711,211, filed Feb. 23, 2010.
Office Action dated Apr. 11, 2012 (11 pages), U.S. Appl. No. 12/711,211, filed Feb. 23, 2010.
Office Action (Final) dated Dec. 8, 2011 (12 pages), U.S. Appl. No. 12/711,211, filed Feb. 23, 2010.
Office Action dated Oct. 1, 2010 (10 pages), U.S. Appl. No. 12/711,211, filed Feb. 23, 2010.
Advisory Action dated Mar. 12, 2013 (3 pages), U.S. Appl. No. 12/538,083, filed Aug. 7, 2009.
Filing receipt and specification for patent application entitled "System for Payment via Electronic Wallet," by Tomas Ariel Campos, filed Aug. 6, 2014 as U.S. Appl. No. 14/452,829.
Filing receipt and specification for provisional patent application entitled "Endless Endcap," by Tomas Ariel Campos, filed Nov. 20, 2012 as U.S. Appl. No. 61/728,597.
Foreign communication from a related counterpart application—Australian Examination Report, Application No. 2011293250, dated Jun. 2, 2014, 3 pages.
Foreign communication from a related counterpart application—International Search Report and Written Opinion, PCT/US2014/010206, dated Jun. 23, 2014, 10 pages.
Foreign communication from a related counterpart application—International Preliminary Report on Patentability, PCT/US2013/026501, dated Aug. 19, 2014, 12 pages.
Foreign communication from a related counterpart application—International Search Report and Written Opinion, PCT/US2013/070991, dated May 22, 2014, 11 pages.
Notice of Allowance dated Jul. 2, 2014 (41 pages), U.S. Appl. No. 14/065,189, filed Oct. 28, 2013.
Office Action dated Jul. 15, 2014 (19 pages), U.S. Appl. No. 13/619,176, filed Sep. 14, 2012.
Office Action dated Jul. 31, 2014 (38 pages), U.S. Appl. No. 13/621,331, filed Sep. 17, 2012.
Office Action dated Aug. 6, 2014 (30 pages), U.S. Appl. No. 13/704,084, filed Dec. 13, 2012.
Foreign communication from a related counterpart application—Mexican Office Action, Application No. MX/a/2012/007926, dated Nov. 26, 2013, 14 pages.
Foreign communication from a related counterpart application—Mexican Office Action, Application No. MX/a/2012/007926, dated Apr. 25, 2014, 11 pages.
Office Action dated Sep. 26, 2014 (31 pages), U.S. Appl. No. 13/520,849, filed Jul. 6, 2012.
Office Action dated Oct. 1, 2014 (16 pages), U.S. Appl. No. 10/821,815, filed Apr. 9, 2004.
Office Action dated Sep. 9, 2014 (10 pages), U.S. Appl. No. 12/711,211, filed Feb. 23, 2010.
Office Action dated Sep. 15, 2014 (63 pages), U.S. Appl. No. 13/619,226, filed Sep. 14, 2012.
Foreign communication from a related counterpart application—International Search Report and Written Opinion, PCT/US2013/026501, dated Jun. 19, 2013, 15 pages.
Foreign communication from a related counterpart application—Examination Report, New Zealand Application No. 605666, dated Nov. 3, 2014, 4 pages.
Office Action dated Nov. 19, 2014 (27 pages), U.S. Appl. No. 13/617,751, filed Sep. 14, 2012.
Office Action dated Nov. 13, 2014 (12 pages), U.S. Appl. No. 12/786,403, filed May 24, 2010.
Notice of Allowance dated Oct. 24, 2014 (18 pages), U.S. Appl. No. 13/914,360, filed Jun. 10, 2013.
Office Action dated Dec. 4, 2014 (61 pages), U.S. Appl. No. 14/085,394, filed Nov. 20, 2013.
Office Action dated Dec. 5, 2014 (12 pages), U.S. Appl. No. 14/106,494, filed Dec. 13, 2013.
Foreign communication from a related counterpart application—Examination Report, New Zealand Application No. 605612, dated Nov. 18, 2014, 4 pages.
Foreign communication from a related counterpart application—Examination Report, Australian Application No. 2011268018, dated Nov. 24, 2014, 4 pages.
Foreign communication from a related counterpart application—Examination Report, Australian Application No. 2011268026, dated Nov. 26, 2014, 4 pages.
Foreign communication from a related counterpart application—Australian Examination Report, Application No. 2011203954, dated Nov. 28, 2014, 4 pages.
Foreign communication from a related counterpart application—Search Report, European Application No. 11732229.7, dated Dec. 8, 2014, 8 pages.
Foreign communication from a related counterpart application—Mexican Office Action, Application No. MX/a/2012/007926, dated Nov. 21, 2014, 10 pages.
Office Action dated Dec. 22, 2014 (31 pages), U.S. Appl. No. 12/538,083, filed Aug. 7, 2009.
Office Action dated Jan. 5, 2015 (72 pages), U.S. Appl. No. 14/452,829, filed Aug. 6, 2014.
Office Action (Final) dated Jan. 14, 2015 (38 pages), U.S. Appl. No. 13/704,084, filed Dec. 13, 2012.
Office Action (Final) dated Feb. 4, 2015 (16 pages), U.S. Appl. No. 13/619,226, filed Sep. 14, 2012.
Office Action (Final) dated Mar. 18, 2015 (18 pages), U.S. Appl. No. 13/619,176, filed Sep. 14, 2012.
Office Action (Final) dated Mar. 5, 2015 (43 pages), U.S. Appl. No. 13/621,331, filed Sep. 17, 2012.
Office Action dated Mar. 17, 2015 (80 pages), U.S. Appl. No. 13/483,711, filed May 30, 2012.
Advisory Action dated Apr. 3, 2015 (3 pages), U.S. Appl. No. 13/704,084, filed Dec. 13, 2012.
Filing receipt and specification for patent application entitled "System and Method for Electronic Prepaid Account Replenishment," by Miles Paschini, et al., filed Mar. 2, 2015 as U.S. Appl. No. 14/636,092.
Foreign communication from a related counterpart application—International Preliminary Report on Patentability, PCT/US2012/039981, dated Dec. 2, 2013, 31 pages.
Office Action dated Mar. 25, 2015 (9 pages), U.S. Appl. No. 12/711,211, filed Feb. 23, 2010.
Office Action (Final) dated Apr. 7, 2015 (23 pages), U.S. Appl. No. 12/538,083, filed Aug. 7, 2009.
Advisory Action dated Apr. 14, 2015 (3 pages), U.S. Appl. No. 13/619,226, filed Sep. 14, 2012.
Office Action (Final) dated Apr. 20, 2016 (27 pages), U.S. Appl. No. 13/617,751, filed Sep. 14, 2012.
Office Action (Final) dated Apr. 20, 2016 (23 pages), U.S. Appl. No. 12/711,211, filed Feb. 23, 2010.
Office Action dated Apr. 25, 2016 (31 pages), U.S. Appl. No. 12/538,083, filed Aug. 7, 2009.
Examiner's Answer dated Mar. 30, 2016 (6 pages), U.S. Appl. No. 14/106,494, filed Dec. 13, 2013.
Advisory Action dated Mar. 23, 2016 (4 pages), U.S. Appl. No. 13/704,084, filed Dec. 13, 2012.
Office Action (Final) dated Apr. 26, 2016 (29 pages), U.S. Appl. No. 13/819,469, filed Jul. 1, 2013.
Office Action (Final) dated Mar. 24, 2016 (26 pages), U.S. Appl. No. 14/452,829, filed Aug. 6, 2014.
Office Action (Final) dated Mar. 8, 2016 (26 pages), U.S. Appl. No. 13/619,226, filed Sep. 14, 2012.
Office Action (Final) dated May 9, 2016 (26 pages), U.S. Appl. No. 14/085,394, filed Nov. 20, 2013.
Office Action (Final) dated Aug. 8, 2016 (31 pages), U.S. Appl. No. 10/821,815, filed Apr. 9, 2004.
Advisory Action dated Jun. 29, 2016 (3 pages), U.S. Appl. No. 12/711,211, filed Feb. 23, 2010.

(56) References Cited

OTHER PUBLICATIONS

Advisory Action dated Jul. 27, 2016 (3 pages), U.S. Appl. No. 13/819,469, filed Jul. 1, 2013.
Office Action (Final) dated Jul. 12, 2016 (36 pages), U.S. Appl. No. 13/483,711, filed May 30, 2012.
Office Action (Final) dated May 18, 2016 (32 pages), U.S. Appl. No. 13/857,048, filed Apr. 4, 2013.
Advisory Action dated Aug. 10, 2016 (2 pages), U.S. Appl. No. 13/857,048, filed Apr. 4, 2013.
Advisory Action dated Jul. 15, 2016 (3 pages), U.S. Appl. No. 14/085,394, filed Nov. 20, 2013.
Office Action (Final) dated Jul. 28, 2016 (40 pages), U.S. Appl. No. 14/213,448, filed Mar. 14, 2014.
Office Action (Final) dated Dec. 28, 2012 (12 pages), U.S. Appl. No. 12/538,083, filed Aug. 7, 2009.
Office Action dated Apr. 9, 2012 (19 pages), U.S. Appl. No. 12/538,083, filed Aug. 7, 2009.
Advisory Action dated Jun. 6, 2013 (3 pages), U.S. Appl. No. 13/495,986, filed Jun. 13, 2012.
Office Action (Final) dated Mar. 25, 2013 (13 pages), U.S. Appl. No. 13/495,986, filed Jun. 13, 2012.
Office Action dated Dec. 11, 2012 (15 pages), U.S. Appl. No. 13/495,986, filed Jun. 13, 2012.
Advisory Action dated May 31, 2013 (3 pages), U.S. Appl. No. 13/619,226, filed Sep. 14, 2012.
Office Action (Final) dated Mar. 25, 2013 (13 pages), U.S. Appl. No. 13/619,226, filed Sep. 14, 2012.
Office Action dated Dec. 11, 2012 (15 pages), U.S. Appl. No. 13/619,226, filed Sep. 14, 2012.
"Outsourcing the ATM business," Abstract, Electronic Payments International No. 102, Nov. 1995, 1 page, Ref. 5, EDS (Electronic Data Systems), 1994-1997, Lexis/Nexis Database.
Panurach, Patiwat, "Money in Electronic Commerce: Digital Cash, Electronic Fund Transfer, and Ecash," Communications of the ACM, Jun. 1996, pp. 45-50, vol. 39, No. 6, ACM.
Patent Application entitled "Systems and Methods for Distributing Personal Identification Numbers (PINs) Over Computer Networks," by Miles Paschini, filed Apr. 16, 2009 as U.S. Appl. No. 12/425,259.
Patent application entitled "Prepaid Card with Saving Feature," by Kellie D. Harper, filed Feb. 27, 2013 as U.S. Appl. No. 13/819,469.
Cover sheet and specification for provisional patent application entitled "System and Method for Electronic Prepaid Account Replenishment," by Miles Paschini, et al., filed May 28, 2003 as U.S. Appl. No. 60/473,685.
Piskora, Beth, "EDS' inroads into ATMs give banks pause," Abstract, American Banker, Jun. 29, 1995, 1 page, vol. 18, No. 1, Ref. 8, EDS (Electronic Data Systems), 1994-1995, Lexis/Nexis Database.
Q Comm International, Inc. product information entitled, "Q Comm's Qxpress System; On-Demand Retail Phone Cards," http://web.archive.org/web/20000302140250/www.qcomm.com/products/ondemand.asp, Mar. 2000, 2 pages.
Smart Card Alliance Report PT-03002, "Contactless Payment and the Retail Point of Sale: Applications, Technologies and Transaction Models," Mar. 2003, pp. 1-50.
Splendore, Maurizio, et al., "A new ion ejection method employing an asymmetric trapping field to improve the mass scanning performance of an electrodynamic ion trap," International Journal of Mass Spectrometry, 1999, pp. 129-143, vol. 190/191, Elsevier Science B.V.
Ter Maat, Mike, "The economics of e-cash," IEEE Spectrum, Feb. 1997, pp. 68-73, IEEE.
"The future of money: hearing before the Subcommittee on Domestic and International Monetary Policy of the Committee on Banking and Financial Services, House of Representatives, One Hundred Fourth Congress, first session," The Future of Money, Part 4, http://www.archive.org/stream/futureofmoneyhea04unit/futureofmoneyhea04unit_djvu.txt, Jun. 11, 1996, 5 pages.
"US West Launches Christmas Prepaid Calling Card With Card Pioneer Innovative Telecom;—Sixty Minute Holiday Card Available Now—," Abstract, PR Newswire, Dec. 5, 1997, 1 page, Section: Financial News, Ref. 1, Inovative Telecom, 1994-1997, Lexis/Nexis Database.
"Vendapin Model 5004 Four Selection Cellular and IP, Phone Calling Card, Lottery or Admissions Ticket Printer Vending Machine with Optional Two Selection Cellular Phone Dispenser Console," http://www.vendapin.com/5008.html, Apr. 3, 2000, pp. 1-4, Vendapin.
Visa press release entitled "Visa Unveils Next Generation Electronic Payments and Services," http://corporate.visa.com/newsroom/press-releases/press1124.jsp, May 11, 2011, 3 pages.
Wenninger, John, et al., "The Electronic Purse," Current Issues in Economics and Finance, Apr. 1995, pp. 1-5 plus one information page, vol. 1, No. 1, Federal Reserve Bank of New York.
White, Ron, "How Computers Work," Millennium Edition, 1999, 83 pages, Que Corporation, A Division of Macmillan Computer Publishing, USA.
Office Action dated Jul. 31, 2013 (13 pages), U.S. Appl. No. 13/520,849, filed Jul. 6, 2012.
Office Action (Final) dated Dec. 6, 2013 (16 pages), U.S. Appl. No. 10/821,815, filed Apr. 9, 2004.
Office Action dated Aug. 6, 2013 (37 pages), U.S. Appl. No. 12/538,083, filed Aug. 7, 2009.
Office Action (Final) dated Dec. 27, 2013 (19 pages), U.S. Appl. No. 12/538,083, filed Aug. 7, 2009.
Office Action dated Mar. 3, 2014 (69 pages), U.S. Appl. No. 13/704,084, filed Dec. 13, 2012.
Filing receipt and specification for patent application entitled "Systems and Methods for Personal Identification Number Distribution and Delivery," by Darren New, et al., filed Oct. 28, 2013 as U.S. Appl. No. 14/065,189.
Foreign communication from a related counterpart application—Examination Report, New Zealand Application No. 605666, dated Aug. 9, 2013, 2 pages.
Foreign communication from a related counterpart application—Examination Report, New Zealand Application No. 607755, dated Dec. 4, 2013, 2 pages.
Office Action (Final) dated Feb. 20, 2014 (61 pages), U.S. Appl. No. 13/520,849, filed Jul. 6, 2012.
Office Action dated Mar. 10, 2014 (64 pages), U.S. Appl. No. 13/617,751, filed Sep. 14, 2012.
Advisory Action dated Mar. 10, 2014 (3 pages), U.S. Appl. No. 10/821,815, filed Apr. 9, 2004.
Office Action dated Mar. 7, 2014 (15 pages), U.S. Appl. No. 12/786,403, filed May 24, 2010.
Advisory Action dated Sep. 30, 2013 (4 pages), U.S. Appl. No. 12/711,211, filed Feb. 23, 2010.
Office Action dated Jan. 16, 2013 (6 pages), U.S. Appl. No. 13/619,176, filed Sep. 14, 2012.
Office Action (Final) dated Feb. 7, 2014 (51 pages), U.S. Appl. No. 13/619,176, filed Sep. 14, 2012.
Office Action dated Oct. 23, 2013 (72 pages), U.S. Appl. No. 13/621,331, filed Sep. 17, 2012.
Office Action dated Feb. 19, 2014 (9 pages), U.S. Appl. No. 14/065,189, filed Oct. 28, 2013.
Filing receipt and specification for provisional patent application entitled "Systems and Methods for Proxy Card and/or Wallet Redemption Card Transactions," by Tushar Vaish, et al., filed Mar. 11, 2013 as U.S. Appl. No. 61/776,594.
Advisory Action dated Mar. 25, 2014 (3 pages), U.S. Appl. No. 12/538,083, filed Aug. 7, 2009.
Examiner's Answer dated Oct. 22, 2013 (12 pages), U.S. Appl. No. 13/495,986, filed Jun. 13, 2012.
Filing receipt and specification for International application entitled "System and Method for Providing a Security Code," filed Jan. 3, 2014 as International application No. PCT/US2014/010206.
Foreign communication from a related counterpart application—Examination Report, New Zealand Application No. 601208, dated Mar. 5, 2014, 2 pages.
Office Action (Final) dated Mar. 31, 2014 (31 pages), U.S. Appl. No. 13/621,331, filed Sep. 17, 2012.
Filing receipt and specification for patent application entitled "System and Method for Providing a Security Code," by Tushar Vaish, et al., filed Jan. 3, 2014 as U.S. Appl. No. 14/147,330.

(56) References Cited

OTHER PUBLICATIONS

Filing receipt and specification for provisional patent application entitled "Client Directed Pre-Paid Card," by J. DuWayne Milner, filed Mar. 14, 2013 as U.S. Appl. No. 61/781,667.
Advisory Action dated May 21, 2015 (6 pages), U.S. Appl. No. 13/621,331, filed Sep. 17, 2012.
Foreign communication from a related counterpart application—Mexican Office Action, Application No. MX/a/2013/013903, dated Apr. 23, 2015, 9 pages.
Office Action (Final) dated May 6, 2015 (13 pages), U.S. Appl. No. 14/106,494, filed Dec. 13, 2013.
Office Action (Final) dated Jun. 2, 2015 (33 pages), U.S. Appl. No. 13/520,849, filed Jul. 6, 2012.
Office Action (Final) dated Jun. 3, 2015 (32 pages), U.S. Appl. No. 10/821,815, filed Apr. 9, 2004.
Patent application entitled "System and Method of Registering Stored-Value Cards into Electronic Wallets," by Tomas Ariel Campos, et al., filed Aug. 15, 2014 as U.S. Appl. No. 14/379,210.
Office Action (Final) dated Jun. 9, 2015 (26 pages), U.S. Appl. No. 14/085,394, filed Nov. 20, 2013.
Filing receipt and specification for patent application entitled "System and Method for Electronic Prepaid Account Replenishment," by Miles Paschini, et al., filed Dec. 19, 2016 as U.S. Appl. No. 15/383,680.
Filing receipt and specification for provisional patent application entitled "Mimicking Post-Paid User Experience with Stored-Value Card Accounts," by Richard Gotlieb, filed Oct. 26, 2015 as U.S. Appl. No. 62/246,126.
Filing receipt and specification for patent application entitled "Systems and Methods for Mimicking Post-Paid User Experience with Stored-Value Card Accounts," by Richard Gotlieb, filed Oct. 26, 2016 as U.S. Appl. No. 15/335,086.
Advisory Action dated Dec. 15, 2016 (3 pages), U.S. Appl. No. 13/520,849, filed Jul. 6, 2012.
Office Action dated Jan. 11, 2017 (27 pages), U.S. Appl. No. 10/821,815, filed Apr. 9, 2004.
Advisory Action dated Mar. 1, 2017 (3 pages), U.S. Appl. No. 12/538,083, filed Aug. 7, 2009.
Office Action (Final) dated Jan. 13, 2017 (21 pages), U.S. Appl. No. 13/619,176, filed Sep. 14, 2012.
Advisory Action dated Mar. 21, 2017 (3 pages), U.S. Appl. No. 13/619,176, filed Sep. 14, 2012.
Office Action dated Mar. 20, 2017 (31 pages), U.S. Appl. No. 13/819,469, filed Jul. 1, 2013.
Office Action (Final) dated Dec. 22, 2016 (13 pages), U.S. Appl. No. 13/483,711, filed May 30, 2012.
Advisory Action dated Mar. 17, 2017 (3 pages), U.S. Appl. No. 13/483,711, filed May 30, 2012.
Office Action dated Mar. 7, 2017 (131 pages), U.S. Appl. No. 14/147,330, filed Oct. 4, 2016.
Office Action dated Mar. 16, 2017 (131 pages), U.S. Appl. No. 14/205,065, filed Mar. 11, 2014.
Office Action (Final) dated Apr. 4, 2017 (85 pages), U.S. Appl. No. 13/704,084, filed Dec. 13, 2012.
Office Action dated Apr. 20, 2017 (30 pages), U.S. Appl. No. 13/520,849, filed Jul. 6, 2012.
Notice of Allowance dated Sep. 18, 2017 (12 pages), U.S. Appl. No. 13/520,849, filed Jul. 6, 2012.
Office Action dated May 30, 2017 (40 pages), U.S. Appl. No. 13/617,751, filed Sep. 14, 2012.
Office Action (Final) dated Oct. 16, 2017 (16 pages), U.S. Appl. No. 13/617,751, filed Sep. 14, 2012.
Advisory Action dated Aug. 1, 2016 (2 pages), U.S. Appl. No. 13/617,751, filed Sep. 14, 2012.
Office Action (Final) dated Jul. 11, 2017 (26 pages), U.S. Appl. No. 10/821,815, filed Apr. 9, 2004.
Advisory Action dated Sep. 20, 2017, (3 pages), U.S. Appl. No. 10/821,815, filed Apr. 9, 2004.
Office Action (Final) dated May 3, 2017 (26 pages), U.S. Appl. No. 12/711,211, filed Feb. 23, 2010.
Advisory Action dated Sep. 1, 2017 (3 pages), U.S. Appl. No. 12/711,211, filed Feb. 23, 2010.
Office Action dated May 18, 2017 (10 pages), U.S. Appl. No. 15/383,680, filed Dec. 19, 2016.
Office Action (Final) dated Sep. 6, 2017 (5 pages), U.S. Appl. No. 15/383,680, filed Dec. 19, 2016.
Notice of Allowance dated Oct. 10, 2017 (7 pages), U.S. Appl. No. 15/383,680, filed Dec. 19, 2016.
Office Action dated Jun. 29, 2017 (26 pages), U.S. Appl. No. 12/538,083, filed Aug. 7, 2009.
Office Action (Final) dated Jan. 2, 2018 (25 pages), U.S. Appl. No. 12/538,083, filed Aug. 7, 2009.
Office Action dated Jul. 20, 2017 (21 pages), U.S. Appl. No. 13/619,176, filed Sep. 14, 2012.
Advisory Action dated Jun. 16, 2017 (5 pages), U.S. Appl. No. 13/704,084, filed Dec. 13, 2012.
Office Action dated Nov. 13, 2017 (82 pages), U.S. Appl. No. 13/704,084, filed Dec. 13, 2012.
Office Action (Final) dated Aug. 31, 2017 (27 pages), U.S. Appl. No. 13/819,469, filed Jul. 1, 2013.
Office Action dated Nov. 20, 2017 (24 pages), U.S. Appl. No. 13/483,711, filed May 30, 2012.
Advisory Action dated Nov. 7, 2017 (3 pages), U.S. Appl. No. 13/819,469, filed Jul. 1, 2013.
Office Action dated Apr. 3, 2017 (38 pages), U.S. Appl. No. 14/452,829, filed Aug. 6, 2014.
Office Action (Final) dated Oct. 17, 2017 (21 pages), U.S. Appl. No. 14/452,829, filed Aug. 6, 2014.
Advisory Action dated Dec. 8, 2017 (3 pages), U.S. Appl. No. 14/452,829, filed Aug. 6, 2014.
Office Action dated Sep. 29, 2017 (21 pages), U.S. Appl. No. 14/379,210, filed Aug. 15, 2014.
Office Action (Final) dated May 17, 2017 (45 pages), U.S. Appl. No. 13/857,048, filed Apr. 4, 2013.
Office Action (Final) dated Feb. 15, 2017 (23 pages), U.S. Appl. No. 14/085,394, filed Nov. 20, 2013.
Advisory Action dated Apr. 21, 2017 (3 pages), U.S. Appl. No. 14/085,394, filed Nov. 20, 2013.
Office Action dated Sep. 29, 2017 (24 pages), U.S. Appl. No. 14/085,394, filed Nov. 20, 2013.
Advisory Action dated Sep. 20, 2017 (3 pages), U.S. Appl. No. 14/147,330, filed Jan. 3, 2014.
Office Action (Final) dated Jun. 27, 2017 (27 pages), U.S. Appl. No. 14/147,330, filed Jan. 3, 2014.
Office Action (Final) dated May 5, 2017 (49 pages), U.S. Appl. No. 14/213,448, filed Mar. 14, 2014.
Advisory Action dated Jul. 10, 2017 (3 pages), U.S. Appl. No. 14/213,448, filed Mar. 14, 2014.
Office Action dated Sep. 5, 2017 (21 pages), U.S. Appl. No. 14/213,448, filed Mar. 14, 2014.

* cited by examiner

Your Email Address: [Please use a valid email address]

Confirm Email Address: [Email does not match]

Mobile Phone Number: [Please enter a valid phone number]
Why do I need to provide this?

Password: [Password error messages]

Confirm Password: [Password does not match]

☐ I want to receive email offers from MyWallet.com

☐ Yes, I agree to the MyWallet Terms and Conditions and Privacy Policies

[Create Wallet]

SYSTEMS AND METHODS FOR PROXY CARD AND/OR WALLET REDEMPTION CARD TRANSACTIONS

CROSS-REFERENCE TO RELATED APPLICATION

This application claims priority to: U.S. Provisional Patent Application Ser. No. 61/776,594, filed Mar. 11, 2013 and entitled "Systems and Methods for Proxy Card and/or Wallet Redemption Card Transactions" and U.S. Provisional Patent Application Ser. No. 61/779,334, filed Mar. 13, 2013 and entitled "Systems and Methods for Proxy Card and/or Wallet Redemption Card Transactions;" this application is a continuation-in part of U.S. patent application Ser. No. 14/147, 330, filed Jan. 3, 2014, and entitled "System and Method for Providing a Security Code" which claims priority to U.S. Provisional Patent Application Ser. No. 61/748,679, filed Jan. 3, 2013 and entitled "System for Managing CVV Information in Electronic Wallet" and U.S. Provisional Patent Application Ser. No. 61/799,500, filed Mar. 15, 2013 and entitled "System and Method for Providing a Security Code;" U.S. patent application Ser. No. 14/147,330 is a continuation-in part of U.S. patent application Ser. No. 13/483,711, filed May 30, 2012, and entitled "System for Payment via Electronic Wallet" which claims priority to U.S. Provisional Patent Application Ser. Nos. 61/491,791 and 61/491,813, both filed May 31, 2011 and entitled "A System for Payment via Electronic Wallet;" and U.S. Provisional Patent Application Ser. Nos. 61/496,397 and 61/496,404, both filed Jun. 13, 2011 and entitled "System, Method, and Apparatus for Creating and Distributing a Transaction Credit;" additionally, U.S. patent application Ser. No. 13/483,711 is a continuation-in-part of International Application Serial No. PCT/US11/40055, filed Jun. 10, 2011 and entitled, "Efficient Stored-Value Card Transactions" which claims priority to U.S. Provisional Patent Application Ser. Nos. 61/354,469, filed Jun. 14, 2010, 61/354,470, filed Jun. 14, 2010, and 61/360,327, filed Jun. 30, 2010; U.S. patent application Ser. No. 13/483,711 is also a continuation-in-part of International Application Serial No. PCT/US11/20570, filed Jan. 7, 2011 and entitled "A System for Processing, Activating and Redeeming Value Added Prepaid Cards," which claims priority to U.S. Provisional Patent Application Ser. No. 61/293,413, filed Jan. 8, 2010; U.S. patent application Ser. No. 13/483,711 also is a continuation-in-part of International Application Serial No. PCT/US11/49338, filed Aug. 26, 2011 and entitled "Prepaid Card with Savings Feature," which claims priority to U.S. Provisional Patent Application Ser. No. 61/377,800, filed Aug. 27, 2010 each of which is incorporated by reference herein in its entirety.

This application also incorporates by reference the entirety of the disclosure, the subject matter, and concepts of: U.S. patent application Ser. No. 13/938,176, filed Jul. 9, 2013, and entitled "Multi-Purpose Virtual Card Transaction Apparatuses, Methods and Systems"; U.S. patent application Ser. No. 12/538,083, filed Aug. 7, 2009, and entitled "Transaction Processing Platform for Facilitating Electronic Distribution of Plural Prepaid Services" which is a continuation of U.S. patent application Ser. No. 12/338,854, filed Dec. 18, 2008, which is a continuation of U.S. patent application Ser. No. 11/851,337, filed Sep. 6, 2007 (now U.S. Pat. No. 7,477,731), which is a continuation of U.S. patent application Ser. No. 11/007,662, filed Dec. 7, 2004 (now U.S. Pat. No. 7,280,644); U.S. patent application Ser. No. 13/040,074 filed Mar. 3, 2011 and entitled "System and Method for Electronic Prepaid Account Replenishment"; U.S. patent application Ser. No. 10/821,815, filed Apr. 9, 2004 and entitled "System and Method for Distributing Person Identification Numbers Over a Computer Network"; U.S. patent application Ser. No. 12/786,403, filed May 24, 2010, and entitled "System and Method for Distributing Person Identification Numbers Over a Computer Network"; U.S. patent application Ser. No. 12/711,211, filed Feb. 23, 2010, and entitled "System and Method for Distributing Person Identification Numbers Over a Computer Network"; and U.S. patent application Ser. No. 12/719,741, filed Mar. 8, 2010, and entitled "Systems and Methods for Personal Identification Number Distribution and Delivery."

BACKGROUND

The disclosure generally relates to the use of electronic stored-value cards in electronic transactions.

The electronic transaction market is currently filled with many types of credit cards, debit cards, stored value cards, and loyalty cards, all of which may be offered by different issuers, vendors, and providers. Some of the cards are tailored to be redeemed from a retailer while others may be redeemed by financial institutions. Other cards have promotions attached to them, e.g., loyalty cards. However, the increasing quantity and complexity of the cards makes organization and redemption increasingly difficult, thus potentially hindering the growth of the market. For example, a user may not know or remember that the user has a stored value card for a specific store during a purchase at that store because the user has too many stored value cards. Also, a user may not understand the various types of promotions available to him using a card in combination with a loyalty card, and as such, may not benefit from promotions applicable to the user's purchase. Historically, cards have been embodied in a tangible medium such as plastic, and thus are susceptible to loss, theft, or simply being left at home when needed. With the continued growth in card-based transactional offerings provided to consumers, many consumers are faced with the burdensome task of organizing, managing, tracking, transporting, and storing all of their credit, debit, stored-value, loyalty, and other types of merchant, vendor, and provider issued cards. What today's consumers need is a more efficient, secure, and effective way of accessing and using their card-related assets.

SUMMARY

A computer implemented method may comprise receiving authentication information of a proxy card, and associating the proxy card with an electronic wallet, wherein associating the proxy card with the electronic wallet allows secure access to the electronic wallet and the sources of value stored within the electronic wallet when the proxy card is presented at a point of sale. The proxy card may also be used to provide access to sources of value stored within a second electronic wallet stored within the first electronic wallet.

A system may comprise a proxy card comprising authentication information, and an electronic wallet associated with the proxy card, wherein the association of the electronic wallet with the proxy card allows secure access to the electronic wallet when the proxy card is presented at a point of sale.

A wallet redemption card may comprise a rewriteable magnetic stripe, a smart chip, a wireless communicator operably connected to the wallet redemption card or the smart chip thereon (e.g., NFC), and an interface operably connected between the rewriteable magnetic stripe and the smart chip.

BRIEF DESCRIPTION OF THE DRAWINGS

FIGS. 9A-D illustrates a series of user interface screens and prompts in accordance with at least one embodiment.

DETAILED DESCRIPTION

Figure 1:
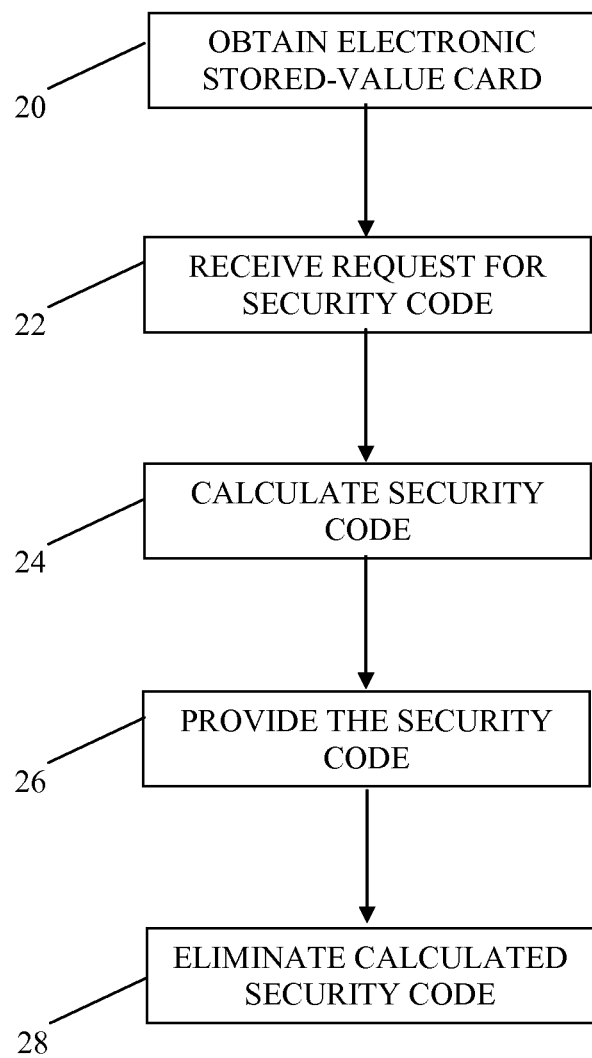
FIG. 1 is a flowchart depicting an embodiment of a method for providing a security code.

Disclosed herein are systems and methods for using stored-value cards, such as electronic stored-value cards (hereinafter "eSVC" or "eSVCs"). Particularly, the systems and methods disclosed herein may provide security codes necessary for payments transactions without violating any rules (e.g., laws, regulations, guidelines, or combinations thereof) prohibiting the storage of a security code for a card (e.g., an eSVC). Embodiments for the provision of a security code as disclosed herein may also be included in methods and systems for distributing open loop eSVCs. Additionally, the disclosed systems and methods may provide electronic stored-value card users a guided process for registering electronic stored-value cards into existing and new electronic wallets, and the use of value tokens in the electronic wallet(s) for electronic transactions.

Acquisition and/or purchase of a stored-value card (e.g., an electronic stored-value card) may involve an account vendor, a redeeming merchant, and an account issuer. In various embodiments, the account vendor, redeeming merchant and account issuer may be the same, different, or related entities. The point of sale where the electronic stored-value card is purchased and/or acquired is referred to herein as the account vendor or simply vendor. An entity that will accept value contained in the electronic stored-value card for business transactions, for example, as tender for a purchase, is referred to as a redeeming merchant. An entity that provides the financial backing and/or payment processing accessed via use of the electronic stored-value card is referred to as the account issuer, or simply, issuer. Account issuers may include direct issuers of electronic stored-value cards such as store-branded cards (e.g., Macy's, Target), and in some embodiments the account vendor may also be the account issuer and/or the redeeming merchant. Account issuers also may include banks, financial institutions, and processors such as VISA, Mastercard, American Express, etc., and electronic stored-value cards issued by such institutions may be readily accepted by a number of redeeming merchants to conduct transactions such as purchases. Account issuers may be in various industries, such as the entertainment, health, medical, pharmaceutical industries. For example, the account issuer may be a pharmaceutical company utilizing promotional electronic stored-value cards for pharmaceutical products. In some instances, an electronic stored-value card may be sold and/or issued at the same or different account vendor (e.g., account vendor is Store X or a different or unrelated Store Z). In such instances, the Store X branded electronic stored-value card may be issued by Store X, by Store Z, or by a third party such as bank or financial institution.

Under current rules (e.g., the VISA U.S.A. Cardholder Information Security Program Payment Application Best Practices and the Payment Card Industry Payment Application Data Security Standard) the needed security code may not be readily available to certain parties in a transaction. For example, when a user converts a physical card to an eSVC and discards the physical card, or when a user obtains an eSVC via other means described herein, the security code may be unavailable to the user, to the merchant, to an electronic wallet provider, to the eSVC processor, or combinations thereof when the user makes a transaction. As such, parties to a payment transaction, i.e., entities such as the processor of an eSVC, the merchant, the user, or any other entity which is prohibited from storing a security code may be dependent upon the availability of the security code from the issuer of the eSVC. The disclosed systems and methods allow for the calculation and provision of the security code of the eSVC by entities prohibited from storing and retaining the security code.

As used herein, "electronic-stored value card" or "eSVC" refers to an electronic embodiment of an account that may be used to transact business with a merchant willing to accept a value (e.g., points, miles, dollars, or any other measure of value such as a value token described hereinbelow), for example as tender for a purchase or discount for a purchase. As used herein, "electronic stored-value card" or "eSVC" may additionally or alternatively refer to an electronic embodiment of an account used for promotional and/or marketing purposes. The accounts may comprise credit accounts, debit accounts, gift accounts, telephone accounts, loyalty accounts, membership accounts, ticket accounts, entertainment accounts, sports accounts, prepaid accounts, discount accounts, healthcare accounts, the like, or combinations thereof. Such accounts may be associated with corresponding physical cards, including credit cards, debit cards, gift cards, telephone cards, loyalty cards, membership cards, ticket cards, entertainment cards, sports cards, prepaid cards, discount cards, healthcare cards, the like, or combinations thereof. Such accounts may additionally or alternatively comprise electronic accounts, such as electronic credit accounts, electronic debit accounts, electronic gift accounts, electronic telephone accounts, electronic loyalty accounts, electronic membership accounts, electronic ticket accounts, electronic entertainment accounts, electronic sports accounts, electronic prepaid accounts, electronic discount accounts, electronic healthcare accounts, the like, or combinations thereof. In embodiments, the value of an electronic stored-value card may be embodied as an "electronic value token" or "value token," both of which are described in detail hereinbelow.

As used herein, "card information" refers to information associated with an electronic stored-value card, associated with the account from which the electronic stored-value card is based, associated with the physical card with which the account is associated, or combinations thereof. The card information is used for an electronic transaction with a merchant using the electronic stored-value card. In embodiments, card information may comprise a cardholder name, card name, an account number (e.g., primary account number), a service code, a UPS, a phone number, an identification number (e.g., driver's license number, passport number, visa number, social security number, IP address), an expiration date, a billing address, or combinations thereof.

As used herein, a "security code" refers to a security code of a physical card or eSVC which is subject to the rules against storage and retention of such codes. In embodiments a security code may comprise a series of three or four digits which have been associated with a physical card or eSVC by the issuer. In embodiments a security code may comprise a series digits, letters, symbols, or combinations thereof. In embodiments, a security code is in addition to a card account number which is embossed or printed on the card and is also in addition to a personal identification number or password associated with the card. In embodiments, e.g., when the stored-value card (e.g., eSVC) is not present for physical inspection by a receiving merchant (e.g., an online or telephonic transaction), a security code serves to verify that a requested stored-value card (e.g., eSVC) transaction is a valid and/or authorized transaction request by a cardholder (e.g., a person rightfully possessing the card and/or authorized to request a transaction). In embodiments, a security code may comprise a card security code (CSC), a card verification value (CVV or CVV2), a card verification value code (CVVC), card verification code (CVC or CVC2), verification code (V-code or V code), card code verification (CCV), credit card ID (CID or CCID), or combinations thereof.

Disclosed herein are embodiments of methods for providing a security code of an electronic stored-value card. The various steps of the methods may be omitted, substituted, and rearranged except where specified hereinbelow. The methods described hereinbelow are applicable for open-loop stored-value cards and for closed-loop stored-value cards.

FIG. 1 shows a flow chart of an embodiment of a method disclosed herein. The embodiment of the method shown in FIG. 1 begins at block 20.

At block 20, an eSVC (e.g., eSVC 11 of FIG. 3) may be obtained, for example, by a user or consumer. The user or consumer may comprise a person or an automated device configured to make purchases under various conditions. The eSVC may be obtained by converting a physical card (e.g., credit cards, debit cards, gift cards, telephone cards, loyalty cards, membership cards, ticket cards, entertainment cards, sports cards, prepaid cards, discount cards, healthcare cards, the like, or combinations thereof) to a digital format (e.g., by submission of card information to an electronic wallet provider). Additionally or alternatively, the electronic stored-value card may be obtained (e.g., sent, received, delivered, fetched, acquired, presented, or combinations thereof) via various communication means, including SMS, email, video (e.g., YouTube, Vimeo, Skype, video message, or combinations thereof), instant message, a website, an online storage medium, a cloud storage system, other means for electronically obtaining the electronic stored-value card, or combinations thereof. For example, in an embodiment the eSVC may be an eGift delivered as a uniform resource locator ("URL") to a user through email or any other channel (e.g., SMS, Facebook wall post, and Twitter), the URL refers to an HTML page that displays the eGift with appropriate logo, terms and conditions, redemption instructions, card number, security code (CVV2) and expiration date. In an embodiment the eSVC may be an eCode delivered directly to the user (e.g., via SMS, Instant Message, and email) and includes a primary account number, security information, and an expiration date. In an embodiment, the eSVC may be directly provisioned to a user's electronic wallet. In embodiments, a user of the eSVC may use the obtained eSVC, for example, by clicking on a link to redeem the eSVC (e.g., in the form of a e-gift, discount, credit, promotional offer, or combinations thereof, etc.) at a merchant online transaction portal, by accessing the eSVC in an electronic wallet provided by an electronic wallet provider and stored by the electronic wallet provider, by using an eSVC identifier (e.g., number, promo code, discount code) via a transaction portal (e.g., of a merchant), or combinations thereof.

In embodiments, before the user obtains (e.g., receives, activates, redeems, or combinations thereof) the eSVC, the eSVC provider, the e-wallet provider, the eSVC processor, the eSVC issuer, the merchant, or combinations thereof may provide fraud mitigation. In an embodiment, providing fraud mitigation may comprise blocking access to an eSVC before a user views the eSVC, blocking access to an eSVC before a user activates the eSVC, or both. In an additional or alternative embodiment, providing fraud mitigation may comprise determining a digital fingerprint of a user device (e.g., user device 14), at the time a user attempts to view an eSVC to determine the risk associated with the user, the eSVC, or both. In an additional or alternative embodiment, providing fraud mitigation may comprise withholding the providing of the eSVC (e.g., withholding the delivery of redemption information for the eSVC). In an additional or alternative embodiment, providing fraud mitigation may comprise determining a geographic location of the eSVC and/or user and pausing the providing of the eSVC for a period of time determined by the geographic location. For example, the providing of the eSVC may be held for a longer period of time in geographic locations known or determined to be of high risk of fraud, and the providing of the eSVC may be held for a short period of time or for a period of time comprising zero in geographic locations known or determined to be of low or no risk of fraud.

In embodiments, before the user obtains (e.g., receives, activates, redeems, or combinations thereof) the eSVC, the eSVC provider, the e-wallet provider, the eSVC processor, the eSVC issuer, the merchant, or combinations thereof may not associate an account and/or value with the eSVC until the user takes an affirmative step to purchase the eSVC. For example, an account and/or value for the eSVC may not be associated with the eSVC until a user clicks on a URL, responds to an email, responds to an SMS, a voicemail, other notification, or combinations thereof to obtain the eSVC.

Various registration, authentication, allocation, and provisioning techniques may be performed prior to use of the eSVC which would be recognized by one skilled in the art with the aid of this disclosure. For example, the user may register the eSVC in one or more electronic wallets (e.g., electronic wallet 10 of FIG. 3). As used herein, an "electronic wallet" (also referred to as "e-wallet") may include an electronically maintained data file (e.g., maintained on a computer device of a provider of the electronic wallet) which may comprise an electronic stored-value card(s), authentication information, rules for use, sub-wallets (e.g., for separately maintaining electronic stored-value card-related information), and electronic value tokens (e.g., electronic representations of the monetary and/or other value associated with the electronic stored-value card-related information contained in the e-wallet/sub-wallet). In certain embodiments (e.g., as reflected in FIGS. 9A-D) a user may create an e-wallet, establish rules for the e-wallet, provision the e-wallet, and access the e-wallet to facilitate electronic transactions. Suitable processes for registering the eSVC are disclosed in International Application Serial No. PCT/US13/26501, filed on Feb. 15, 2013, and entitled "System and Method of Registering Stored-Value Cards Into Electronic Wallets." Examples of techniques for authenticating, allocating, and provisioning an eSVC are described hereinbelow.

To use the obtained eSVC, the user may be required to supply a security code of the eSVC. Because the eSVC is a virtual card, the user may not have the security code (e.g., the CVV2).

At block 22 a request for a security code is received. The security code provider and/or a computer device of a security code provider may receive the request for a security code, e.g., from a user of the eSVC, from a merchant, from an electronic wallet provider, or combinations thereof. For example, the user of the eSVC may send a request for a security code in order to use the eSVC for a purchase of a good or service from a merchant (e.g., in an open loop transaction network). To request the needed security code, the user may utilize a user device (e.g., user device 14 of FIG. 3) to contact a computer device (e.g., computer device 12, 13, 18, or 19 of FIG. 3) of the security code provider. In another example, a merchant (e.g., which is not also the eSVC issuer and cannot store the security code) may send a request for a security code in order to accept the eSVC for the purchase of a good or service by the user. To request the needed security code, the merchant may utilize a computer device (e.g., merchant computer device 16 of FIG. 3) to contact a computer device (e.g., computer device 12, 13, 18, or 19 of FIG. 3) of the security code provider. In another example, a provider of an eSVC and/or a user's electronic wallet (e.g., which is not also the eSVC issuer and cannot store the security code) may send a request for a security code, e.g., as an intermediary between the user of the eSVC and the security code provider. To request the needed security code, the electronic wallet provider may utilize a computer device (e.g., provider computer device 12 of FIG. 3) to contact a computer device (e.g., computer device 13, 18, or 19 of FIG. 3) of the security code provider. Before sending a request for the security code, the electronic wallet provider may identify the brand of the issuer of the eSVC, contact the issuer of the eSVC (e.g., via an issuer computer device 19 of FIG. 3), receive a card token from the issuer of the eSVC, and associate the card token with the request for a security code of the eSVC. A "card token" may comprise a fraud-prevention identifier, such as a temporary code or access key to the computer device of the issuer. In an embodiment, an entity (e.g., merchant, processor of the eSVC, provider of the eSVC and/or e-wallet) which needs to request the security is also the security code provider. In such an embodiment, the entity would internally request the security code, e.g., from a security code unit on the computer device of such an entity.

In embodiments, the security code provider may comprise an entity separate from a processor of the eSVC, the eSVC issuer, the electronic wallet provider, and the merchant. In alternative embodiments, the security code provider may comprise a party which is the provider of the user's electronic wallet, the merchant, the issuer of the eSVC, the processor of the eSVC, or combinations thereof. In embodiments, the security code provider may comprise a party which is: the processor of the eSVC; alternatively, the issuer of the eSVC; alternatively, the electronic wallet provider; alternatively, the merchant; alternatively, the electronic wallet provider and the merchant; alternatively, the electronic wallet provider and the processor of the eSVC; alternatively, the electronic wallet provider and the eSVC issuer; alternatively, eSVC issuer and the eSVC processor; alternatively, the eSVC issuer and the merchant; alternatively, the eSVC processor and the merchant; alternatively, the electronic wallet provider, the eSVC issuer, and the eSVC processor; alternatively, the electronic wallet provider, eSVC processor, and the merchant; alternatively, the electronic wallet provider, the eSVC issuer, and the merchant; alternatively, the merchant, the eSVC issuer, and the eSVC processor; alternatively, the electronic wallet provider, the eSVC issuer, the eSVC processor, and the merchant. In embodiments where the security code provider is also the eSVC issuer, rules may allow the entity to store and/or retain a security code; however, such an entity may also choose to calculate the security code according to the present disclosure or delegate such calculating responsibilities to an agent of the security code provider. In an embodiment, the security code provider is an entity which calculates the security code to provide the security code but does not store or retain the security code (or versions thereof, e.g., received-calculated security code, recalculated security code, etc.).

At block 24, the security code is calculated (e.g., by the security code provider). In an embodiment where the security code provider comprises the provider of the electronic wallet, the electronic wallet provider's computer device (e.g., computer device 12 of FIG. 3) may calculate the security code upon receiving a request for the security code (e.g., from the user device 14 of FIG. 3). In an embodiment where the security code provider comprises the processor of the eSVC, the processor's computer device (e.g., computer device 18 of FIG. 3) may calculate the security code upon receiving a request for the security code (e.g., from the electronic wallet provider's computer device 12 or from the user device 14 of FIG. 3).

In embodiments, calculating the security code by the security code provider may comprise calculating the security code using the card information of the eSVC, wherein the card information comprises a primary account number, an expiration date, and a security information of the eSVC. In embodiments where a party (e.g., the electronic wallet service provider) is allowed under regulations and laws to store the security code, the provider computer device 12 may store the calculated security code, e.g., in an electronic wallet.

Figure 3:
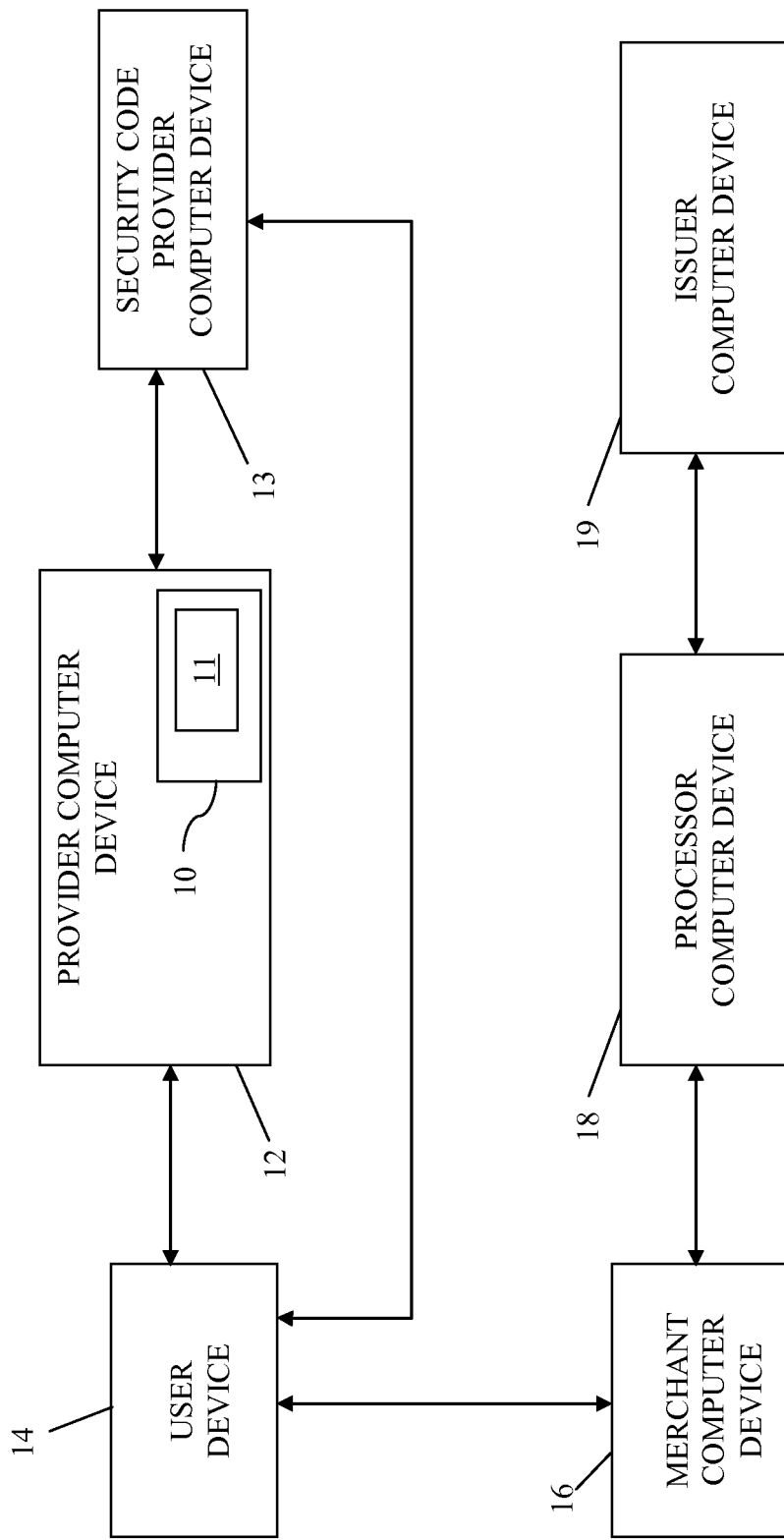
FIG. 3 is a schematic illustration of an embodiment of a system for providing a security code.

At block 26, the calculated security code is provided. In an embodiment, the electronic wallet provider (e.g., via a computer device 12 of FIG. 3) may provide (e.g., send) the calculated security code to user (e.g., via user device 14 of FIG. 3) (e.g., without communication with an eSVC processor). That is, in embodiments, the electronic wallet provider (e.g., via provider computer device 12 of FIG. 3)

may receive a calculated security code from the security code provider (e.g., via security code provider computer device 13 of FIG. 3, for example, in embodiments where the electronic wallet provider and security code provider are different entities) and provide the calculated security code to the user (e.g., via user device 14 of FIG. 3) without communication with the processor of the eSVC (e.g., via processor computer device 18 of FIG. 3), or the electronic wallet provider may calculate the security code (e.g., via provider computer device 12 of FIG. 3, for example, in embodiments where the security code provider comprises the electronic wallet provider) and provide the calculated security code to the user (e.g., via user device 14 of FIG. 3) without communication with the processor of the eSVC (e.g., via processor computer device 18 of FIG. 3). In additional or alternative embodiments, the processor of the eSVC (e.g., via computer device 18 of FIG. 3) may provide (e.g., send) the calculated security code to the provider of the electronic wallet (e.g., computer device 12 of FIG. 3), to the user (e.g., via user device 14 of FIG. 3), to the merchant (e.g., via merchant computer device 16 of FIG. 3), or combinations thereof. If the electronic wallet provider receives the calculated security code from the processor of the eSVC, the electronic wallet provider may then provide (e.g., send) the calculated security code to the user (e.g., via user device 14 of FIG. 3), to the merchant (e.g., via merchant computer device 16 of FIG. 3, or both. In embodiments, providing the security code may include displaying the security code to the user (e.g., via a display on the user device 14 of FIG. 3), to the merchant (e.g., via merchant computer device 16 of FIG. 3), or both. In embodiments, sending the security code may include various communication means, including SMS, email, video (e.g., YouTube, Vimeo, Skype, video message, or combinations thereof), instant message, a website, an online storage medium, a cloud storage system, other means for electronically obtaining the electronic stored-value card, or combinations thereof.

At block 28, the calculated security code is eliminated from databases of the security code provider. As used herein, the term "eliminate" includes the lack of retention and/or storage of a security code, a calculated security code, a received-calculated security code, a recalculated security code, or combinations thereof. Additionally or alternatively, the term "eliminate" include the erasure of a security code, a calculated security code, a received-calculated security code, a recalculated security code, or combinations thereof. In an embodiment where the electronic wallet provider is the security code provider, the electronic wallet provider may eliminate the calculated security code from databases of the electronic wallet provider. In an additional or alternative embodiment where the processor of the eSVC is the security code provider, the processor may eliminate the calculated security code from databases of the processor. In embodiments, the step of eliminating is performed by an entity which is not also the issuer of the eSVC.

Once the user or merchant receives the calculated security code, the user and/or merchant may then use the calculated security code in a transaction.

Figure 2:
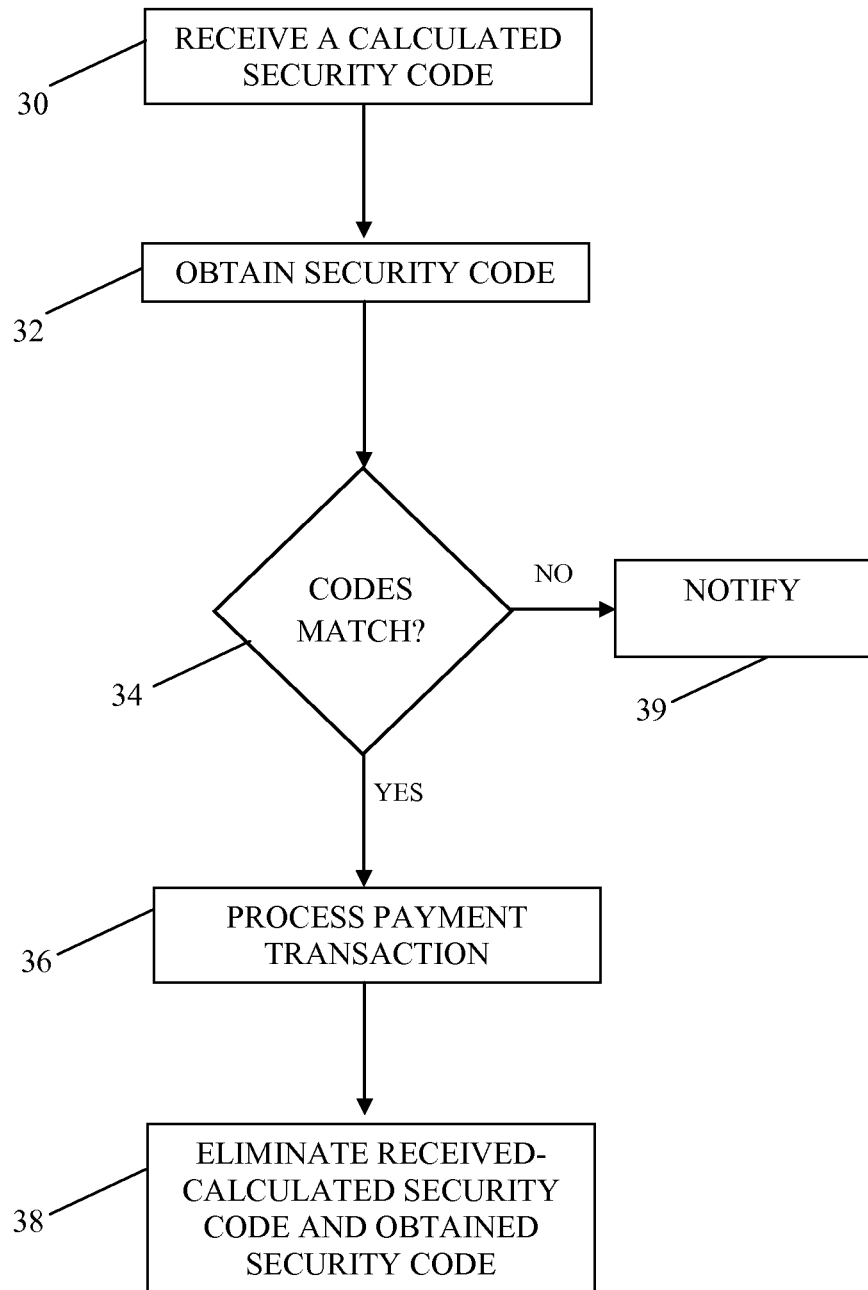
FIG. 2 is a flowchart depicting another embodiment of a method for providing a security code.

FIG. 2 shows a flow chart of another embodiment of a method disclosed herein. The embodiment of the method of FIG. 2 may be used in addition to or in the alternative to the method of FIG. 1. Moreover, any of the steps of the method of FIG. 2 may be used in combination or in the alternative with any of the steps of the method of FIG. 1, and vice versa. The embodiment of the method shown in FIG. 2 begins at block 30.

At block 30, a calculated security code is received (e.g., calculated according to block 24 of the method in FIG. 1). In the embodiments disclosed herein, the calculated security code which is received may be referred to as a "received-calculated security code." The calculated security code may be received by an electronic wallet provider, the issuer of the eSVC, the processor of the eSVC, the merchant, or combinations thereof. In an embodiment, the electronic wallet provider may receive the calculated security code. For example, a merchant (e.g., via merchant computer device 16 of FIG. 3), processor of the eSVC (e.g., via computer device 18), or both, may contact the electronic wallet provider and/or eSVC provider (e.g., via the computer device 12 of FIG. 3) to complete a transaction with a consumer or user and requiring the calculated security code of the eSVC. In an additional or alternative embodiment, the processor of the eSVC (e.g., via the computer device 18) may receive the calculated security code. For example, a merchant (e.g., merchant computer device 16 of FIG. 3), electronic wallet provider and/or eSVC provider (e.g., via computer device 12 of FIG. 3), or combinations thereof, may contact the processor (e.g., via the computer device 18 of FIG. 3) to complete a transaction with a consumer or user and requiring the calculated security code of the eSVC.

In embodiments, a request to process a payment transaction may be associated with or comprise the received-calculated security code, and the provider of the e-wallet and/or provider of the eSVC (e.g., via computer device 12), the processor of the eSVC (e.g., via computer device 18) may receive a request to process a payment transaction associated with the received-calculated security code. In embodiments where a party (e.g., an entity which includes the issuer of the eSVC) is allowed under rules, regulations and/or laws to store the security code, the party may store the received-calculated security code in a database.

At block 32, the security code is recalculated (e.g., by an entity which is the security code provider or by an entity which is not the security code provider). In embodiments, the provider of the e-wallet and/or eSVC (e.g., via computer device 12 of FIG. 3), the processor (e.g., via computer device 18), the merchant (e.g., via merchant computer device 16), or combinations thereof may recalculate the security code upon receiving a request to process a transaction with the eSVC (e.g., from the user, processor, merchant, or combinations thereof).

In embodiments, recalculating the security code by the security code provider may comprise recalculating the security code using the card information of the eSVC, wherein the card information comprises a primary account number, an expiration date, a security information, a service code, or combinations thereof, of the eSVC. In embodiments where a party (e.g., an entity which is also the issuer of the eSVC) is allowed to store the security code, the recalculated security code may be stored.

At block 34, a determination is made whether the received-calculated security code matches the recalculated security code. In embodiments, the provider of the eSVC and/or e-wallet, the eSVC processor, the merchant, or combinations thereof, may determine whether the received-calculated security code matches the recalculated security code. If the received-calculated security code matches the recalculated security code, then the payment transaction may be processed, e.g., as in block 36; additionally or alternatively, the codes may be eliminated, e.g., as in block 38, after transaction processing, before transaction processing, concurrently with transaction processing, or combinations thereof. If the received-calculated security code does not match the recalculated security code, then a party may be notified, e.g., as in block 39.

The step at block 34 is an example of a fraud mitigation technique performed before the user uses (e.g., redeems) a value on the eSVC for a payment transaction. In embodiments, before the user uses the eSVC, the eSVC provider, the e-wallet provider, the eSVC processor, the eSVC issuer, the merchant, or combinations thereof may provide fraud mitigation. In an additional or alternative embodiment, providing fraud mitigation may comprise determining a digital fingerprint of a user device (e.g., user device 14 of FIG. 3), at the time a user attempts to use a calculated security code to determine the risk associated with the user and/or user device, the eSVC, or both. In an additional or alternative embodiment, providing fraud mitigation may comprise determining a risk score associated with an eSVC and/or an e-wallet, wherein the risk score is based on, for example, metadata of a payment transaction request, transaction frequency, transaction type, transaction amount, number of transactions, transaction location (e.g., via geocoding techniques), or other risk assessment information known to one skilled in the art with the aid of this disclosure. In an additional or alternative embodiment, providing fraud mitigation may comprise withholding the processing of the payment transaction (e.g., withholding the redemption for the eSVC). In an additional or alternative embodiment, providing fraud mitigation may comprise determining a geographic location of the eSVC and/or user and pausing the processing of the payment transaction for a period of time determined by the geographic location. For example, the processing of the payment transaction may be held for a longer period of time in geographic locations known or determined to be of high risk of fraud, and the processing of the payment transaction may be held for a short period of time or for a period of time comprising zero in geographic locations known or determined to be of low or no risk of fraud.

At block 36, the payment transaction is processed. In an embodiment, the payment transaction may be processed by the provider of the eSVC and/or e-wallet (e.g., via computer device 12 of FIG. 3), by the merchant (e.g., via computer device 16 of FIG. 3), by the processor (e.g., via computer device 18 of FIG. 3), or combinations thereof. For example, the payment transaction may be processed by applying a value of the eSVC (e.g., currency, discount, promotion, points, rewards, a value token or electronic value token as described for the value token transaction processing systems described hereinbelow) to complete the transaction. In an embodiment, to process the payment transaction, authentication information of the request to process a payment transaction may be identified, a value associated with the eSVC (e.g., embodied as a value token, described below) may be identified, at least a portion of the value of the eSVC (e.g., value token) may be applied to at least a portion of a request to process a payment transaction, or combinations thereof. In an embodiment, identifying authentication information may comprise the method steps discussed for blocks 32, 34, and 38. In embodiments, processing the payment transaction may further comprise processing at least a portion of the request to process a payment transaction in a primary wallet of an e-wallet (e.g., electronic wallet 10 of FIG. 3), processing at least a portion of the request to process a payment transaction in a sub-wallet of an e-wallet (e.g., of electronic wallet 10 of FIG. 3), or both. In embodiment, a notification may be sent to the user, merchant, processor, and or provider that the payment has been processed, the received-calculated security code has been accepted, or both.

At block 38, the received-calculated security code and the recalculated security code are eliminated from databases of the security code provider. Elimination of the security codes may take place before processing of the payment transaction, after processing of the payment transaction, concurrent with the processing of the payment transaction, or combinations thereof. In an embodiment where the provider of the eSVC and/or e-wallet receives the calculated security code and/or recalculates the security code, the provider may eliminate the received-calculated security code and/or recalculated security code from databases of the provider (e.g., in computer device 12 of FIG. 3). In an embodiment where the processor receives the calculated security code and/or recalculates the security code, the processor may eliminate the received-calculated security code and/or recalculated security code from databases of the processor (e.g., in computer device 18 of FIG. 3). In an embodiment where the merchant receives the calculated security code and/or recalculates the security code, the merchant may eliminate the received-calculated security code and/or recalculated security code from databases of the merchant.

At block 39, a notification is sent. For example, the user (e.g., via user device 14 of FIG. 3) and the merchant (e.g., via merchant computer device 16 of FIG. 3) may be notified that the received-calculated security code is invalid. In an embodiment where a determination is made that the received-calculated security code does not match the recalculated security code, a notification may be sent, e.g., as a fraud prevention means.

FIG. 3 is a schematic illustration of an embodiment of a system according to the disclosure. As shown in FIG. 3, an embodiment of the disclosed system for providing a security code may comprise a user device 14 (e.g., of a user), a merchant computer device 16 (e.g., of a merchant), a provider computer device 12 (e.g., of an electronic-wallet provider and/or eSVC provider), a security code provider computer device 13 (e.g., of a security code provider), a processor computer device 18 (e.g., of an electronic stored-value card processor), an issuer computer device 19 (e.g., of an issuer of the eSVC), or combinations thereof.

While FIG. 3 shows one embodiment of a system according to the disclosure, it should be understood many system embodiments are disclosed. For example, many system embodiments may accomplish the embodiments of the methods for providing a security code disclosed hereinabove depending upon whether the security code provider computer device 13 comprises the same or different computer device as the provider computer device 12, merchant computer device 16, processor computer device 18, or issuer computer device 19.

In embodiments, the security code provider computer device 13 may comprise a device separate from the user device 14, the processor computer device 18, the issuer computer device 19, the provider computer device 12, and the merchant computer device 16. In alternative embodiments, the security code provider computer device 13 may comprise a device which is same device as merchant computer device 16, the provider computer device 12, the issuer of the eSVC computer device 19, the processor of the eSVC computer device 18, or combinations thereof. In embodiments, the security code provider computer device 13 may comprise a device which is: the processor computer device 18; alternatively, the issuer computer device 19; alternatively, the provider computer device 12; alternatively, the merchant computer device 16; alternatively, the provider computer device 12 and the merchant computer device 16; alternatively, the provider computer device 12 and the processor computer device 18; alternatively, the provider computer device 12 and the issuer computer device 19; alternatively, issuer computer device 19 and the processor computer device 18; alternatively, the issuer computer device 19 and the merchant computer device 16; alternatively, the processor computer device 18 and the merchant computer device 16; alternatively, the provider computer device 12, the issuer computer device 19, and the processor computer device 18; alternatively, the provider computer device 12, the processor computer device 18, and the merchant computer device 16; alternatively, the provider computer device 12, the issuer computer device 19, and the merchant computer device 16; alternatively, the merchant computer device 16, the issuer computer device 19, and the processor computer device 18; alternatively, the provider computer device 18, the issuer computer device 19, the processor computer device 18, and the merchant computer device 16. In embodiments where the security code provider is also the eSVC issuer, rules may allow the entity to store and/or retain a security code; however, such an entity may also choose to calculate the security code according to the present disclosure or delegate such calculating responsibilities to an agent of the security code provider. In an embodiment, the security code provider is an entity which calculates the security code to provide the security code but does not store or retain the security code (or versions thereof, e.g., received-calculated security code, recalculated security code, etc.).

The components of the system of FIG. 3 may be operably connected via one or more networks (e.g., broadband, optical, Wi-Fi, Bluetooth, NFC, cellular, satellite, cloud, card processing network, banking network, a local area network, the World Wide Web for Internet, non-cellular mobile phone network, a land-line network, Public Switched Telephone Network (PSTN), a dedicated communication line, other networks for transferring electronic information, or combinations thereof). Particularly, the user device 14 may be operably connected to the provider computer device 12, the security code provider computer device 13, the merchant computer device 16, the processor computer device 18, the issuer computer device 19, or combinations thereof, via the network; the merchant computer device 16 may be operably connected to the user device 14, the security code provider computer device 13, the processor computer device 18, the provider computer device 12, the issuer computer device 19, or combinations thereof, via the network; the provider computer device 12 may be operably connected to the user device 14, the merchant computer device 16, the security code provider computer device 13, the processor computer device 18, the issuer computer device 19, or combinations thereof, via the network; the processor computer device 18 may be operably connected to the user device 14, provider computer device 12, security code provider computer device 13, the merchant computer device 16, the issuer computer device 19, or combinations thereof, via the network; or combinations thereof. When any of the computer devices 13, 14, 16, 18, or 19 of the system is operably connected to the provider computer device 12, said devices 13, 14, 16, 18, or 19 may additionally be operably connected to an e-wallet on the provider computer device 12.

The security code provider computer device 13 may comprise one or more computer devices (e.g., a computer, a tablet, a smartphone, a cloud computing system, a server, or combinations thereof), which is suitable for performing the functions described herein.

In embodiments, the security code provider computer device 13 may be configured to receive a request for a security code of an eSVC (e.g., from the provider computer device 12, the user device 14, the merchant computer device 16, the processor computer device 18, the issuer computer device 19, or combinations thereof); to calculate the security code (e.g., using at least a portion of the card information of the eSVC); to provide (e.g., send, display, etc.) the calculated security code in response to the request for a security code (e.g., to the provider computer device 12, the user device 14, the merchant computer device 16, the processor computer device 18, the issuer computer device 19, or combinations thereof); to eliminate the calculated security code from the security code provider computer device 13 (e.g., from any database/datastore of the security code provider computer device 13); to receive the calculated security code (e.g., from the provider computer device 12, the user device 14, the processor computer device 18, the merchant computer device 16, the issuer computer device 19, or combinations thereof), for example, as part of a request to process a payment transaction; to recalculate the security code of the eSVC (e.g., eSVC 11); to determine whether the received-calculated security code (e.g., received from the provider computer device 12, the user device 14, the merchant computer device 16, the processor computer device 18, the issuer computer device 19, or combinations thereof) matches the recalculated security code; to eliminate the received-calculated security code and recalculated security code from the security code provider computer device 13 (e.g., from any database/datastore of the security code provider computer device 13); to receive (e.g., from the provider computer device 12, the user device 14, merchant computer device 16, processor computer device 18, issuer computer device 19, or combinations thereof) a request to process a payment transaction (e.g., against an eSVC 11, for example, in e-wallet 10); to identify authentication information of the request to process a payment transaction; to identify a value (e.g., value token, currency, rewards, points, discount, promotion, combinations thereof, etc.) associated with the eSVC; to apply at least a portion of the value to at least a portion of the request to process the payment transaction; to provide fraud mitigation; to block access to an eSVC before a user views the eSVC; to block access to an eSVC before a user activates the eSVC, to determine a digital fingerprint of a user device (e.g., user device 14), at the time a user attempts to view an eSVC to determine the risk associated with the user, the eSVC, or both; to withhold the providing of the eSVC (e.g., withholding the delivery of redemption information for the eSVC); to determine a geographic location of the eSVC and/or user; to pause the providing of the eSVC for a period of time determined by the geographic location, or combinations thereof.

In additional embodiments, in order to calculate and/or recalculate the security code, the security code provider computer device 13 may use a primary account number, an expiration date, a service code, a security information (e.g., magnetic stripe security code), or combinations thereof, of the eSVC (e.g., eSVC 11). In embodiments, the security code provider computer device 13 may be configured to process at least a portion of a request to process a payment transaction via a primary wallet of an electronic wallet 10, the security code provider computer device 13 may be configured to process at least a portion of a request to process a payment transaction via a sub-wallet of an electronic wallet 10, or both (primary wallets and sub-wallets are discussed hereinbelow).

The user device 14 may comprise a personal computer, a tablet, a smartphone, a cloud computing system, a server, or combinations thereof. The device used by the user or consumer to transact business with the merchant computer device 16 may be the same or different device from the user device 14. In embodiment, the user or consumer may transact business using the user device 14; alternatively, the user or consumer may use the user device 14 to request and receive a calculated security code and use other means (e.g., a computer device separate from the user device 14) to transact business, e.g., with a merchant via merchant computer device 16). In an embodiment, the user device 14 may be used to convey transaction information to the provider computer device 12, security code provider computer device 13, merchant computer device 16, processor computer device 18, issuer computer device 19, or combinations thereof. In embodiments, a user or consumer may interact (e.g., use the eSVC) via the user device 14 with the provider computer device 12, for example, to add or remove eSVCs (e.g., in an e-wallet 10), add value to an eSVC (e.g., eSVC 11), manage an eSVC embodied as a value token (described hereinbelow, register an eSVC, activate an eSVC, transfer or exchange an eSVC for another eSVC (e.g., in an embodiment where the provider computer device 12 is also a merchant computer device 16), transfer eSVCs to an e-wallet or a primary wallet or a sub-wallet, or combinations thereof. In embodiments, a user or consumer may interact (e.g., use an obtained eSVC) via the user device 14 with a transaction portal (i.e., online merchant portal to redeem a gift, discount, credit, reward, points, etc.) without interaction with an e-wallet hosted by an e-wallet provider. Embodiments of the disclosed system may further comprise an interface (e.g., associated with the user device 14) through which a viewer may access one or more eSVCs (e.g., eSVC 11). In an embodiment, a user may interact via the user device 14 with the electronic wallet 10 to obtain a security code of the eSVC 11 in the electronic wallet 10.

In embodiments, the security code provider computer device 13 may comprise the user device 14. In such embodiments, the user device 14 may be configured to receive a request for a security code of an eSVC (e.g., from the provider computer device 12, the merchant computer device 16, the processor computer device 18, the issuer computer device 19, or combinations thereof); to calculate the security code (e.g., using at least a portion of the card information of the eSVC); to provide (e.g., send, display, etc.) the calculated security code in response to the request for a security code (e.g., to the provider computer device 12, the merchant computer device 16, the processor computer device 18, the issuer computer device 19, or combinations thereof); to eliminate the calculated security code from the user device 14 (e.g., from any database/datastore of the user device 14); to receive the calculated security code (e.g., from the provider computer device 12, the processor computer device 18, the merchant computer device 16, the issuer computer device 19, or combinations thereof), for example, as part of a request to process a payment transaction; to recalculate the security code of the eSVC (e.g., eSVC 11); to determine whether the received-calculated security code (e.g., received from the provider computer device 12, the merchant computer device 16, the processor computer device 18, the issuer computer device 19, or combinations thereof) matches the recalculated security code; to eliminate the received-calculated security code and recalculated security code from the user device 14 (e.g., from any database/datastore of the user device 14); to receive (e.g., from the provider computer device 12, merchant computer device 16, processor computer device 18, issuer computer device 19, or combinations thereof) a request to process a payment transaction (e.g., against an eSVC 11, for example, in e-wallet 10); to identify authentication information of the request to process a payment transaction; to identify a value (e.g., value token, currency, rewards, points, discount, promotion, combinations thereof, etc.) associated with the eSVC; to apply at least a portion of the value to at least a portion of the request to process the payment transaction; to provide fraud mitigation; to block access to an eSVC before a user views the eSVC; to block access to an eSVC before a user activates the eSVC; to determine a digital fingerprint of a user device (e.g., user device 14), at the time a user attempts to view an eSVC to determine the risk associated with the user, the eSVC, or both; to withhold the providing of the eSVC (e.g., withholding the delivery of redemption information for the eSVC); to determine a geographic location of the eSVC and/or user; to pause the providing of the eSVC for a period of time determined by the geographic location; or combinations thereof.

In additional embodiments, in order to calculate and/or recalculate the security code, the user device 14 may use a primary account number, an expiration date, a service code, a security information (e.g., magnetic stripe security code), or combinations thereof, of the eSVC (e.g., eSVC 11).

The merchant computer device 16 may comprise a computer device (e.g., a point-of-sale device) of a merchant. The merchant computer device 16 may have any suitable configuration for performing the functions disclosed herein (e.g., a personal computer, a tablet, a smartphone, a cloud computing system, a server, or combinations thereof). In embodiments, the merchant computer device 16 may perform transactions with a computer device (e.g., user device 14) of a consumer, for example, in a transaction (e.g., online, telephonically, or both) requiring the security code for an eSVC. The merchant computer device 16 may communicate with the processor computer device to complete a transaction with a user or consumer.

In embodiments, the security code provider computer device 13 may comprise the merchant computer device 16. In such embodiments, the merchant computer device 16 may be configured to receive a request for a security code of an eSVC (e.g., from the provider computer device 12, the user device 14, the processor computer device 18, the issuer computer device 19, or combinations thereof); to calculate the security code (e.g., using at least a portion of the card information of the eSVC); to provide (e.g., send, display, etc.) the calculated security code in response to the request for a security code (e.g., to the provider computer device 12, the user device 14, the processor computer device 18, the issuer computer device 19, or combinations thereof); to eliminate the calculated security code from the merchant computer device 16 (e.g., from any database/datastore of the merchant computer device 16); to receive the calculated security code (e.g., from the provider computer device 12, the user device 14, the processor computer device 18, the issuer computer device 19, or combinations thereof), for example, as part of a request to process a payment transaction; to recalculate the security code of the eSVC (e.g., eSVC 11); to determine whether the received-calculated security code (e.g., received from the provider computer device 12, the user device 14, the processor computer device 18, the issuer computer device 19, or combinations thereof) matches the recalculated security code; to eliminate the received-calculated security code and recalculated security code from the merchant computer device 16 (e.g., from any database/datastore of the merchant computer device 16); to receive (e.g., from the provider computer device 12, the user device 14, processor computer device 18, issuer computer device 19, or combinations thereof) a request to process a payment transaction (e.g., against an eSVC 11, for example, in e-wallet 10); to identify authentication information of the request to process a payment transaction; to identify a value (e.g., value token, currency, rewards, points, discount, promotion, combinations thereof, etc.) associated with the eSVC; to apply at least a portion of the value to at least a portion of the request to process the payment transaction; to provide fraud mitigation; to block access to an eSVC before a user views the eSVC; to block access to an eSVC before a user activates the eSVC; to determine a digital fingerprint of a user device (e.g., user device 14), at the time a user attempts to view an eSVC to determine the risk associated with the user, the eSVC, or both; to withhold the providing of the eSVC (e.g., withholding the delivery of redemption information for the eSVC); to determine a geographic location of the eSVC and/or user; to pause the providing of the eSVC for a period of time determined by the geographic location; or combinations thereof.

In additional embodiments, in order to calculate and/or recalculate the security code, the merchant computer device 16 may use a primary account number, an expiration date, a service code, a security information (e.g., magnetic stripe security code), or combinations thereof, of the eSVC (e.g., eSVC 11). In embodiments, the merchant computer device 16 may be configured to process at least a portion of a request to process a payment transaction via a primary wallet of an electronic wallet 10, the merchant computer device 16 may be configured to process at least a portion of a request to process a payment transaction via a sub-wallet of an electronic wallet 10, or both (primary wallets and sub-wallets are discussed hereinbelow).

The provider computer device 12 may be a computer device of a provider of one or more electronic wallets (e.g., electronic wallet 10), a provider of an eSVC (e.g., eSVC 11), or both. The provider computer device 12 may have any suitable configuration for performing the functions disclosed herein (e.g., a personal computer, a tablet, a smartphone, a cloud computing system, a server, or combinations thereof). FIG. 3 shows the provider computer device 12 may comprise an electronic wallet 10. In embodiments, the provider computer device 12 may further comprise an electronic value token transaction processing system, for example, of an embodiment described in FIGS. 4A-B, and 5A-C hereinbelow. In embodiments, the provider computer device 12 may further comprise a database (e.g., database/datastore 180 as described for the figures hereinbelow) to store one or more eSVCs (e.g., eSVC 11), one or more electronic wallets (e.g., electronic wallet 10), at least a portion of the card information associated with each eSVC, or combinations thereof.

FIG. 3 shows an embodiment of the system comprising one electronic wallet 10. In alternative embodiments, the system may comprise a first electronic wallet and a second electronic wallet. In additional or alternative embodiments, the electronic wallet 10 may comprise any number of sub-wallets as described herein below. Electronic wallets (e.g., electronic wallet 10) may offer a variety of services, including storing, managing, and facilitating the redemption of value (e.g., monetary, discount, promotional, value tokens, rewards, etc.) of eSVCs. One or more electronic stored-value cards (hereinafter "eSVC" or "eSVCs") (e.g., eSVC 11) may be associated (e.g., registered) with the one or more electronic wallets. For example, a first eSVC (e.g., eSVC 11) and a second eSVC may be registered in electronic wallet 10. Alternatively, a first eSVC (e.g., eSVC 11) may be registered in a first electronic wallet and a second eSVC may be registered in a second electronic wallet. In additional or alternative embodiments, one or more eSVCs may be associated (e.g., registered) in a sub-wallet of an electronic wallet (registration techniques, methods, and processes are discussed hereinbelow). Embodiments of the electronic wallet 10 are described in detail hereinbelow, for example, in the discussion for FIG. 4B.

In embodiments, the security code provider computer device 13 is the provider computer device 12. In such embodiments, the provider computer device 12 may be configured to receive a request for a security code of an eSVC (e.g., from the user device 14, the merchant computer device 16, the processor computer device 18, the issuer computer device 19, or combinations thereof); to calculate the security code (e.g., using at least a portion of the card information of the eSVC); to provide (e.g., send, display, etc.) the calculated security code in response to the request for a security code (e.g., to the user device 14, the merchant computer device 16, the processor computer device 18, the issuer computer device 19, or combinations thereof); to eliminate the calculated security code from the provider computer device 12 (e.g., from any database/datastore of the provider computer device 12); to receive the calculated security code (e.g., from the user device 14, the processor computer device 18, the merchant computer device 16, the issuer computer device 19, or combinations thereof), for example, as part of a request to process a payment transaction; to recalculate the security code of the eSVC (e.g., eSVC 11); to determine whether the received-calculated security code (e.g., received from the user device 14, the merchant computer device 16, the processor computer device 18, the issuer computer device 19, or combinations thereof) matches the recalculated security code; to eliminate the received-calculated security code and recalculated security code from the provider computer device 12 (e.g., from any database/datastore of the provider computer device 12); to receive (e.g., from the user device 14, merchant computer device 16, processor computer device 18, issuer computer device 19, or combinations thereof) a request to process a payment transaction (e.g., against an eSVC 11, for example, in e-wallet 10); to identify authentication information of the request to process a payment transaction; to identify a value (e.g., value token, currency, rewards, points, discount, promotion, combinations thereof, etc.) associated with the eSVC; to apply at least a portion of the value to at least a portion of the request to process the payment transaction; to provide fraud mitigation; to block access to an eSVC before a user views the eSVC; to block access to an eSVC before a user activates the eSVC; to determine a digital fingerprint of a user device (e.g., user device 14), at the time a user attempts to view an eSVC to determine the risk associated with the user, the eSVC, or both; to withhold the providing of the eSVC (e.g., withholding the delivery of redemption information for the eSVC); to determine a geographic location of the eSVC and/or user; to pause the providing of the eSVC for a period of time determined by the geographic location; or combinations thereof.

In additional embodiments, in order to calculate and/or recalculate the security code, the provider computer device 12 may use a primary account number, an expiration date, a service code, a security information (e.g., magnetic stripe security code), or combinations thereof, of the eSVC (e.g., eSVC 11). In embodiments, the provider computer device 12 may be configured to process at least a portion of a request to process a payment transaction via a primary wallet of an electronic wallet 10, the provider computer device 12 may be configured to process at least a portion of a request to process a payment transaction via a sub-wallet of an electronic wallet 10, or both (primary wallets and sub-wallets are discussed hereinbelow).

The processor computer device 18 may comprise a computer device of a processor of an electronic stored-value card (e.g., eSVC 11). The processor computer device 18 may have any suitable configuration for performing the functions disclosed herein (e.g., a personal computer, a tablet, a smartphone, a cloud computing system, a server, or combinations thereof).

In embodiments, the security code provider computer device 13 is the processor computer device 18. In such embodiments, the processor computer device 18 may be configured to receive a request for a security code of an eSVC (e.g., from the provider computer device 12, the user device 14, the merchant computer device 16, the issuer computer device 19, or combinations thereof); to calculate the security code (e.g., using at least a portion of the card information of the eSVC); to provide (e.g., send, display, etc.) the calculated security code in response to the request for a security code (e.g., to the provider computer device 12, the user device 14, the merchant computer device 16, the issuer computer device 19, or combinations thereof); to eliminate the calculated security code from the processor computer device 18 (e.g., from any database/datastore of the processor computer device 18); to receive the calculated security code (e.g., from the provider computer device 12, the user device 14, the merchant computer device 16, the issuer computer device 19, or combinations thereof), for example, as part of a request to process a payment transaction; to recalculate the security code of the eSVC (e.g., eSVC 11); to determine whether the received-calculated security code (e.g., received from the provider computer device 12, the user device 14, the merchant computer device 16, the issuer computer device 19, or combinations thereof) matches the recalculated security code; to eliminate the received-calculated security code and recalculated security code from the processor computer device 18 (e.g., from any database/datastore of the processor computer device 18); to receive (e.g., from the provider computer device 12, the user device 14, merchant computer device 16, issuer computer device 19, or combinations thereof) a request to process a payment transaction (e.g., against an eSVC 11, for example, in e-wallet 10); to identify authentication information of the request to process a payment transaction; to identify a value (e.g., value token, currency, rewards, points, discount, promotion, combinations thereof, etc.) associated with the eSVC; to apply at least a portion of the value to at least a portion of the request to process the payment transaction; to provide fraud mitigation; to block access to an eSVC before a user views the eSVC; to block access to an eSVC before a user activates the eSVC; to determine a digital fingerprint of a user device (e.g., user device 14), at the time a user attempts to view an eSVC to determine the risk associated with the user, the eSVC, or both; to withhold the providing of the eSVC (e.g., withholding the delivery of redemption information for the eSVC); to determine a geographic location of the eSVC and/or user; to pause the providing of the eSVC for a period of time determined by the geographic location; or combinations thereof.

In additional embodiments, in order to calculate and/or recalculate the security code, the processor computer device 18 may use a primary account number, an expiration date, a service code, a security information (e.g., magnetic stripe security code), or combinations thereof, of the eSVC (e.g., eSVC 11). In embodiments, the processor computer device 18 may be configured to process at least a portion of a request to process a payment transaction via a primary wallet of an electronic wallet 10, the processor computer device 18 may be configured to process at least a portion of a request to process a payment transaction via a sub-wallet of an electronic wallet 10, or both (primary wallets and sub-wallets are discussed hereinbelow).

In embodiments, the processor computer device 18 may comprise a database (e.g., the database/datastore 180 described herein below) to store at least a portion of the card information associated with each eSVC.

The issuer computer device 19 may comprise a computer device of an issuer of an electronic stored-value card (e.g., eSVC 11). The issuer computer device 19 may have any suitable configuration for performing the functions disclosed herein (e.g., a personal computer, a tablet, a smartphone, a cloud computing system, a server, or combinations thereof).

In embodiments, the security code provider computer device 13 is the issuer computer device 19. In such embodiments, the issuer computer device 19 may be configured to receive a request for a security code of an eSVC (e.g., from the provider computer device 12, the user device 14, the merchant computer device 16, the processor computer device 18, or combinations thereof); to calculate the security code (e.g., using at least a portion of the card information of the eSVC); to provide (e.g., send, display, etc.) the calculated security code in response to the request for a security code (e.g., to the provider computer device 12, the user device 14, the merchant computer device 16, the processor computer device 18, or combinations thereof); to eliminate the calculated security code from the issuer computer device 19 (e.g., from any database/datastore of the issuer computer device 19); to receive the calculated security code (e.g., from the provider computer device 12, the user device 14, the processor computer device 18, the merchant computer device 16, or combinations thereof), for example, as part of a request to process a payment transaction; to recalculate the security code of the eSVC (e.g., eSVC 11); to determine whether the received-calculated security code (e.g., received from the provider computer device 12, the user device 14, the merchant computer device 16, the processor computer device 18, or combinations thereof) matches the recalculated security code; to eliminate the received-calculated security code and recalculated security code from the issuer computer device 19 (e.g., from any database/datastore of the issuer computer device 19); to receive (e.g., from the provider computer device 12, the user device 14, merchant computer device 16, processor computer device 18, or combinations thereof) a request to process a payment transaction (e.g., against an eSVC 11, for example, in e-wallet 10); to identify authentication information of the request to process a payment transaction; to identify a value (e.g., value token, currency, rewards, points, discount, promotion, combinations thereof, etc.) associated with the eSVC; to apply at least a portion of the value to at least a portion of the request to process the payment transaction; to provide fraud mitigation; to block access to an eSVC before a user views the eSVC; to block access to an eSVC before a user activates the eSVC; to determine a digital fingerprint of a user device (e.g., user device 14), at the time a user attempts to view an eSVC to determine the risk associated with the user, the eSVC, or both; to withhold the providing of the eSVC (e.g., withholding the delivery of redemption information for the eSVC); to determine a geographic location of the eSVC and/or user; to pause the providing of the eSVC for a period of time determined by the geographic location; or combinations thereof.

In additional embodiments, in order to calculate and/or recalculate the security code, the issuer computer device 19 may use a primary account number, an expiration date, a service code, a security information (e.g., magnetic stripe security code), or combinations thereof, of the eSVC (e.g., eSVC 11). In embodiments, the issuer computer device 19 may be configured to process at least a portion of a request to process a payment transaction via a primary wallet of an electronic wallet 10, the issuer computer device 19 may be configured to process at least a portion of a request to process a payment transaction via a sub-wallet of an electronic wallet 10, or both (primary wallets and sub-wallets are discussed hereinbelow).

An exemplary system for providing a security code for an electronic stored-value card is depicted in FIG. 3. A user having user device 14 may obtain an eSVC from the provider computer device 12, for example, via an e-wallet of the user stored on the provider computer device 12 which is accessible by a device (e.g., the user device 14) of the user, or via a delivery of the eSVC to the user device 14 (e.g., by SMS, email, video (e.g., YouTube, Vimeo, Skype, video message, or combinations thereof), instant message, a website, an online storage medium, a cloud storage system, other means for electronically obtaining the electronic stored-value card, or combinations thereof). Before the eSVC is obtained, the provider computer device 12, security code provider computer device 13, merchant computer device 16, processor computer device 18, issuer computer device 19, or combinations thereof may provide fraud mitigation. In embodiments, fraud mitigation may comprise blocking access to an eSVC before a user views the eSVC, e.g., on user device 14; blocking access to an eSVC before a user activates the eSVC; determining a digital fingerprint of a user device (e.g., user device 14), at the time a user attempts to view an eSVC to determine the risk associated with the user, the eSVC, or both; withholding the providing of the eSVC (e.g., withholding the delivery of redemption information for the eSVC); determining a geographic location of the eSVC and/or user; pausing the providing of the eSVC for a period of time determined by the geographic location; or combinations thereof.

A user or consumer having an eSVC may obtain a security code, e.g., a CVV2, for the eSVC in a number of ways. For example, if the user received the eSVC as a URL, e.g., in an email as an eGift, the user may select/activate the URL which opens a webpage hosted by the eSVC provider. The URL may contain an identifier of the eSVC for the provider webpage which facilitates a display of relevant data, e.g., logo, terms and conditions, redemption instructions, card number, security information, and expiration date, etc., for the eSVC. The webpage may then communicate with an API of the eSVC provider to retrieve the security code, e.g., CVV2, for the webpage-displayed eSVC. As such, upon receipt of the eSVC, the user may initiate a process for acquiring the eSVC's security code necessary for future transactions. Similarly, if the eSVC user/consumer received the eSVC as an eCode, e.g., delivered directly to the user (e.g., via SMS, Instant Message, and email) the eCode message may provide the user with link or instructions for accessing the eSVC provider's system for obtaining the eSVC's security code in a manner similar to the manner described concerning the above-eGift embodiment. Further, in an embodiment wherein the eSVC is directly provisioned to the user's electronic wallet, the e-wallet provisioning action may induce the e-wallet to provide the user with link or instructions for accessing the eSVC provider's system for obtaining the eSVC's security code in a manner similar to the manner described concerning the above-eGift embodiment.

In another example, when a user desires a transaction with a merchant device 16 (e.g., a website, Internet portal, or other transaction point described herein or known to those skilled in the art with the aid of this disclosure), and the user has not yet received the eSVC's security code, the user may use the user device 14 to request a security code for the eSVC by contacting the provider computer device 12 or the security code provider computer device 13 (e.g., in embodiments where provider computer device 12 is not of the security code provider). If the user uses the user device 14 to request the security code for the eSVC by contacting the provider computer device 12, the provider computer device 12 may calculate the security code (e.g., in embodiments where the provider computer device 12 is of the security code provider), or the provider computer device 12 may forward the request or make a request for the security code of the eSVC by contacting the security code provider computer device 13 (e.g., which can be the computer device of an independent entity, of the merchant, of the eSVC processor, of the eSVC issuer, or combinations thereof). As discussed above, the disclosure contemplates embodiments where the merchant computer device 16, processor computer device 18, and/or issuer computer device 19 make a request for the security code of the eSVC which the user uses for the transaction.

After the security code request is received, the security code provider computer device 13 calculates the security code of the eSVC, for example, using the primary account number, expiration date, service code, available security information (e.g., from the magnetic stripe of the physical card of the eSVC), or combinations thereof. In an embodiment, a CVV2 may be calculated by encrypting the primary account number, the expiration date, and security code with encryption keys. The security code provider computer device 13 then sends the calculated security code to the provider computer device 12 (e.g., in embodiments where the user request was forwarded to the security code provider computer device 13 by the provider computer device 12) or sends the calculated security code to the user device 14. In embodiments where the provider computer device 12 receives the calculated security code, the provider computer device 12 then sends the calculated security code to the user device 14.

The security code provider computer device 13 may eliminate the calculated security code from some, selected, or all databases of the security code provider computer device 13. The provider computer device 12 may eliminate the calculated security code from some, selected, or all databases of the provider computer device 13.

After the user device 14 receives the calculated security code the calculated security code may be used in the transaction with the merchant computer device 16. The merchant computer device 16 may require various inputs to capture eSVC information from the user device 14. For example, the merchant computer device 16 may require an account number, billing address, expiration date, and the calculated security code of the eSVC. The merchant computer device 16 may establish a secure communication with the eSVC processing system on processor computer device 18 and request to process the payment transaction. The communication between the merchant computer device 16 and the processor computer device 18 may be encrypted for security. The processor computer device 18 may comprise a transaction routing service, an internal card processing service, a settlement service, a product master catalog service, and an inventory management service. The transaction routing service of the processor computer device 18 may communicate with the merchant computer device 16 as well as third party card processors. The transaction routing service may receive the collected eSVC information (i.e., account number, expiration date, name on the eSVC, calculated security code) from the merchant computer device 16 and determine whether to forward the request to process a payment transaction to a third party processor (e.g., to forward the request) or to process the request to process the payment transaction for the eSVC 11, for example, by comparing an information of the eSVC 11 to information in a master catalog service to determine whether the eSVC 11 is a product for which the processor computer device 18 acts as the processor. Thus, for example, if the eSVC is a stored-value card processed by the processor computer device 18, then the transaction routing service may forward the request to process a payment transaction to the internal card processing service within the processor computer device 18 or is one processed by a third party eSVC processor. If the eSVC 11 is processed by a third party processors, the transaction routing service routes the activation request to the third party processor for payment processing. The transaction routing service of the processor computer device 18 may receive a payment response from the appropriate third party processors and may transmit the payment response back to the merchant computer device 16.

If the transaction routing service determines that the eSVC 11 is one that is processed by the processor computer device 18 (and not merely a request to process a payment for which the processor computer device 18 serves as a routing service), the processor computer device 18 may transfer the request to process a payment transaction from the merchant computer device 16 to the internal card processing service of the processor computer device 18 which uses the information contained in the request (e.g., account number, name on the eSVC, expiration date, the received-calculated security code) to determine whether to process the eSVC 11. For example, the processor computer device 18 may recalculate the security code of the eSVC 11 and determine whether the recalculated security code matches the received-calculated security code. If the recalculated security code of the eSVC 11 matches the received-calculated security code of the eSVC 11, the internal card processing service of the processor computer device 18 may contact the issuer computer device 19 to process the payment transaction. Upon processing of the payment transaction, the processor computer device 18 may transmit a successful payment response to the merchant computer device 16 via the transaction routing service of the processor computer device 18. The internal card processing service may also update a database/datastore of payment status to indicate that the eSVC 11 has been used for a payment transaction. The internal card processing service may also eliminate the received-calculated security code and recalculated security code from databases/datastores of the processor computer device 18. The internal card processing service of the processor computer device 18 may also compare the eSVC type to types of cards issued by the issuer of the eSVC in the product master catalog service to help verify that the eSVC is authentic.

The transaction routing service may also route the request to process a payment transaction to the settlement service of the processor computer device 18. The settlement service may allocate appropriate portions of value paid for the payment transaction among the various entities involved in the transaction (i.e., provider computer device 12, issuer computer device 19, etc.). This amount may be a percentage of the amount of the value of the payment transaction. The settlement service of the processor computer device 18 may also allocate amounts received for the payment transaction to the eSVC issuer (e.g., via issuer computer device 19), the eSVC processor (e.g., via processor computer device 18), the provider of the eSVC (e.g., via provider computer device 12, combinations thereof, etc.).

Reference to the calculation of a recalculated security code should include embodiments where the security code is calculated by one entity while the recalculated security code is calculated by another entity. Reference to the calculation of the recalculated security code should also include embodiments where the security code is calculated and recalculated by the same entity.

In embodiments disclosed herein, the security code which is calculated or recalculated according to the embodiments disclosed herein may comprise a security code used for transactions which do not utilize the magnetic stripe security code or smart chip security code of a physical card, for example, a security code suitable for a transaction where a physical card is not swiped or read (e.g., via NFC, Bluetooth, Wi-Fi, radio, or any other frequency), such as a digital (e.g., online) transaction or a telephonic transaction. In additional or alternative embodiments, the security code may be embodied as a calculated security code, a received-calculated security code, a recalculated security code, or combinations thereof (discussed hereinbelow). In embodiments, the security code, calculated security code, received-calculated security code, recalculated security code, or combinations thereof, may comprise a CVV2.

According to the disclosed systems and methods, the security code provider has the ability to provide a security code without storing the security code in order to comply with rules governing security codes. As such, the security code provider may observe rules which prohibit the storage and/or retention of security codes while serving customers or users with mechanisms for making payment transactions when such security codes are needed. Additionally, the systems and methods disclosed herein provide redundancy to ensure calculated security codes and received-calculated security codes are accurate and/or correct without storing the security codes.

The embodiments described herein also provide fraud mitigation techniques which have various advantages. The fraud mitigation techniques help to protect eSVC providers as well as eSVC distributers from fraud associating with redeeming eSVCs. It has been found that performing a fraud mitigation step before a user obtains the eSVC affects the ability of a user to obtain the eSVC by fraudulent means. The fraud mitigation techniques provide an ability for the disclosed method and system embodiments to withhold or "soft void" an eSVC before a user obtains the eSVC which prevents loss due to fraud. The fraud mitigation techniques also provide improved customer service. For example, if a user claims they never received or lost their eSVC (e.g., email or text notification was deleted), the embodiments disclosed herein allow for withholding the processing of payment transaction, blocking the eSVC from being obtained, issuance of a replacement eSVC, or combinations thereof. The fraud mitigation techniques disclosed herein help protect eSVC providers, e-wallet providers, eSVC processors, eSVC issuers, merchants, and eSVC distribution partners from fraud before and after purchase of the eSVC.

The embodiments for provision of a security code as described herein above may be included in systems and method for distributing open loop eSVCs. For example, a computer device (e.g., one or more of the computer devices described herein above) may receive an open loop eSVC distribution request, provide the open loop eSVC in response to the open loop eSVC request, notify a recipient or user of the open loop eSVC provided in response to the open loop eSVC distribution request; allow the open loop eSVC to be associated with an electronic wallet; and enable the open loop eSVC for a transaction (e.g., redemption, purchase, reload, registration, or combinations thereof) as disclosed herein. The open loop eSVC may be provided via any embodiment disclosed herein (e.g., eGift, eCode, directly to an electronic wallet, or combinations thereof). Additionally or alternatively, the open loop eSVC may be delivered as a uniform source locator ("URL"), for example, via email, short message service ("SMS"), social media post, other electronic channel, or combinations thereof. In embodiments, the open loop eSVC is delivered directly to the recipient via any mechanism disclosed herein. Any URL may reference a HyperText Markup Language ("HTML") page, and in such embodiments, the HTML page may provide information concerning the embodiment by which the eSVC is provided (e.g., eGift, eCode, electronic wallet, or combinations thereof). The provided information may include terms and conditions, redemption instructions, reload instructions, an identification number of the open loop eSVC, a security code, an expiration date, or combinations thereof. When the provided information includes a security code, the security code may comprise an embodiment or a combination of the embodiments disclosed herein. Moreover, the security code may be obtained dynamically by a computer device (e.g., of an issuer of the eSVC). The computer device may not store the security code and instead the computer device may calculate the security code (e.g., as discussed herein above; additionally or alternatively, in a particular embodiment, a CVV2 is calculated by encrypting PAN, the expiration date, and the security code with encryption keys) in order to provide or facilitate provision of the security code. In embodiments, the security code may be calculated in real time.

Also disclosed herein (e.g., as shown in FIGS. 4A, 5A-B, and 7A-B), an electronic value token transaction processing system provides users, merchants, vendors, issuers, providers, and other interested parties an efficient, secure, and effective system for facilitating the organization, management, transportation, storage, and use of the aforementioned e-wallets and electronic value tokens in financial transactions. As described hereinbelow, there are certain basic concepts and functions employed by e-wallets and e-wallet enabled systems. These concepts include the creation of an e-wallet, provisioning the e-wallet (e.g., converting tangible cards into electronic value tokens and associating the electronic value tokens to an e-wallet or requesting an electronic value token be associated with the e-wallet), accessing the e-wallet, and establishing rules for the e-wallet's use. Moreover, as will be more fully detailed herein, the e-wallet may be used in a system wherein the e-wallet provider manages the entirety of the e-wallet's contents (e.g., the primary e-wallet, any sub-wallets or secondary wallets, and associated electronic value tokens therein). Alternatively, the e-wallet may be used in a system wherein the e-wallet provider manages only a portion of the e-wallet's contents (e.g. the primary e-wallet and electronic value tokens therein) and delegates the management of one or more (or all) sub-wallets or secondary wallets to a third-party's electronic value token transaction processing system. As will be further detailed herein, either of the two described management systems may be configured to allow the systems' user to fully manage the functionalities of the user's e-wallet; participate in value added/bonus programs offered by issuers, vendors, and/or other electronic value token-related parties; participate in card exchange activities (e.g., wherein a user exchanges an electronic value token maintained in its e-wallet for an electronic value token not in the e-wallet); and participate in savings programs offered by issuers, vendors, and/or other electronic value token-related parties.

Figure 4A:
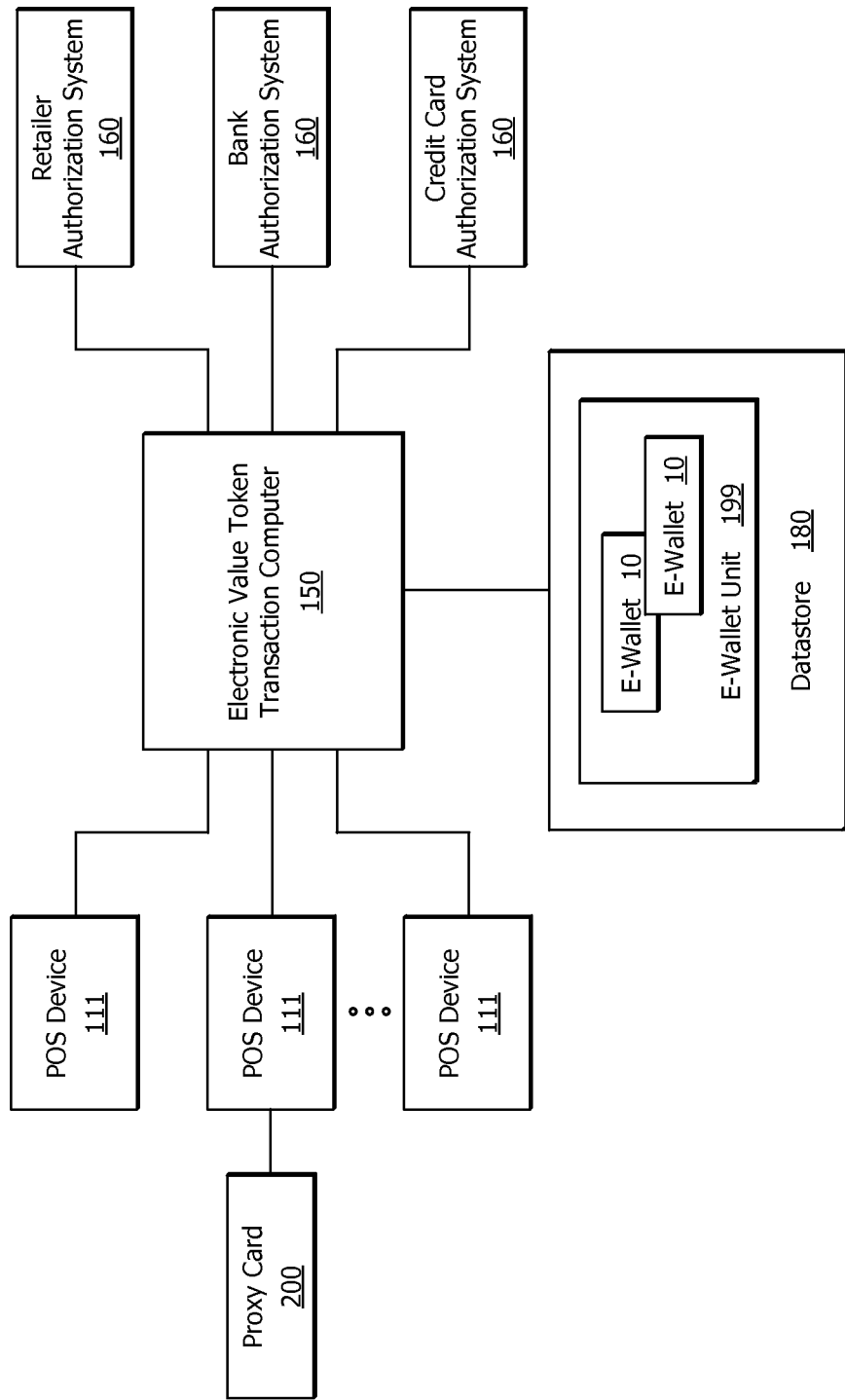
FIGS. 4A, 5A, 5B, and 5C are schematic representations of an electronic value token transaction processing system in accordance with at least one embodiment.

FIG. 4A illustrates an exemplary electronic value token transaction processing system 100. Specifically, FIG. 4A illustrates an electronic value token transaction computer 150 configured for communication with point of sale devices 111, one or more authorization systems 160 (e.g., retailer, bank, and credit card), and datastore 180. Moreover, FIG. 4A illustrates that the point of sale devices 111 are in communication with a proxy card 200 (which will be shown below to represent an embodiment of a means for a user to access an e-wallet) and that the datastore 180 comprises an e-wallet unit 199, which in turn comprises e-wallets 10. The customer may interact through a mobile application or the web user interface (UI) portal to configure the proxy card to be used as a valid payment instrument inside and outside of a user's ewallet account.

In some embodiments, an e-wallet user may start using their e-wallet to pay for goods and services even when merchants do not support an e-wallet as a form of payment through use of a physical or virtual proxy card enabling the customer to make in-person or online payments by generation of a virtual stored value number generated in the e-wallet to access the actual payment instrument in the customer's e-wallet.

Figure 4B:
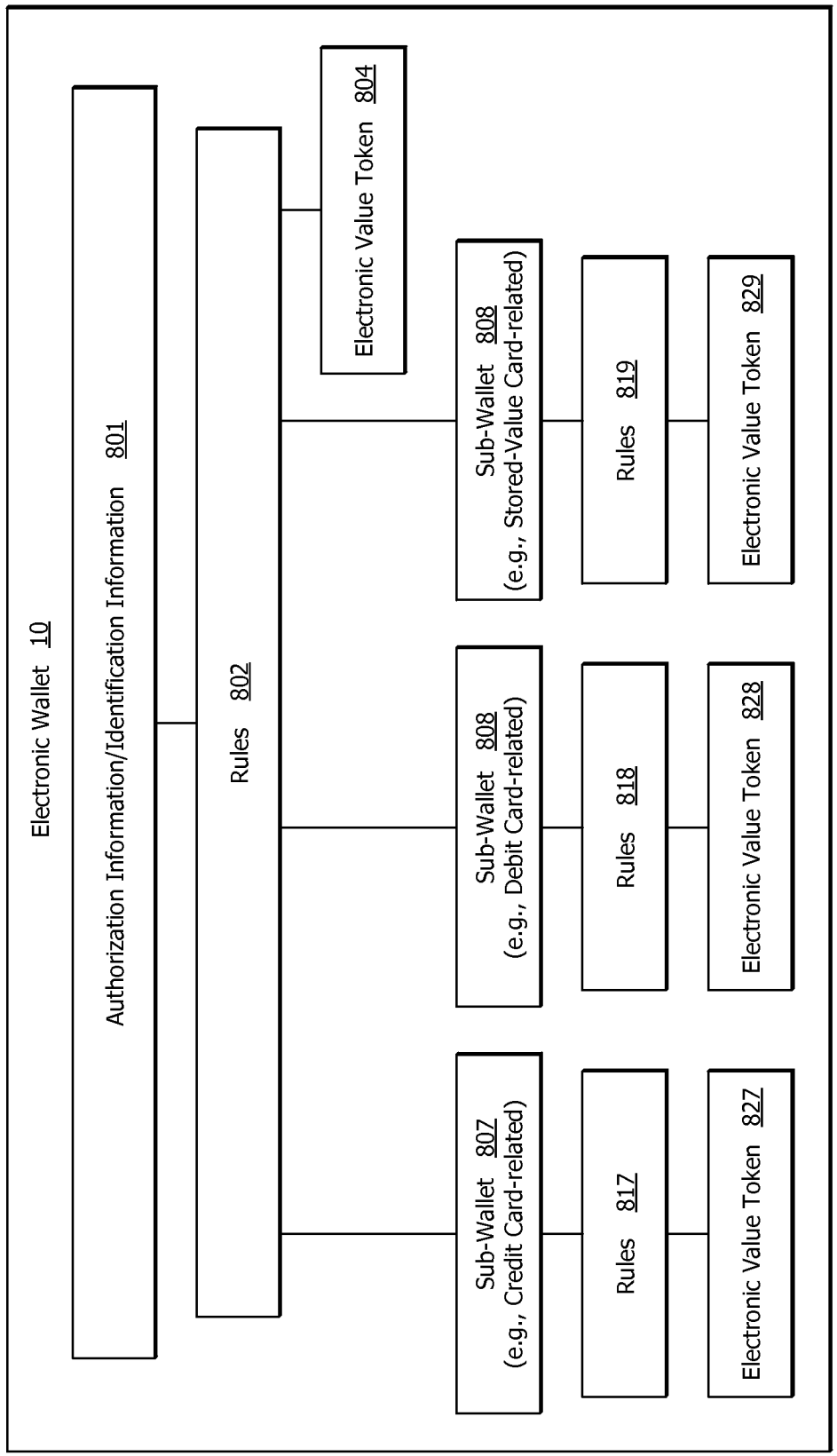
FIG. 4B illustrates an exemplary embodiment of an electronic wallet.

FIG. 4B illustrates an electronic wallet 10 in accordance with one embodiment, and it is to be understood that the details of e-wallet 10 may be employed in any of the various embodiments disclosed herein (e.g., as e-wallet 10 of FIGS. 4A, 5A, and 5B) and the maintenance of said e-wallet 10 may be wholly performed by a single e-wallet system (e.g., electronic value token transaction processing system 100) or may distributed across multiple e-wallet systems (e.g., electronic value token transaction processing systems 1100 and 1200 and E-Wallet Aggregator System 1000). Specifically, FIG. 4B illustrates an electronic wallet 10 comprising authentication information 801, rules 802, electronic value tokens 804, sub-wallet 807 for credit card electronic value tokens, sub-wallet (with corresponding rules 817 and electronic value tokens 827), sub-wallet 808 for debit card electronic value tokens (with corresponding rules 818 and electronic value tokens 828), and sub-wallet 809 for stored-value card electronic value tokens (with corresponding rules 819 and electronic value tokens 829). FIGS. 4A and 4B may be further understood from the below discussion.

In order to eliminate the increasing complexity in organization, transport, security, and redemption, transaction cards are stored electronically as value tokens in electronic wallets. As used herein, a value token refers to an electronic identifier that may be used to transact business with a party willing to accept the electronic value token, for example as tender for a purchase. Examples of such value tokens include electronic representations of, or associated with, stored value cards (also referred to as prepaid cards) and other physical representations of value of a variety of types such as credit cards, debit cards, gift cards, prepaid telephone cards, loyalty cards, membership cards, tickets or ticket cards, entertainment cards, sports cards, prepaid cards, coupons, admission passes, prepaid or pre-purchased goods or services, and the like. In an embodiment, a value token includes cash or currency. In an embodiment, the electronic value token includes a credit or debit card or account. In an embodiment, a value token includes a preexisting account such as a merchant account, bank account, etc. In an embodiment, a value token includes a merchant-issued and/or accepted credit, points, coupon or promotional value. In an embodiment, a value token is associated with a prepaid card or account, and unless otherwise indicated it is to be understood that the various embodiments described herein may be carried out in the context of a prepaid card or account such as a merchant gift card.

A physical credit card, debit card, stored-value card, or other physical representations of value may be converted into a value token to be added to the electronic wallet. For example, physical gift cards or other physical representations of value may be transformed into value tokens in a user's electronic wallet via a point-of-sale device, cellular phone, a computer, short messaging service ("SMS"), and the like. Once so transformed, the electronic value tokens may be redeemed by the user, after authentication, without possession of the physical representation such as gift cards by accessing the user's electronic wallet during purchase. In this way, the use of the term value token herein refers to electronic representations and physical representations that can be transformed into electronic representations. In at least one embodiment, the physical gift card is inoperative after transformation. In an alternative embodiment, the physical gift card is inoperative after redemption of the electronic value token using the electronic wallet or the physical gift card Consumer use of value tokens typically involves a vendor, a redeeming merchant or retailer, and an issuer. In various embodiments, the vendor, redeeming merchant, and issuer may be the same, different, or related entities. The point of sale where value tokens are purchased or otherwise made available for inclusion in an electronic wallet may be referred to as the vendor. Thus, the vendor sells the electronic value tokens themselves although the electronic value tokens may be redeemed at another place of business. An entity that will accept a value token for business transactions, for example as tender for a purchase, may be referred to as a redeeming merchant or retailer. For example, a grocery store may sell the electronic value token of an apparel store. The grocery store is the vendor and the apparel store is the redeeming merchant or retailer. An entity that provides the financial backing and/or payment processing for a given value token such as a prepaid card or account may be referred to as the issuer. Issuers include direct issuers of value tokens such as store-branded value tokens (e.g., store branded prepaid cards or tokens issued directly by the merchant, sometimes referred to as closed-loop prepaid cards), and in some embodiments the vendor may also be the issuer and/or the redeeming merchant (e.g., a prepaid card or token issued, sold, and redeemed by the same merchant). Issuers also include financial institutions such as banks, VISA, MasterCard, American Express, etc., and value tokens issued by such institutions may be readily accepted by a number of redeeming merchants to conduct transactions such as purchases (sometimes referred to as open loop prepaid cards or tokens since they may be redeemed at a number of different merchants). Issuers may also be the providers of branded electronic wallets such as Google, Facebook, Twitter, and the like, and in some embodiments such branded wallet contains value tokens associated with the issuer (e.g., Google "cash" or credits, Pay Pal currency, Facebook electronic currency, etc.) and may contain or be associated with a sub-wallet containing gift card-related value tokens, a sub-wallet containing credit card-related value tokens, a sub-wallet containing debit card-related value tokens, or a combination thereof.

Generally, an electronic value token transaction computer 150 credits or debits (or takes other actions of the type described herein) the accounts associated with the electronic value tokens contained within an electronic wallet or sub-wallet. The electronic value token transaction computer 150 may generate or forward messages to authorization systems 160 so that the authorization systems 160 can credit or debit (or take other action of the type described herein) the accounts associated with the electronic value tokens. Confirmation messages are returned to the electronic value token transaction computer 150 and POS device 111, and the electronic wallet 10 or a sub-wallet is updated as necessary.

In at least one embodiment, transaction information is separate from authentication information. For example, information about a purchase item, purchase price, purchase location, etc. is considered transaction information and is separate from authentication information such as an authentication token, PIN, account number, etc. Among other things, keeping the information separate allows for separate processing and routing, allowing for greater efficiency and privacy. For example, in applying the electronic value tokens according to the configurable rule, the priority may be based on a transaction information variables such as physical location of a retailer originating the electronic wallet request; transaction amount; type of retailer; time of day; day of week; week of month; month of year; department of retailer originating the electronic wallet request; lane of retailer originating the electronic wallet request; identification of checker; parent company of a retailer originating the electronic wallet request; value of value tokens; and type of the electronic wallet request in various embodiments. Such transaction and/or authentication information may be used by the systems described herein in conjunction with rules based decision making (e.g., checking such transaction data to validate and apply a promotion associated with the transaction), for security purposes (e.g., checking such transaction data against pre-determined profiles to assist with fraud detection), and the like. The customer may configure fraud prevention parameters for security purposes, for example, by restricting purchase transactions based on parameters such as transaction time, velocity limits on number of transactions (e.g., maximum of 10 transactions per day), velocity purchase amounts over a designated period of time (e.g., maximum of $500/day or maximum of $100 per transaction), type of transaction, geo-location parameters, blocked merchant purchases, and the like. In response to a violation of security, the consumer may entirely and permanently block the transaction or configure a release of the transaction based on a parameter, such as permission or time.

In at least one embodiment, the wallet provider stands in for the purchaser, and redemption of the electronic value token occurs after the purchase. However, this time mismatch creates a discrepancy in the retailer's records. Specifically, the retailer records a transaction between the retailer and the wallet provider. The retailer records a later redemption via value token, seemingly for no purchase. In these instances, a third party administrator is required that can connect the redemption with the transaction.

There can be many ways to provision or add value tokens to an electronic wallet. For example, a user may pay the vendor for a value token, and the vendor may insert the electronic value token into the user's wallet. Alternatively, the user may obtain a physical representation of the electronic value token from the vendor (e.g., a card, chit, printed receipt, etc.) and may subsequently add the value to the electronic wallet (for example, via a phone or internet accessed user interface). The user may have a choice of many different retailers affiliated with the vendor. In other words, a given vendor may offer a plurality of tokens associated with different retailers. For example, a retailer may offer promotions to compete for the user's business when purchasing a value token such as a prepaid account.

Each retailer may mandate a specific format for value tokens. For example, one retailer may require a 16 digit card number plus a 4 digit month/year expiration date. Other retailers may require pin numbers, access numbers, card verification value numbers, card security code numbers, and the like. Each piece of information for different retailers may have a different format as well as a different name. As such, an electronic wallet provider or host (for example, a primary e-wallet provider) would benefit by allowing third party administration for electronic representations of value tokens have a variety of formats such as stored value cards, credit cards, debit cards, loyalty and promotion cards, and other subsets of value tokens for which administration by the primary e-wallet provider would be more expensive.

In an embodiment, value tokens associated with prepaid cards or accounts may be associated with a sub-wallet within the electronic wallet (for example, a sub-wallet of a primary, branded electronic wallet such as a Google electronic wallet), and a third party may administer the sub-wallet on behalf of the primary/principal electronic wallet host or provider. For example, during a transaction involving value tokens associated with prepaid cards or accounts (e.g., electronic or virtual stored value cards), the provider of the electronic wallet allows a sub-wallet associated with such value tokens to take control of a portion of the transaction, sometimes referred to as a sub-transaction. In an embodiment, a sub-transaction comprises a transaction associated with an electronic prepaid card or account such as redemption, value addition (e.g., topping up), activation, closure, fraud detection, etc. Specifically, the third party administrator can quickly and cheaply administer the transaction, including but not limited to determining and/or providing the proper formatting for the sub-transaction, and further execute the sub-transaction independently and/or in cooperation with the primary electronic wallet host or provider. Such formatting may relate to the particulars of information/data contained upon or associated with a given value token (e.g., type of card number, security code, etc.) and/or the formatting of information or data associated with a particular transaction (e.g., the characteristics, organization, packaging, etc. of data such as card type, transaction type, security code, etc. into messaging fields or other data formats for receipt/transmission while processing a transaction). For example, the third party administration can pass the proper transaction formatting template to the primary wallet provider. In at least one embodiment, the third party administrator determines from the request, or requests from the user, the identity of the retailer associated with the transaction. Preferably, the third party administrator maintains a database of a plurality of transaction formats associated with a plurality of retailers. After determining the identity of the retailer associated with the transaction, the third party administrator identifies the associated transaction format for the identified retailer using the format database and all subsequent processing is performed using the retailer-specific transaction format and vocabulary. In an embodiment, a user may wish to add a value token to an electronic wallet using a physical stored value card. The user is requested to identify the retailer associated with the stored value card, for example via a user interface located at a point of sale (including, in an embodiment, a point of sale associated with a personal computer such as on-line shopping via websites). In another embodiment, the user provides information associated with the stored value token via a web-based or personal digital assistant interface (e.g., a mobile phone app). Accordingly, based upon the user provided data, the appropriate format may be referenced from the database and the user may be shown a pictorial representation or other mockup representation of the physical stored value card with the specific input information highlighted on the mockup. As such, the user knows exactly which inputs are required to add the electronic value token to the electronic wallet. The user inputted information derived from the mockup will be in the proper format and/or may be further modified, packaged, etc. by the third party administrator to meet further formatting requirements. While the example described is simple, more complex transactions are also possible. As will be described more fully herein, transactions relating to (i) using value tokens in primary and/or sub-wallets for portions of transactions is similarly handled as is (ii) exchanging value tokens in primary and/or sub-wallets for other types of value tokens or value tokens associated with other retailers. For example, a user may wish to exchange a value token associated with a retailer the user does not frequent for a value token associated with a retailer that the user does frequent. Moreover, the third party administrator may use the transaction format associated with the identified retailer for financial reconciliation of the transaction or sub-transaction (e.g., debiting and crediting a prepaid account). In this instance, use of the proper transaction format is not only convenient but often required.

As indicated above, an electronic sub-wallet is a specifically defined portion of an e-wallet located in or associated with a specific e-wallet (e.g., a primary or principal wallet). A sub-wallet may be administered/maintained by the primary or principal e-wallet's administrator, processor, and/or provider or may be administered by another party, system, processor, subroutine, or server. The separate administration of the electronic sub-wallet allows the primary e-wallet provider and user to take advantage of economies of scale. For example, all electronic value tokens may be stored in one sub-wallet while credit and debit cards are stored in the primary e-wallet or a separate electronic sub-wallet. As such, the provider of the primary e-wallet may administrate/perform transactions concerning value tokens associated with credit and debit cards residing in the primary e-wallet while allowing a third party to administrate/perform transactions concerning value tokens associated with electronic value tokens residing in an electronic sub-wallet, freeing the third party from costly banking and credit regulations. Moreover, the third party administrator may use the economies of scale to receive payment for its services via arbitrage, commission, pay per transaction, or the like.

Via the separate administration of a sub-wallet, the third party administrator (e.g., administrator of an electronic sub-wallet associated with electronic prepaid accounts) provides convenience to both the user and the primary electronic wallet provider. Often, the third party administrator is the only entity with the knowledge and expertise (e.g., a database of required transaction formats) to process financial reconciliations or other transactions associated with an electronic prepaid account associated with a given issuer. For example, a third party administrator may be the only entity capable of matching a particular transaction on the retailer's book to a particular use of a value token or electronic wallet. As discussed in more detail herein, in some embodiments, the third party administrator carries out, implements, and/or is responsible for all or a portion of the functionality described in conjunction with the electronic value token transaction computer 150, for example in the context of administering one or more electronic sub-wallets (e.g., an electronic sub-wallet associated with electronic prepaid accounts such as closed loop accounts issued on behalf of one or more merchants) for the primary host or provider of an electronic wallet such as a branded electronic wallet.

Access to the electronic wallet may be gated or protected by an authentication token or other means for securely accessing an electronic wallet, examples of which include a proxy card or a personal digital assistant or mobile device such as a smart phone. Other embodiments for access to the electronic wallet include cardless access such as a number/password combination, a number without a password, and the like. Biometric information may also be used for authentication and access purposes, e.g. a fingerprint or iris print. Near field communication technology may also be used to implement authentication tokens. Near field communication technology may be implemented at a physical point of sale or in association with an online transaction. In either context, the near field communication technology may be implemented by a user via a proxy card (e.g., 200, 201, or 203), personal computer, personal digital assistant, smart phone 204, or other online transaction-related device. Thus, the authentication token may be tangible, intangible, or a combination thereof. In an embodiment, the authentication token may be generated, created, and/or formed at the initiation of an electronic transaction to uniquely identify the electronic transaction. In an embodiment, the uniquely generated authentication token may comprise elements of an electronic wallet identifier, a merchant identifier, a point of sale identifier, an electronic value token identifier, an electronic value token issuer identifier, an electronic value token transaction processor identifier, or combinations thereof. In another embodiment, the uniquely generated authentication token may be wholly unique and not comprise any portion of any previous identifier.

A proxy card may be provided by a proxy card provider, for example, at authorized physical locations (e.g., at a merchant's location) or via internet websites. A proxy card provider may be an entity independent of the merchant, of the eSVC processor, of the eSVC issuer, or combinations thereof; alternatively, the proxy card provider may be an entity which is the same as one or more of the merchant, of the eSVC processor, of the eSVC issuer, or combinations thereof. In embodiments, a user may acquire a proxy card at the authorized physical location, via an e-wallet application, or both. Proxy cards, in some embodiments herein, may be virtual proxy cards (vPC) displayed or enabled through identification information associated with the vPC.

In embodiments, the proxy card provider may associate the proxy card with one or more electronic wallet(s) of the user (which are provisioned with one or more eSVCs as described herein). For example, the user may log into the user's electronic wallet and enter an authentication information of the proxy card (e.g., a PIN, identifying number, QR code, barcode, magnetic stripe, NFC chip, or combinations thereof) via a keypad, keyboard, voice recognition device, scanning device, swiping device, NFC communication device, Bluetooth communication device, Wi-Fi, or combinations thereof. The authentication information may be received by the proxy card provider, the e-wallet provider, or both. The authentication information enables association of the user's proxy card with the user's electronic wallet. Once the proxy card is associated with the user's electronic wallet, the user may present the proxy card for secure access to the electronic wallet when the proxy card is presented at a point of sale. The association of the proxy card with the electronic wallet permits use of one or more eSVCs in the user's electronic wallet to purchase goods or services at a point-of-sale where the proxy card is presented. In an embodiment, the association of the proxy card with the electronic wallet may be stored in a database.

A proxy card associated with a user's electronic wallet may comprise an embodiment of the means for securely accessing the user's electronic wallet described herein. In such embodiments, the proxy card, one or more eSVCs in the electronic wallet, or combinations thereof may be used as a payment instrument for a transaction. For example, a user may present a proxy card or vPC which has previously been associated with the user's electronic wallet at a point of sale for the purchase of goods or services. Presentation of the proxy card for purchase may be made by communication of information (e.g., identifying information, security information, or both) of the proxy card via the techniques disclosed herein (e.g., swipe of magnetic stripe, scan of barcode or QR code, NFC communication, Bluetooth communication, virtually, etc., or combinations thereof). The e-wallet provider may receive the information of the proxy card, retrieve the stored association, verify the proxy card is associated with the electronic wallet, make value of one or more eSVCs in the e-wallet available as the payment instrument for the transaction, or combinations thereof.

Presentation of the proxy card may be made alone or in combination with use of other means for securely accessing the user's electronic wallet, e.g., identifying information (e.g., an account identifier such as a user id, email, phone number, or combinations thereof), a security code or security information (e.g., a PIN), or combinations thereof.

Figure 6A:
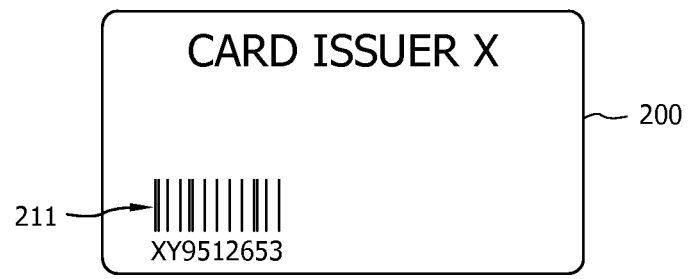
FIGS. 6A, 6B, and 6C are front perspective views of representative individual proxy cards in accordance with at least one embodiment.
Figure 6B:
Figure 6C:
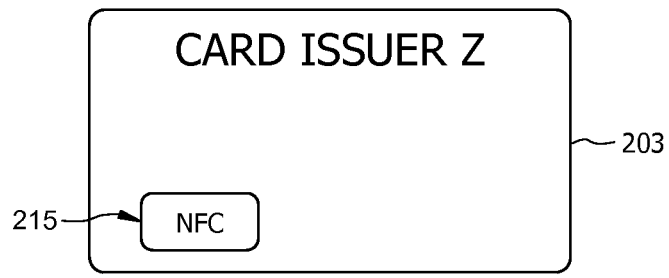

Examples of proxy cards 200, 201, 202, and 203 are depicted in FIGS. 6A, 6B, 6C, and 6D. FIG. 6A depicts a proxy card 200 in which the authentication information is encoded on the card 200 by means of a barcode 211 capable of being read by a barcode scanner. FIG. 6B depicts a proxy card 201 in which the authentication information is encoded on a magnetic stripe 213 located on the card 201. FIG. 6C depicts a proxy card 203 in which the authentication information is encoded on a near field communication chip 215 on the card 203. The authentication information of the proxy cards 200, 201, and 203 may comprise, for example an account number, serial number, authorization code, digital signature, electronic key or key code, RFID chip/data, or combinations thereof, corresponding to and/or associated with an e-wallet. This same information may be used to enable the use of a vPC. The proxy card authentication information is unique to the proxy card and associates the proxy card to an electronic wallet, and in an embodiment such association is stored in a database accessible by an administrator and/or provider of the e-wallet. Additionally or alternatively, the authentication information of a proxy card disclosed herein may comprise a series of numerals, a series of letters, or a combination thereof. The proxy cards 200, 201, and 203 may also be fashioned with personal identification numbers, or PINs, that may be a telephone number (or other combinations of numbers) associated with the proxy card user and/or that associated with the electronic wallet, to be entered during the course of the transaction, that correspond to the authentication information and allows access and/or use of the electronic wallet. In an embodiment, the PIN may be encoded in a bar code 211, a magnetic stripe 213, a NFC chip 215, a series of numerals, a series of letters, or a combination thereof. In an embodiment, the PIN may be obscured from view by packaging, by an obscuring material such as a scratch-off strip or peel-off label, or combinations thereof. In some embodiments, the proxy card may comprise a card security code (CSC), a card verification value (CVV or CV2), a card verification value code (CVVC), card verification code (CVC), verification code (V-code or V code), card code verification (CCV), credit card ID (CCID), or combinations thereof, and such codes (along with any other authentication data or token described herein) may be employed in an authorization or authentication transaction, for example initiated at a point of sale in conjunction with an e-wallet payment for a purchase transaction.

In some embodiments, the proxy card may have two of a magnetic stripe, a NFC chip, and a bar code (or a plurality of magnetic stripes and/or bar codes), and one or more of such may contain the authentication information.

The proxy cards 200, 201, and 203 are fabricated from a suitable first material, such as plastic, paper, a plastic-coated paper, laminates, or combinations thereof. The proxy cards 200, 201, and 203 are typically made in a thickness range of from about 0.005 to about 0.040 inch.

In proxy card embodiments comprising a bar code (e.g., bar code 211), such as a UPC code (e.g., a GS1-128 or UCC/EAN-128), the bar code may be positioned on the proxy card (e.g., proxy card 200) so that it can be scanned by well-known bar code reading equipment. Encoded in the bar code on the proxy card is a representation of the authentication information.

In proxy card embodiments comprising a magnetic stripe (e.g., magnetic stripe 213 of proxy card 201), the magnetic stripe may be made of conventional construction. For example, a magnetic stripe may be deposited from a slurry, positioned on the proxy card so that it can be scanned in magnetic stripe reading equipment such as a Tranz terminal made by Verifone. The magnetic stripe may comprise iron-based magnetic particles having high-coercivity, low-coercivity, or combinations hereof. In embodiments, the magnetic stripe may comprise one, two or three tracks for storage of at least a portion of the authentication information. For additional security, the authentication information may also be subjected to an encryption algorithm prior to encoding on the magnetic stripe.

In proxy card embodiments comprising near field communication technology, radio frequency identification (RFID) tags, microprocessors, and/or microchips may be placed on the proxy card to be interpreted by specifically configured devices. The RFID tags, microprocessors, and/or microchips may be used in addition to or in place of the bar code 211 on proxy card 200 and magnetic stripe 213 on proxy card 201, or may be used in combination with these or other means of encoding the authentication information on the proxy card. Alternatively, such RFID or other means such as near field, Bluetooth, etc. may be employed by a user operated device (e.g., a personal digital assistant such as a smart phone) to provide electronic wallet access and/or authorization functionality.

In additional or alternative embodiments, series of numerals, series of letters, or combinations thereof, may be placed on the proxy card to be read or interpreted by a human or a device, i.e. optical character recognition device, configured to interpret a series of shapes corresponding to the package identifier.

In an embodiment, the proxy card may comprise an authentication device. The proxy card's similar appearance to a credit card, debit card, and/or stored-value card will help adoption of and access to electronic wallets because consumers know how to use electronic value tokens. As such, consumers may come to think of proxy cards as multiple cards rolled into one or simply think of a proxy card as an electronic wallet itself, despite being a physical representation.

Figure 6D:
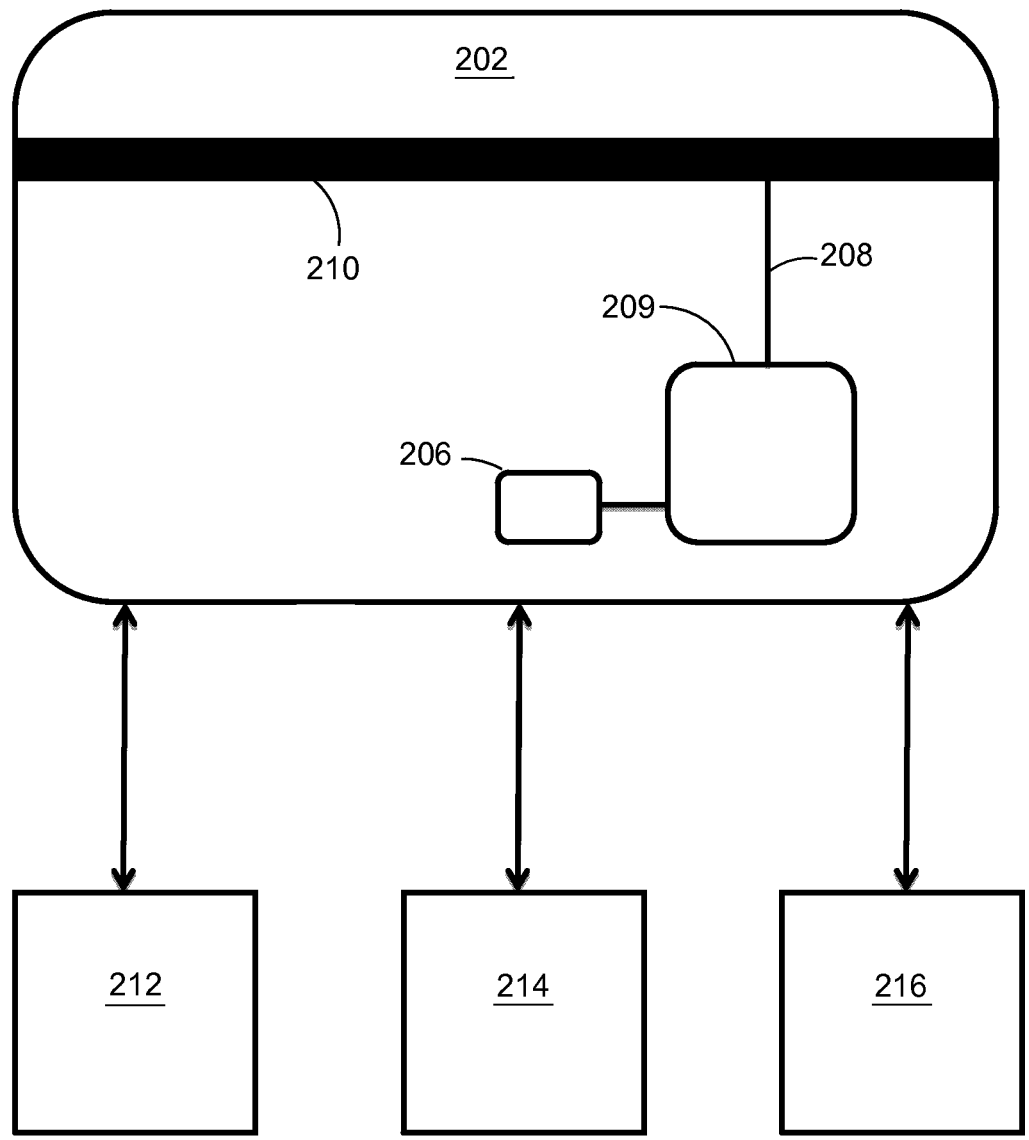
FIG. 6D is front perspective view of representative individual wallet redemption card in accordance with at least one embodiment.

FIG. 6D depicts a proxy card 202 which comprises a rewriteable magnetic stripe 210, a smart chip 209, a wireless communicator 206, and an interface 208. The wireless communicator 206 may be operably connected to the smart chip 209. The interface 208 may be operatively connected between the smart chip 209 and the rewriteable magnetic stripe 210. As can be seen in FIG. 6D, the proxy card 202 may be operably connected with a computer device 212, a programming device 214, a point-of-sale device (POS) 216, or combinations thereof. The proxy card 202 may be referred to herein as a "wallet redemption card."

The wallet redemption card 202 may be associated with an electronic wallet as previously described for the disclosed proxy cards (e.g., via presentation of authentication information of the proxy card).

The rewriteable magnetic stripe 210 may comprise iron-based magnetic particles having high-coercivity, low-coercivity, or combinations hereof. In embodiments, the magnetic stripe 210 may comprise one, two or three tracks for storage of at least a portion of the payment information of at least one payment account. Generally, payment information may be written to, erased, and re-written to the rewriteable magnetic stripe 210. In an embodiment, the payment information is written to the rewriteable magnetic stripe 210 after the proxy card 202 is associated with an electronic wallet. The rewriteable magnetic stripe 210 may be configured to: i) receive payment information, ii) store payment information, or iii) combinations thereof.

As used herein, "payment information" refers to information associated with a payment account. The payment information is used for a transaction with a merchant. In embodiments, payment information may comprise an account number, UPS, security information, e.g., a card security code (CSC), a card verification value (CVV or CV2), a card verification value code (CVVC), card verification code (CVC), verification code (V-code or V code), card code verification (CCV), credit card ID (CCID), a phone number, an identification number (e.g., PIN, driver's license number, passport number, visa number, social security number), expiration date, account issuer identification number, billing address, or combinations thereof.

As used herein, "payment account" refers to an account that may be used to transact business with a merchant willing to accept a value in the account (e.g., points, miles, dollars, or any other measure of value), for example as tender for a purchase or discount for a purchase. As used herein, "payment account" may additionally or alternatively refer to an account used for promotional and/or marketing purposes. Examples of such payment accounts include credit accounts, debit accounts, gift accounts, telephone accounts, loyalty accounts, membership accounts, ticket accounts, entertainment accounts, sports accounts, prepaid accounts, discount accounts, healthcare accounts and the like. Such accounts may be associated with corresponding card products, including credit cards, debit cards, gift cards, telephone cards, loyalty cards, membership cards, ticket cards, entertainment cards, sports cards, prepaid cards, discount cards, healthcare cards and the like.

In an embodiment, the rewriteable magnetic stripe 210 may be configured to receive payment information from the smart chip 209, for example, via interface 208. In an embodiment, only a portion of the payment information for a payment account is received by the rewriteable magnetic stripe 210 from the smart chip 209. In additional or alternative embodiments, the entire payment information for a payment account is received by the rewriteable magnetic stripe 210 from the smart chip 209. In embodiments, at least a portion of payment information for more than one payment account (e.g., a first payment account and a second payment account) is received by the rewriteable magnetic stripe 210 from the smart chip 209.

In an additional or alternative embodiment, the rewriteable magnetic stripe 210 may be configured to receive payment information from a programming device 214 (e.g., a magnetic stripe encoder). In an embodiment, only a portion of the payment information for a payment account is received by the rewriteable magnetic stripe 210 from the programming device 214. In additional or alternative embodiments, the entire payment information for a payment account is received by the rewriteable magnetic stripe 210 from the programming device 214. In embodiments, at least a portion of payment information for more than one payment account (e.g., a first payment account and a second payment account) is received by the rewriteable magnetic stripe 210 from the programming device 214.

In an embodiment, the rewriteable magnetic stripe 210 may be configured to store any type of payment information described hereinabove, for example, as chosen by an account issuer. The payment information may be stored on the first track, the second track, the third track, or combinations thereof, of the magnetic stripe 210. In an embodiment, only a portion of the payment information for a payment account is stored on the rewriteable magnetic stripe 210. In additional or alternative embodiments, the entire payment information for a payment account is stored on the rewriteable magnetic stripe 210. In embodiments, at least a portion of payment information for more than one payment account (e.g., a first payment account and a second payment account) is stored on the rewriteable magnetic stripe 210. The rewriteable magnetic stripe 210 may store payment information received from the smart chip 209, from the programming device 214, or both.

In embodiments, the smart chip 209 may comprise a memory. In additional or alternative embodiments, the smart chip 209 may comprise an integrated circuit having a memory associated therewith. The smart chip 209 may be configured to: i) receive payment information, ii) fetch payment information, iii) store payment information, iv) read payment information, v) write payment information, vi) erase payment information, vii) send payment information, or viii) combinations thereof. The smart chip 209 may be positioned on the surface of the wallet redemption card 202; additionally or alternatively, the smart chip 209 may be embedded within the wallet redemption card 202.

In an embodiment, the smart chip 209 may be configured to receive payment information from a computer device 212 (e.g., via wireless communicator 206). In an embodiment, only a portion of the payment information for a payment account is received by the smart chip 209 from the computer device 212. In additional or alternative embodiments, the entire payment information for a payment account is received by the smart chip 209 from the computer device 212. In embodiments, at least a portion of payment information for more than one payment account (e.g., a first payment account and a second payment account) is received by the smart chip 209 from the computer device 212.

In an embodiment, the smart chip 209 may be configured to store payment information in a memory of the smart chip 209. In an embodiment, only a portion of the payment information for a payment account is stored on the smart chip 209. In additional or alternative embodiments, the entire payment information for a payment account is stored on the smart chip 209. In embodiments, at least a portion of payment information for more than one payment account (e.g., a first payment account and a second payment account) is stored on the smart chip 209. The smart chip 209 may store payment information received from the rewriteable magnetic stripe 210, the computer device 212, or both.

In an embodiment, the smart chip 209 may be configured to read payment information from a memory of the smart chip 209. In an embodiment, only a portion of the payment information for a payment account is read by the smart chip 209 from the memory of the smart chip 209. In additional or alternative embodiments, the entire payment information for a payment account is read by the smart chip 209 from the memory of the smart chip 209. In embodiments, at least a portion of payment information for more than one payment account (e.g., a first payment account and a second payment account) is read by the smart chip 209 from the memory of the smart chip 209.

In an embodiment, the smart chip 209 may be configured to write payment information to the memory of the smart chip 209. In an embodiment, only a portion of the payment information for a payment account is written by the smart chip 209 to the memory of the smart chip 209. In additional or alternative embodiments, the entire payment information for a payment account is written by the smart chip 209 to the memory of the smart chip 209. In embodiments, at least a portion of payment information for more than one payment account (e.g., a first payment account and a second payment account) is written by the smart chip 209 to the memory of the smart chip 209.

In an embodiment, the smart chip 209 may be configured to erase payment information from the magnetic stripe 210. For example, the smart chip 209 is configured to erase payment information from the magnetic stripe 210 after using the wallet redemption card 202 (e.g., the rewriteable magnetic stripe 210 or the smart chip 209 of the wallet redemption card 202) for a payment transaction (e.g., purchase, redemption, discount, or combinations thereof). The smart chip 209 may additionally or alternatively be configured to erase payment information from the magnetic stripe 210 less than about 30, 25, 20, 15, 10, 9, 8, 7, 6, 5, 4, 3, 2, 1, 0.1, 0.01 or less minutes after the payment information is written to the rewriteable magnetic stripe 210. The smart chip 209 may additionally or alternatively be configured to erase payment information from the magnetic stripe 210 less than about 30, 25, 20, 15, 10, 9, 8, 7, 6, 5, 4, 3, 2, 1, 0.1, 0.01 or less minutes after receiving the payment information from a programming device 214. The smart chip 209 may additionally or alternatively be configured to erase payment information from the magnetic stripe 210 less than about 30, 25, 20, 15, 10, 9, 8, 7, 6, 5, 4, 3, 2, 1, 0.1, 0.01 or less minutes after payment information is written to the memory of the smart chip 209.

In embodiments, at least a portion of the payment information for one or more payment accounts (e.g., a sole payment account, a first payment account and a second payment account, etc.) is erased by the smart chip 209 from the magnetic stripe 210. In an embodiment, the smart chip 209 may erase only a portion of the payment information for a payment account contained on the magnetic stripe 210 (e.g., contained on the first track, second track, third track, or combinations thereof). In additional or alternative embodiments, the smart chip 209 may erase only a portion of the payment information for a first payment account and only a portion of the payment information of a second payment account contained on the magnetic stripe 210. In additional or alternative embodiments, the smart chip 209 may erase the entire payment information of one or more payment accounts contained on the magnetic stripe 210. In additional or alternative embodiments, the smart chip 209 may erase the entire payment information of a first payment account contained on the magnetic stripe 210 and only a portion of the payment information of a second payment account contained on the magnetic stripe 210.

In an additional or alternative embodiment, the smart chip 209 may be configured to erase payment information from a memory of the smart chip 209. For example, the smart chip 209 is configured to erase payment information from the memory after using the wallet redemption card 202 (e.g., the rewriteable magnetic stripe 210 or the smart chip 209 of the wallet redemption card 202) for a payment transaction (e.g., purchase, redemption, discount, or combinations thereof). The smart chip 209 may additionally or alternatively be configured to erase payment information from the memory less than about 30, 25, 20, 15, 10, 9, 8, 7, 6, 5, 4, 3, 2, 1, 0.1, 0.01 or less minutes after the payment information is written to the memory. The smart chip 209 may additionally or alternatively be configured to erase payment information from the memory after receiving the payment information from a computer device 212. The smart chip 209 may additionally or alternatively be configured to erase payment information from the memory less than about 30, 25, 20, 15, 10, 9, 8, 7, 6, 5, 4, 3, 2, 1, 0.1, 0.01 or less minutes after reading and/or receiving the payment information from the rewriteable magnetic stripe 210. The smart chip 209 may additionally or alternatively be configured to erase payment information from the memory less than about 30, 25, 20, 15, 10, 9, 8, 7, 6, 5, 4, 3, 2, 1, 0.1, 0.01 or less minutes after the payment information is written to the rewriteable magnetic stripe 210.

In embodiments, at least a portion of the payment information for one or more payment accounts (e.g., a sole payment account, a first payment account and a second payment account, etc.) is erased by the smart chip 209 from the memory of the smart chip 209. In an embodiment, the smart chip 209 may erase only a portion of the payment information for a payment account contained on the memory. In additional or alternative embodiments, the smart chip 209 may erase only a portion of the payment information for a first payment account and only a portion of the payment information of a second payment account contained on the memory. In additional or alternative embodiments, the smart chip 209 may erase the entire payment information of one or more payment accounts contained on the memory. In additional or alternative embodiments, the smart chip 209 may erase the entire payment information of a first payment account contained on the memory and only a portion of the payment information of a second payment account contained on the memory.

In an embodiment, the smart chip 209 may be configured to send payment information to a point-of-sale (POS) device 216. In an embodiment, only a portion of the payment information for a payment account is sent from the smart chip 209 to the POS device 216. In additional or alternative embodiments, the entire payment information for a payment account is sent by the smart chip 209 to the POS device 216.

In embodiments, at least a portion of payment information for more than one payment account (e.g., a first payment account and a second payment account) is sent by the smart chip 209 to the POS device 216. For example, the smart chip 209 may send payment information for a first payment account to the POS device 216 for a first portion of a transaction (e.g., a first partial payment by currency, a discount, or other transaction value (e.g., points, miles, or any other measure of value)), and the smart chip 209 may send payment information for a second payment account to the POS device 216 for a second portion of the transaction (e.g., a second partial payment by currency, a discount, or other transaction value (e.g., points, miles, or any other measure of value)). In embodiments, the smart chip 209 may send payment information for a plurality of payment accounts to cover a plurality of portions of the transaction so as to accomplish a complete transaction.

In an additional or alternative embodiment, the smart chip 209 may be configured to send payment information to the rewriteable magnetic stripe 210 via the interface 208. In an embodiment, only a portion of the payment information for a payment account is sent from the smart chip 209 to the rewriteable magnetic stripe 210 via the interface 208. In additional or alternative embodiments, the entire payment information for a payment account is sent by the smart chip 209 to the rewriteable magnetic stripe 210 via the interface 208. In embodiments, at least a portion of payment information for more than one payment account (e.g., a first payment account and a second payment account) is sent by the smart chip 209 to interface 208. For example, the smart chip 209 may send payment information for a first payment account to the rewriteable magnetic stripe 210 via the interface 208 for a first portion of a transaction (e.g., a first partial payment by currency, a first discount, or other transaction value (e.g., points, miles, or any other measure of value)), and the smart chip 209 may send payment information for a second payment account to the rewriteable magnetic stripe 210 via the interface 208 for a second portion of the transaction (e.g., a second partial payment by currency, a second discount, or other transaction value (e.g., points, miles, or any other measure of value)). In embodiments, the smart chip 209 may send payment information for a plurality of payment accounts to cover a plurality of portions of the transaction so as to accomplish a complete transaction.

In embodiments, the smart chip 209 may send payment information for a first payment account to the rewriteable magnetic stripe 210 via the interface 208 for a first portion of a transaction (e.g., a first partial payment by currency, a first discount, or other transaction value (e.g., points, miles, or any other measure of value)), and the smart chip 209 may send payment information for a second payment account to the POS device 216 via the wireless communicator 206 for a second portion of the transaction (e.g., a second partial payment by currency, a second discount, or other transaction value (e.g., points, miles, or any other measure of value)). In embodiments, the smart chip 209 may send payment information for a plurality of payment accounts to cover a plurality of portions of the transaction so as to accomplish a complete transaction via both the rewriteable magnetic stripe 210 via the interface 208 and the wireless communicator 206.

In embodiments where at least a portion of payment information is erased from the rewriteable magnetic stripe 210, the smart chip 209 may be configured to resend payment information to the rewriteable magnetic stripe 210 via the interface 208. In an embodiment, only a portion of the payment information for a payment account is resent by the smart chip 209 to the rewriteable magnetic stripe 210 via the interface 208. In additional or alternative embodiments, the entire payment information for a payment account is resent by the smart chip 209 to the rewriteable magnetic stripe 210 via the interface 208. In embodiments, at least a portion of payment information for more than one payment account (e.g., a first payment account and a second payment account) is resent by the smart chip 209 to the rewriteable magnetic stripe 210 via the interface 208.

In embodiments where at least a portion of payment information is erased from the, the smart chip 209 may be configured to rewrite payment information to the memory of the smart chip 209. In an embodiment, only a portion of the payment information for a payment account is rewritten by the smart chip 209 to the memory of the smart chip 209. In additional or alternative embodiments, the entire payment information for a payment account is rewritten by the smart chip 209 to the memory of the smart chip 209. In embodiments, at least a portion of payment information for more than one payment account (e.g., a first payment account and a second payment account) is rewritten by the smart chip 209 to the memory of the smart chip 209.

The wireless communicator 206 may comprise a transmitter, a receiver, or combinations thereof (e.g., a transceiver or transmitter-receiver). In an embodiment, the wireless communicator 206 may comprise an antenna. The wireless communicator 206 may be positioned on the surface of the wallet redemption card 202; additionally or alternatively, the wireless communicator 206 may be embedded within at least a portion of the wallet redemption card 202. In embodiments, the wireless communicator 206 may be separate with the smart chip 209; alternatively, the wireless communicator 206 may be integral with the smart chip 209.

In embodiments, the wireless communicator 206 may be configured to communicate payment information via Bluetooth communication, near field communication (NFC), Wi-Fi communication, satellite communication, cellular communication, or combinations thereof, e.g., from a computer device 212 to the smart chip 209. In an embodiment, only a portion of the payment information for a payment account is communicated by the wireless communicator 206 from the computer device 212 to the smart chip 209. In additional or alternative embodiments, the entire payment information for a payment account is communicated by the wireless communicator 206 from the computer device 212 to the smart chip 209. In embodiments, at least a portion of payment information for more than one payment account (e.g., a first payment account and a second payment account) is communicated by the wireless communicator 206 from the computer device 212 to the smart chip 209.

In additional or alternative embodiments, the wireless communicator 206 may be configured to communicate payment information via Bluetooth communication, near field communication (NFC), Wi-Fi communication, satellite communication, cellular communication, or combinations thereof, e.g., from the smart chip 209 to a point-of-sale (POS) device 216. In an embodiment, only a portion of the payment information for a payment account is communicated by the wireless communicator 206 from the smart chip 209 to the POS device 216. In additional or alternative embodiments, the entire payment information for a payment account is communicated by the wireless communicator 206 from the smart chip 209 to the POS device 216. In embodiments, at least a portion of payment information for more than one payment account (e.g., a first payment account and a second payment account) is communicated by the wireless communicator 206 from the smart chip 209 to the POS device 216.

The interface 208 may comprise a device capable of reading and/or writing magnetic data from and/or to the rewriteable magnetic stripe 210. Such device may include a magnetic read head, a magnetic write head, both, or a combination thereof. The magnetic read and/or magnetic write head(s) may be configured to read and/or write one track, two tracks, or three tracks on the magnetic stripe 210. The interface 208 may be positioned on the surface of the wallet redemption card 202; additionally or alternatively, the interface 208 may be embedded within at least a portion of the wallet redemption card 202. In embodiments, the interface 208 may be separate from the smart chip 209; alternatively, the interface 208 may be integral with the smart chip 209. In embodiments, the interface 208 may be movable (e.g., automated or manual) over the magnetic stripe 210 for reading and writing operations by the interface 208 and movable (e.g., automated or manual) away from the magnetic stripe 210 for reading and writing operations by a programming device 214 and/or POS device 216. In additional or alternative embodiments, the interface 208 may be configured to: i) convert magnetic data to digital data and vice versa, ii) read payment information, iii) write payment information, or iv) combinations thereof.

In an embodiment, the interface 208 may be configured to receive payment information represented as digital data from the smart chip 209. In an embodiment, only a portion of the payment information for a payment account is received by the interface 208 from the smart chip 209. In additional or alternative embodiments, the entire payment information for a payment account is received by the interface 208 from the smart chip 209. In embodiments, at least a portion of payment information for more than one payment account (e.g., a first payment account and a second payment account) is received by the interface 208 from the smart chip 209.

In an embodiment, the interface 208 may be configured to convert payment information represented as magnetic data contained on the rewriteable magnetic stripe 210 to payment information represented as digital data for use and/or storage by the smart chip 209. In an additional or alternative embodiment, the interface 208 may be configured to convert payment information represented as digital data used and/or stored on the smart chip 209 to payment information represented as magnetic data contained on the rewriteable magnetic stripe 210. The magnetic data may comprise at least a portion of payment information of a payment account. The digital data may comprise at least a portion of payment information of a payment account.

In an embodiment, the interface 208 may be configured to read payment information from the magnetic stripe 210 (for example, via interface 208). Payment information read by the interface 208 may be stored by the smart chip 209 as described herein. In an embodiment, only a portion of the payment information for a payment account is read by the interface 208 from the magnetic stripe 210. In additional or alternative embodiments, the entire payment information for a payment account is read by the interface 208 from the magnetic stripe 210. In embodiments, at least a portion of payment information for more than one payment account (e.g., a first payment account and a second payment account) is read by the interface 208 from the magnetic stripe 210.

In an embodiment, the interface 208 may be configured to write payment information to the rewriteable magnetic stripe 210. Payment information written to the magnetic stripe 210 may be stored by the rewriteable magnetic stripe 210. In an embodiment, only a portion of the payment information for a payment account is written by the interface 208 to the magnetic stripe 210. In additional or alternative embodiments, the entire payment information for a payment account is written by the interface 208 to the magnetic stripe 210. In embodiments, at least a portion of payment information for more than one payment account (e.g., a first payment account and a second payment account) is written by the interface 208 to the magnetic stripe 210.

The computer device 212 may comprise a smartphone, a laptop, a tablet, a PC, a cloud computing system, a satellite, a cellular network, or combinations thereof. The computer device 212 may comprise a computer device disclosed herein above or may be a computer device separate of the computer devices disclosed hereinabove. The computer device 212 may include a payment account application which contains the payment information which a user of the system can transfer to the wallet redemption card 202. The payment account application may have a user interface which allows a user of the computer device to select one or more payment accounts and suitable payment information associated with the payment account(s) for communication to the wallet redemption card 202 and/or the programming device 214. Alternatively, the payment account application may automatically choose one or more payment accounts and suitable payment information associated with the one or more payment accounts for communication to the wallet redemption card 202 and/or the programming device 214.

The programming device 214 may comprise any device suitable for programming the rewriteable magnetic stripe 210 of the disclosed wallet redemption card 202. For example, the programming device 214 may comprise a magnetic stripe encoder. The programming device 214 may be configured to write the payment information to the rewriteable magnetic stripe 210.

The POS device 216 may comprise any device or terminal suitable for accomplishing a transaction with the smart chip 209 and/or magnetic stripe 210 of the wallet redemption card 202. Additionally, the POS device 216 may comprise any POS device or point of sale device described herein. The POS device 216 may be located at a vendor and/or redeeming merchant or retailer, but alternatively located at a kiosk or at a user's home or office where a personal computer is configured to act as a point of sale, for example during an on-line transaction. The POS device may be configured to read the payment information from the rewriteable magnetic stripe 210 of the wallet redemption card 202.

The computer device 212, programming device 214, and POS device 216 may operably connect to the wallet redemption card 202 in any suitable sequence or simultaneously. For example, an operable connection may be established between the computer device 212 and the wallet redemption card 202, and the wallet redemption card 202 may receive payment information from the computer device 212. An operable connection optionally may then be established between the programming device 214 and the wallet redemption card 202, and the wallet redemption card 202 may receive payment information from the programming device 214. The wallet redemption card 202 may then establish an operable connection with a POS device 216 for a transaction. In another example, an operable connection may be established between the programming device 214 and the wallet redemption card 202, and the wallet redemption card 202 may receive payment information from the programming device 214. An operable connection optionally may then be established between the computer device 212 and the wallet redemption card 202, and the wallet redemption card 202 may receive payment information from the computer device 212. The wallet redemption card 202 may then establish an operable connection with a POS device 216 for a transaction. Generally, an operable connection is established between the wallet redemption card 202 and the POS device 216 after payment information is received by the wallet redemption card 202 from the computer device 212 and/or programming device 214.

Payment information associated with a payment account may be communicated from the computer device 212 to the wallet redemption card 202. The smart chip 209 may receive the payment information via the wireless communicator 206. Upon receipt of the payment information, the smart chip 209 may send payment information to the rewriteable magnetic stripe 210 via the interface 208, may write payment information to the memory of the smart chip 209, may send payment information to the POS device 216 via the wireless communicator 206, or combinations thereof. The wireless communicator 206 may be configured to communicate wireless signals (e.g., Bluetooth, Wi-Fi, near field communication, or combinations thereof) between the computer device 212 and the smart chip 209.

When the smart chip 209 sends payment information to the magnetic stripe 210 via the interface 208, the payment information is in a digital data format. The interface 208 may receive the payment information in a digital data format and may convert the payment information from a digital data format to a magnetic data format. The interface 208 may then write the payment information (represented in magnetic data format) to the rewriteable magnetic stripe 210. The rewriteable magnetic stripe 210 may store the payment information in magnetic data format. The rewriteable magnetic stripe 210 may then be used for a payment transaction, for example, by swiping the rewriteable magnetic stripe 210 on the POS device 216. In an embodiment, the rewriteable magnetic stripe 210 may also have the dual functionality of storing payment information without using the rewriteable magnetic stripe 210 for a payment transaction. In such an embodiment, the rewriteable magnetic stripe 210 may serve only as a storage medium rather than as a mechanism for using the wallet redemption card 202 in a payment transaction. For example, the rewriteable magnetic stripe 210 may serve as a storage medium for later retrieval of the payment information by the smart chip 209 via the interface 208 (e.g., in locations where smart chip data security is more of a concern than magnetic strip data security). Storage of payment information on the rewriteable magnetic stripe 210 may occur indefinitely or for a storage period, for example, for less than about 30, 25, 20, 15, 10, 9, 8, 7, 6, 5, 4, 3, 2, 1, 0.1, 0.01 or less minutes.

When the smart chip 209 writes payment information to the memory of the smart chip 209, the smart chip 209 may serve the function of storing the payment information. Storage of payment information on the memory of the smart chip 209 may occur indefinitely or for a storage period, for example, for less than about 30, 25, 20, 15, 10, 9, 8, 7, 6, 5, 4, 3, 2, 1, 0.1, 0.01 or less minutes. The smart chip 209 may take no further action during storage of the payment information, or the smart chip 209 may perform other actions during storage. For example, the smart chip 209 may send payment information to the magnetic stripe 210 via interface 208, may send the payment information to the POS device 216, or combinations thereof.

When the smart chip 209 sends payment information to the POS device 216 via the wireless communicator 206, a payment transaction may occur between the smart chip 209 and the POS device 216. After a payment transaction occurs, the smart chip 209 may take no action. In such a scenario, the smart chip 209 may wait to receive payment information or may wait to again send the payment information to a POS device (e.g., POS device 216). After a payment transaction occurs, the smart chip 209 may perform other actions, for example, the smart chip 209 may send the payment information to the rewriteable magnetic stripe 210 via the interface 208 as described above (e.g., if the payment information is not already on the magnetic stripe 210), the smart chip 209 may write payment information to the memory of the smart chip 209 as described above (e.g., if not already done, if the payment information is different (e.g., a second payment information or a different portion), or if the payment information was erased), the smart chip 209 may erase payment information from the rewriteable magnetic stripe 210, the smart chip 209 may erase payment information from the memory of the smart chip 209, the smart chip 209 may again receive payment information (the same as before or different, e.g., a second payment information or a different portion of the payment accounting information).

As described hereinabove, the smart chip 209 may erase payment information from the rewriteable magnetic stripe 210, the memory of the smart chip 209, or both. After payment information is erased from the rewritable magnetic stripe 210, the smart chip 209 may resend payment information to the rewriteable magnetic stripe 210, whereafter the interface 208 convert the data and writes the payment information to the rewriteable magnetic stripe, as described above. After payment information is erased from the memory of the smart chip 209, the smart chip 209 may re-write payment information to the memory.

In embodiments, a programming device 214 may write the payment information associated with a payment account to the rewriteable magnetic stripe 210. After the payment information is received (e.g., written to) the rewriteable magnetic stripe 210 from the programming device 214, the rewriteable magnetic stripe 210 may store the payment information in magnetic data format. The rewriteable magnetic stripe 210 may then be used for a payment transaction, for example, by swiping the rewriteable magnetic stripe 210 on the POS device 216. In an embodiment, the rewriteable magnetic stripe 210 may also have the dual functionality of storing payment information without using the rewriteable magnetic stripe 210 for a payment transaction. In such an embodiment, the rewriteable magnetic stripe 210 may serve only as a storage medium rather than as a mechanism for using the wallet redemption card 202 in a payment transaction. For example, the rewriteable magnetic stripe 210 may serve as a storage medium for later retrieval of the payment information by the smart chip 209 via the interface 208 (e.g., in locations where smart chip data security is more of a concern than magnetic strip data security). Storage of payment information on the rewriteable magnetic stripe 210 may occur indefinitely or for a storage period, for example, for less than about 30, 25, 20, 15, 10, 9, 8, 7, 6, 5, 4, 3, 2, 1, 0.1, 0.01 or less minutes.

In embodiments, the smart chip 209 and the rewriteable magnetic stripe 210 may receive the payment information from the computer device 212 (e.g., the smart chip 209 sends the payment information received from the computer device 212 to the magnetic stripe 210 via the interface 208), or the smart chip 209 may receive payment information (e.g., from the computer device 212) and the rewriteable magnetic stripe 210 may receive payment information (e.g., from the programming device 214). The smart chip 209 may receive payment information (e.g., from the computer device 212) and the rewriteable magnetic stripe 210 may receive payment information (e.g., from the programming device 214) independently, or the computer device 212 may be used to control the transfer of payment information from the programming device 214 to the rewriteable magnetic stripe 210 of the wallet redemption card 202.

Embodiments of methods for operating the wallet redemption card 202 may also utilize multiple payment information associated with multiple payment accounts. For example, a first payment information may be associated with a first payment account (e.g., a credit account, debit account, gift account, or rewards account) and a second payment information may be associated with a second payment account (e.g., a credit account, debit account, gift account, or rewards account different from the first payment account), and the wallet redemption card 202 may utilize both the first payment information and the second payment information for one or more payment transactions.

In an embodiment, the smart chip 209 may receive the first payment information and the second payment information according to methods disclosed hereinabove (e.g., from the computer device 212 via the wireless communicator 206). The smart chip 209 may then write either or both the first payment information and the second payment information to the memory of the smart chip 209. Alternatively or additionally, the smart chip 209 may send either or both the first payment information and the second payment information to the rewriteable magnetic stripe 210 via the interface 208, wherein the interface 208 writes either or both the first payment information and second payment information to the rewriteable magnetic stripe 210. The smart chip 209 may write both the first payment information and the second payment information to the memory of the smart chip; alternatively or additionally, the smart chip 209 may send (and the interface 208 may write) both the first payment information and the second payment information to the magnetic stripe 210 via the interface 208; alternatively, the smart chip 209 may send the first payment information to the magnetic stripe 210 and may write the second payment information to the memory of the smart chip 209; alternatively, the smart chip 209 may send the second payment information to the magnetic stripe 210 and may write the first payment information to the memory of the smart chip 209. The smart chip 209 may erase either or both the first payment information and the second payment information from either or both of the rewriteable magnetic stripe 210 and the memory of the smart chip 209 according to the erasing conditions described hereinabove. The first payment information and the second payment information may be resent to the rewriteable magnetic stripe 210 and rewritten to the memory of the smart chip 209 according to the methods described hereinabove.

In an embodiment, the smart chip 209 may receive the first payment information (e.g., via the computer device 212) and the rewriteable magnetic stripe 210 may receive the second payment information (e.g., via the programming device 214). In such an embodiment, the second payment information does not reach the smart chip 209 unless the smart chip 209 later receives the second payment information from the computer device 212. The rewriteable magnetic stripe 210 may receive the first payment information from the smart chip 209 according to the methods described hereinabove (e.g., via the interface 208). The smart chip 209 may erase the first payment information (alternatively, also the second payment information if the second payment information is later received from the computer device 212) from the memory of the smart chip 209. The smart chip 209 may erase the second payment information from the rewriteable magnetic stripe 210 (alternatively, also the first payment information if the smart chip 209 sends the first payment information to the magnetic stripe 210). The first payment information may be resent to the rewriteable magnetic stripe 210, the first payment information may be rewritten to the memory of the smart chip 209, the second payment information may be rewritten to the rewriteable magnetic stripe 210, or combinations thereof.

In an embodiment, the rewriteable magnetic stripe 210 may receive the first payment information and the second payment information from the programming device 214. The first payment information and/or the second payment information written on the rewriteable magnetic stripe 210 may then be used for a payment transaction. The smart chip 209 may erase either or both the first payment information and the second payment information from the rewriteable magnetic stripe 210 according to the methods disclosed hereinabove. The first payment information and the second payment information may be rewritten to the rewriteable magnetic stripe 210 according to the methods described hereinabove.

Embodiments of methods for operating the wallet redemption card 202 may also utilize a payment information comprising a first portion and a second portion. For example, the first portion may comprise certain information of the payment account (e.g., an account number, UPS, a card security code (CSC), a card verification value (CVV or CV2), a card verification value code (CVVC), card verification code (CVC), verification code (V-code or V code), card code verification (CCV), credit card ID (CCID), a phone number, an identification number (e.g., PIN, driver's license number, passport number, visa number, social security number)), and the second portion may comprise certain other information of the payment account (e.g., an account number, UPS, a card security code (CSC), a card verification value (CVV or CV2), a card verification value code (CVVC), card verification code (CVC), verification code (V-code or V code), card code verification (CCV), credit card ID (CCID), a phone number, an identification number (e.g., PIN, driver's license number, passport number, visa number, or social security number different than the first portion)). The wallet redemption card 202 may utilize both the first portion and the second portion for one or more payment transactions.

In an embodiment, the smart chip 209 may receive the first portion and the second portion according to methods disclosed hereinabove (e.g., from the computer device 212 via the wireless communicator 206). The smart chip 209 may then write either or both the first portion and the second portion to the memory of the smart chip 209. Alternatively or additionally, the smart chip 209 may send either or both the first portion and the second portion to the rewriteable magnetic stripe 210 via the interface 208, wherein the interface 208 writes either or both the first portion and second portion to the rewriteable magnetic stripe 210. The smart chip 209 may write both the first portion and the second portion to the memory of the smart chip; alternatively or additionally, the smart chip 209 may send (and the interface 208 may write) both the first portion and the second portion to the magnetic stripe 210; alternatively, the smart chip 209 may send the first portion to the magnetic stripe 210 and may write the second portion to the memory of the smart chip 209; alternatively, the smart chip 209 may send the second portion to the magnetic stripe 210 and may write the first portion to the memory of the smart chip 209. The smart chip 209 may erase either or both the first portion and the second portion from either or both of the rewriteable magnetic stripe 210 and the memory of the smart chip 209 according to the erasing conditions described hereinabove. The first portion and the second portion may be resent to the rewriteable magnetic stripe 210 and rewritten to the memory of the smart chip 209 according to the methods described hereinabove.

In an embodiment, the smart chip 209 may receive the first portion (e.g., via the computer device 212) and the rewriteable magnetic stripe 210 may receive the second portion (e.g., via the programming device 214). In such an embodiment, the second portion does not reach the smart chip 209 unless the smart chip 209 later receives the second portion from the computer device 212. The rewriteable magnetic stripe 210 may receive the first portion from the smart chip 209 according to the methods described hereinabove (e.g., via the interface 208).

The smart chip 209 may erase the first portion (alternatively, also the second portion if the second portion is later received from the computer device 212) from the memory of the smart chip 209.

The smart chip 209 may erase the second portion from the rewriteable magnetic stripe 210 (alternatively, also the first portion if the smart chip 209 sends the first portion to the magnetic stripe 210). The first portion may be resent to the rewriteable magnetic stripe 210, the first portion may be rewritten to the memory of the smart chip 209, the second portion may be rewritten to the rewriteable magnetic stripe 210, or combinations thereof.

In an embodiment, the rewriteable magnetic stripe 210 may receive the first portion and the second portion from the programming device 214. The first portion and/or the second portion written on the rewriteable magnetic stripe 210 may then be used for a payment transaction. The smart chip 209 may erase either or both the first portion and the second portion from the rewriteable magnetic stripe 210 according to the methods disclosed hereinabove. The first portion and the second portion may be rewritten to the rewriteable magnetic stripe 210 according to the methods described hereinabove.

The disclosed wallet redemption card 202 provides multiple mechanisms for accomplishing a payment transaction: swiping the magnetic stripe 210, using the smart chip 209, or transactions involving both. In locations where information security of a magnetic stripe 210 is of a high concern, payment information may be used on the smart chip 210 of the wallet redemption card 202. In locations where information security of a smart chip 209 is of high concern, payment information may be used on the rewriteable magnetic stripe 210 of the wallet redemption card 202.

The wallet redemption card 202 allows a user the versatility of making payment transactions with merchants having a point of sale device which only utilizes the smart chip 209 and with merchants having a point of sale device which only utilizes the rewriteable magnetic stripe 210. Such versatility can be useful when travelling in locations in which a user is not aware which payment methods are most accepts (e.g., the magnetic stripe 210 or the smart chip 209).

The wallet redemption card 202 further allows a user the versatility of using different payment accounts from issuers which only issue accounts (e.g., for security reasons, or for reasons related to the issuer's payment system) for use with the magnetic stripe 210 or for use with the smart chip 209.

The erasing embodiments described herein may provide automatic deletion of payment information from the wallet redemption card 202. Such automatic deletion may provide theft deterrence as well as fraud prevention measures for users of the disclosed wallet redemption card 202.

With the erasing features described herein, an original user's payment information does not remain on the wallet redemption card 202. The wallet redemption card 202 is thus reusable by a single user or by multiple users without unauthorized exposure of payment information among multiple different users. In a scenario where a wallet redemption card 202 is lost, the finder may use the wallet redemption card 202 for his or her payment information without having access to the previous user's payment information.

It is believed the versatility of the wallet redemption card 202 may be enhanced with the use of multiple payment informations (e.g., a first payment information and a second payment information). First, two traditional card products (e.g., two of a credit card, debit card, gift card, or rewards card) may be replaced with the wallet redemption card 202 disclosed herein. Second, with the erasing/resending/rewriting features described herein, an unlimited number of card products may be replaced with the wallet redemption card 202 disclosed herein because the payment information for any card product may be written to the smart chip 209 or magnetic stripe 210 and subsequently erased for repeat use of the same or different payment information.

It is believed that information security may be enhanced when using the payment information divided in multiple portions (e.g., a first portion and a second portion) because the location of payment information is decentralized within the wallet redemption card 202. When decentralized, unauthorized users of the wallet redemption card 202 may not be able to use the card because all payment information is unavailable in a single payment mechanism (e.g., in the magnetic stripe 210 or in the smart chip 209). Only when all portions are gathered at the smart chip 209 and/or rewriteable magnetic stripe 210 may a payment transaction occur. The amount of time in which the portions are gathered all in either the smart chip 209 or magnetic stripe 210 relates closely to the amount of time needed for a payment transaction because of the erasing mechanisms described hereinabove.

Reconciliation of transactions made (e.g., on an open loop network) by presenting a proxy card as disclosed hereinabove may be accomplished according to the reconciliation techniques and embodiments disclosed herein. Transactions utilizing a proxy card may be processed via a processing switch. Transaction level reports may be generated and provided which differentiate between transactions made by presenting a proxy card and transaction made by other means of accessing the electronic wallet.

Authentication tokens may take and/or be associated with tangible or intangible embodiments such as a mobile device, a personal identification number, a phone number plus a personal identification number, a password, a username plus password, biometric identifier, and the like. Authentication tokens contain, provide and/or are associated with authentication information (e.g., electronic authentication data or information), which associates a user with an electronic wallet. As such, multiple value tokens contained in the electronic wallet (or a sub-wallet thereof) are associated with the user.

Figure 6E:
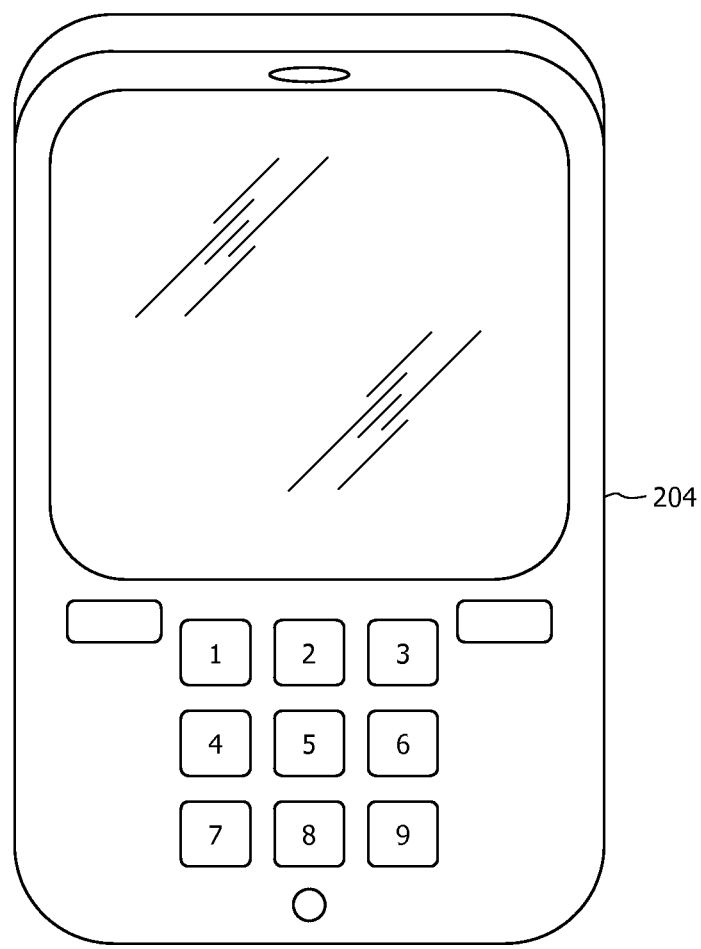
FIG. 6E is a front perspective view of a representative user device in accordance with at least one embodiment.

Any suitable authentication token as described herein such as virtual or cardless authentication tokens, mobile phones, etc. may be employed in the various embodiments described herein. In an embodiment, the authentication token is associated with a personal digital assistant such as a smart phone 204, as depicted in FIG. 6E. For example, an electronic wallet stored in and/or accessed via a phone may include an authentication token, or the phone itself may contain hardware and/or unique electronic data (e.g., authentication data such as serial number, MAC address, SIM card, digital signature, electronic key, user ID, phone number, passcode, etc.) that serves as the authentication token. Such a phone may use near field communication to communicate data associated with the authentication token with a point of sale device for authentication and transaction purposes. For example, the phone may be passed near the point of sale device and transfer user and/or wallet information and authentication information to the point of sale device using near field communication protocol. The phone may transfer all or a portion of the wallet and/or authentication information, leaving the point of sale device to determine which portions are applicable to the current transaction, or the phone may transfer only presently applicable portions of information, i.e. information to be used during the current transaction, to the point of sale device. That is, logic as to the transfer of wallet and/or authentication information to/from the authentication token (e.g., phone) and the point of sale device may reside on the authentication device, on the point of sale device, or both. In an embodiment, the phone may provide hardware and/or software for authenticating a user, for example a camera or scanner and associated application for confirming biometric data associated with the user, and upon authenticating the user, the phone would convey the successful authentication to the point of sale device. The point of sale device may communicate with the wallet host or provider (e.g., a primary e-wallet host) and any sub-wallet hosts or providers, e.g., third party administrators. In another example, the point of sale device may communicate with only the wallet host or provider (e.g., a primary e-wallet host), and the wallet host or provider may communicate with third party administrators, for example a sub-wallet host or administrator. Despite multiple configurations to enable communication, the transaction may still occur in real time with no delay to the customer because the parties use scalable architecture.

Returning to FIG. 4A, an electronic value token transaction computer 150 accesses electronic wallets 10 from datastore 180. The prepaid or stored value card electronic value tokens may include electronic representations of gift cards, loyalty cards, promotions, and the like. The POS device 111 obtains authentication information from an e-wallet user via an authentication token such as a smart phone or the proxy card 200 and sends the authentication information (and is some instances, rules for allocating the contents of the e-wallet for the requested transaction) to the electronic value token transaction computer 150 along with purchase information and/or value token information as part of a transaction request. The electronic value token transaction computer 150 uses the authentication information to locate the correct electronic wallet 10 or sub-wallet in the datastore 180 and acts upon the electronic value token (e.g., adds a value token to a primary wallet or sub-wallet, activates a value token, debits a value token, tops-off a value token, checks the balance of a value token, etc.) or examines rules (received with the request, associated with the e-wallet by the electronic value token transaction processing system 100, 1100, 1200, or a combination thereof) in light of the request's information. For example, for a purchase transaction the electronic value token transaction computer 150 selects the electronic value tokens that cover the purchase based on the rules, for example rules associated with the order or priority in which to apply or redeem value tokens to cover the purchase price.

Figure 5A:
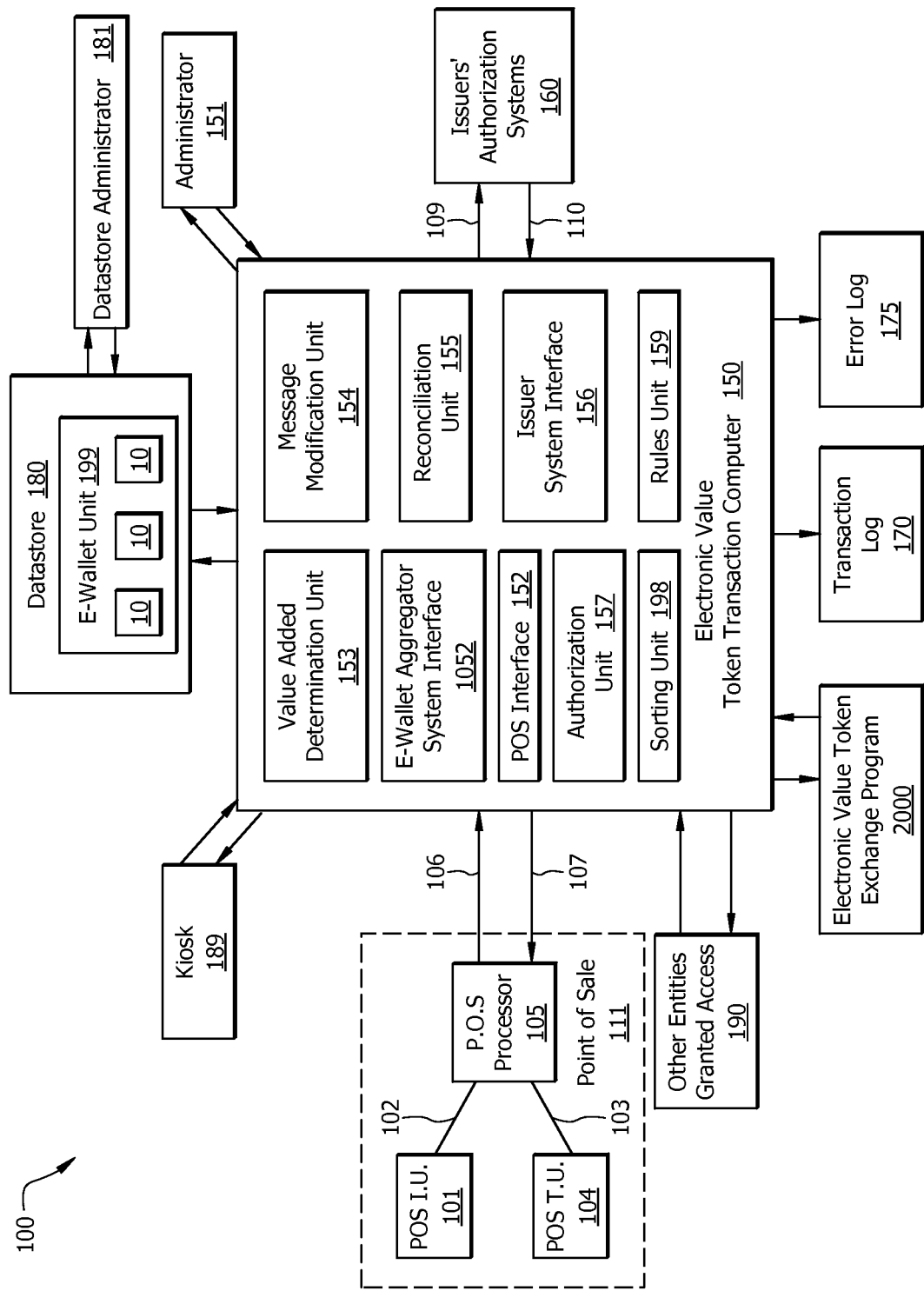
Figure 5B:
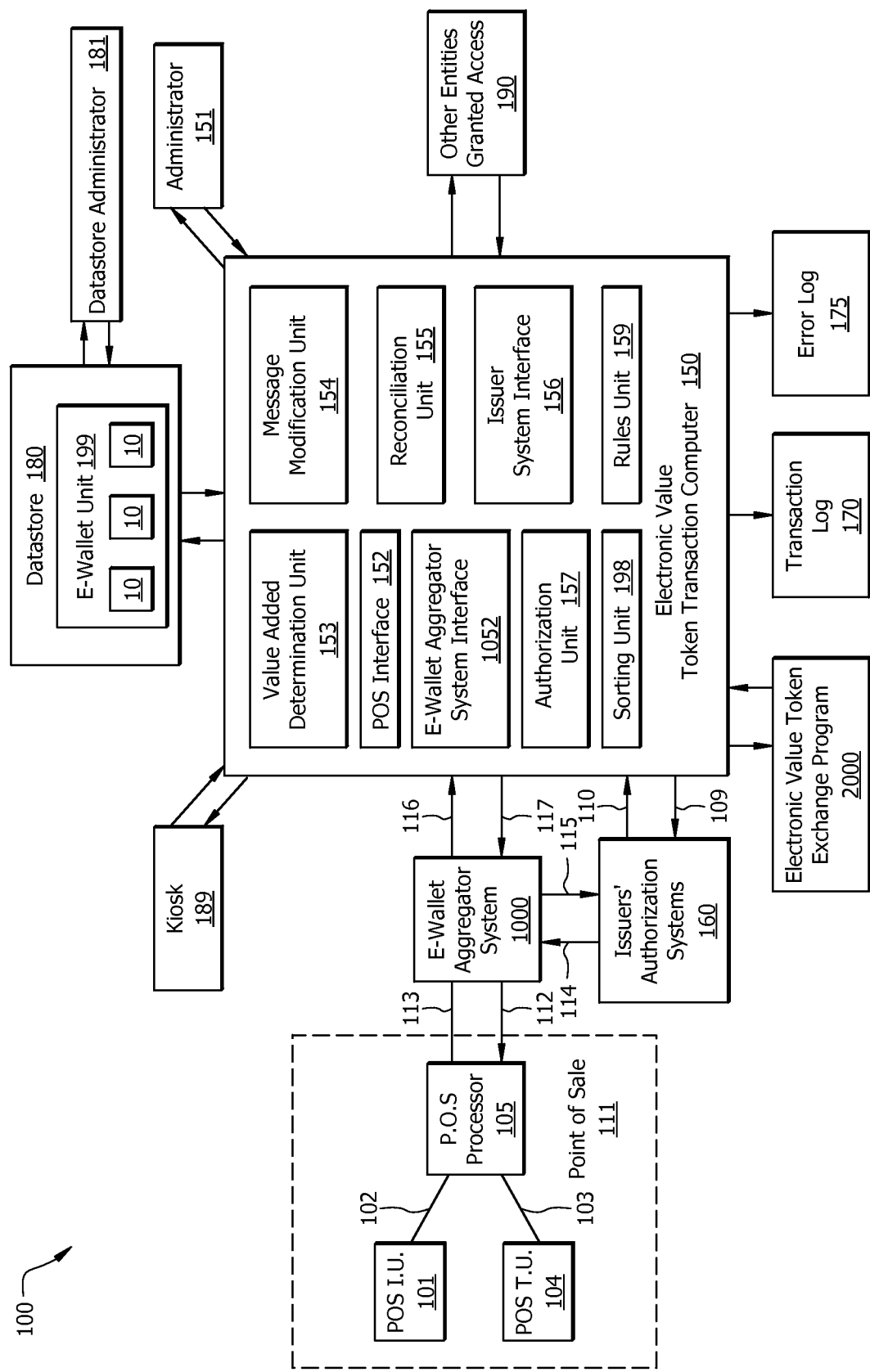

As shown in FIGS. 5A and 5B, the electronic value token transaction computer 150 comprises a rules unit 159. The rules unit 159 provides processing, management, associating, and implementing functionalities for e-wallet (and sub-wallet) rules as provided, selected, and/or required by e-wallet users, e-wallet providers, e-wallet accepting merchants, electronic value token issuers, e-wallet transaction system administrators, and combinations thereof. The rules unit 159 may function to associate provided, selected, and/or required rules with e-wallets and sub-wallets maintained in the database 180 and/or e-wallet unit 199. The rules unit 159 may comprise a rules engine for deriving rules to be applied to a transaction in the absence of (or in place of) any particular rule provided or selected by any other rule assigning entity. The rules unit 159 may provide for e-wallet/sub-wallet rules data to be populated via (i) e-wallet user input (e.g., via kiosk, smart phone, personal digital assistant, and internet accessible user interface); e-wallet provider input; (iii) e-wallet system administrator's input; (iv) or any combination thereof. For example, an e-wallet user may, via kiosk 189 interfacing, provide the electronic value token transaction computer 150 with specific, customized rules detailing the manner in which electronic value tokens contained in the e-wallet should be prioritized for use in satisfying transactions. Alternatively, the same e-wallet user could simply select the types of rules applicable to the e-wallet from a list of options provided by the kiosk's 189 display. In addition, there may be instances, e.g., in a savings context, wherein certain laws, regulations, and/or policies require that an e-wallet be limited to a given number of selected transactions per period (e.g., transfers from a savings-dedicated e-wallet).

In an embodiment, the rules can be created and configured by the user as a flowchart for selection of value tokens based on purchase information. For example, a rule may comprise selection of a closed loop-related (Store X branded) value token for a Store X purchase of any amount, with any remaining purchase balance to result in selection of an open loop-related (Credit Card Y) value token to fund such remainder. Alternatively, the user may invoke a rule that prescribes that open loop-related electronic value tokens should not be used to satisfy balances for closed loop-related electronic value token purchase, but rather debit card-related electronic value tokens residing in the e-wallet should be utilized to satisfy the balance instead. As such, a user may access and apply multiple value tokens with the efficiency of using one authentication token (e.g., one proxy card or smart phone). For example, the user may use an electronic gift card, an electronic coupon, and two electronic credit cards from an electronic wallet or sub-wallet all in the time it takes to use only one physical card such as a prepaid, debit, or credit card. The user, the retailer, issuers, vendors, merchants, advertisers, and other parties benefit from the time saved, the ready access to multiple sources of value (e.g., multiple accounts associated with the various value tokens), promotional opportunities, transaction tracking and data mining regarding customer purchasing behavior, promotional and advertising efficacy, real-time/point of product selection or purchase promotional opportunities, etc.

In another embodiment, the rules may be established by the e-wallet system provider (e.g., a primary and/or secondary e-wallet provider or host). The e-wallet system provider may establish a rule concerning e-wallet allocations when there is no user established rule available (or if under the terms of a user's e-wallet use agreement the system's rules take precedent in designated transaction activities). For example, the e-wallet system may put a rule in place that directs the electronic value token transaction computer 150 to first apply an e-wallet system provider's own branded electronic value token residing in the user's e-wallet to satisfy the requested transaction when the transaction concerns, relates, or involves an affiliate and/or contractually-related entity of the e-wallet system provider. As such, this type of rule could allow for the e-wallet system provider and its affiliates and/or contractually-related entities to maximize revenues or other business objectives based on use of the e-wallet system and other synergistic effects.

In a further embodiment, the e-wallet's rules may be fashioned to automatically direct electronic value token exchange activities (electronic value token exchange will be discussed in more complete detail herein). For example, the e-wallet user may manage the e-wallet (as will be described in more detail herein, e.g., in relation to FIGS. 9A-D) so that upon the occasion when the user presents the e-wallet to satisfy a transaction at retail establishment, e.g., Retailer Q, and the e-wallet contains no Retailer Q branded electronic value tokens, the e-wallet will automatically, and in real time, initiates an electronic value token exchange process wherein the e-wallet communicates a request for electronic value token exchange to the electronic value token transaction computer 150. Additionally or alternatively, the user may be presented in real-time with a promotion to obtain a retailer-specific value token (e.g., a real-time offer for a store branded value token such as a credit account). In this example, the e-wallet user may mange the e-wallet so that all electronic value tokens associated with prepaid services (gift card-type electronic value tokens) are located in a designated sub-wallet and each of said electronic value tokens may be placed/ordered/designated in the sub-wallet via a preferential ranking system, e.g., most preferred electronic value token or token type (e.g., #1) to least preferred electronic value token or token type (e.g., #22, if there are 22 types of electronic value tokens in the sub-wallet). For example, Retailer M branded electronic value tokens may be designated as most preferred and Retailer L branded electronic value tokens may be designated as least preferred. Further in the example, the e-wallet also has been provided with rules by the user that directs the e-wallet, in circumstances wherein the e-wallet has been presented to facilitate a transaction at a retailer in which the e-wallet contains none of said retailer's electronic value tokens (the e-wallet will recognize the retailer based on information exchanged between the e-wallet and the retailer's communication devices at the onset of the original transaction), such as the Retailer Q scenario described above, the e-wallet rules direct the e-wallet to initiate an electronic value token exchange request and to include in said request the exchange of the least preferred electronic value token residing in the e-wallet, i.e., the Retailer L branded electronic value token (#22) and if necessary preferred electronic value token #21, #20, etc., for a Retailer Q electronic value token in an amount sufficient to meet the original transaction's amount. The electronic value token transaction computer 150, upon receipt of the electronic value token exchange request, communicates with an electronic value token exchange program 2000 (which is part of the overall electronic value token transaction processing system 100, 1100, or 1200) to effectuate the requested electronic value token exchange. The requested electronic value token exchange is performed, the e-wallet receives the requested Retailer Q branded electronic value token, which is coincidentally used in conducting the original transaction, and the e-wallet surrenders (or makes unavailable for use and only available for modification) the Retailer L branded electronic value token to the electronic value token transaction computer 150, which in this case was actually valued in excess of the requested Retailer Q branded electronic value token. As such, the electronic value token transaction computer 150, modifies the value of the Retailer L branded electronic value token (either internally or via communication with the Retailer L branded electronic value token's issuing system) to reflect the value reduction based on the provided Retailer Q branded electronic value token, extracts the exchange rate for the exchange of the Retailer Q branded electronic value token for the Retailer L branded electronic value token (as will be discussed more fully herein), communicates the transactional information to all interested parties, and returns (or makes available again) the value-modified Retailer L branded value token to the user's e-wallet. In an alternate embodiment, the e-wallet's electronic value token exchange rules could have provided that the e-wallet query the electronic value token transaction computer 150 regarding the best available exchange rate for the electronic value tokens residing in the e-wallet and make the exchange based on the best exchange rate rather than the ranking of the electronic value tokens.

FIG. 5A illustrates an exemplary electronic value token transaction processing system 100 in accordance with one embodiment. As shown, the electronic value token transaction processing system comprises: (a) at least one point of sale device 111; (b) an electronic wallet processing system, e.g., electronic value token transaction computer 150; (c) a datastore 180 containing an electronic wallet unit 199 storing electronic value tokens, e.g., 804, 827, 828, and 829, such as account numbers, electronic wallet account information, value added award conditions (herein "value added award" is synonymous with "value added bonus," "value added bonus award," "value added award bonus," and "value differentiation"), and other information related to adding, redeeming, and managing the electronic value tokens; (d) at least one individual issuers' authorization system 160; and (e) any other unit included in the system by the electronic value token transaction computer administrator 151. In one embodiment, the electronic value token transaction computer 150 comprises a value added determination unit 153, a point-of-sale ("POS") interface 152, a message modification unit 154, a reconciliation unit 155, an issuer system interface 156, an authorization unit 157, and a sorting unit 198. In an embodiment, the electronic value token transaction computer 150 (or a unit thereof such as sorting unit 189) further comprises token exchange interface, which may communicate with electronic value token exchange program 2000. The POS Interface 152 provides a means for the electronic value token transaction computer 150 to communicate with the point of sale device 111 via, for example, the Internet, a Public Switched Telephone Network ("PSTN"), or an independent dedicated network. Likewise, the electronic value token transaction computer 150 may communicate via issuer system interface 156 with the issuers' authorization system 160 via, for example, the Internet, a Public Switched Telephone Network (PSTN), or an independent dedicated network. Communications 106, 107 between the POS interface 152 and the point of sale device 111 and communications 109, 110 between the issuer system interface 156 and the issuers' authorization systems 160 may be encrypted for added security and/or may utilize a virtual private network ("VPN"). The sorting unit 198 may sort the communications into various types for routing in various ways. For example, the sorting unit 198 may identify and sort electronic wallet and/or sub-wallet requests (e.g., upon receipt of authorization information with a transaction request, the sorting unit 198 can route the requested transaction to a specific electronic wallet maintained by the system and/or to a specific sub-wallet or sub-wallets associated with an electronic wallet), balance inquiry requests, registration requests, activation requests, redemption requests, and management requests for routing to the various units of FIG. 5A. The electronic value token transaction computer 150 or sorting unit 198 may also generate messages based on the requests for similar routing.

As can be seen in FIG. 5A, at the point of sale device 111 (typically located at a vendor and/or redeeming merchant or retailer, but alternatively located at a kiosk 189 or at a user's home or office where a personal computer is configured to act as a point of sale, for example during an on-line transaction), the authentication token is interpreted by a point of sale interpretation unit 101 (e.g., a card reader). The point of sale interpretation unit 101 can comprise a human, a bar code scanner, magnetic strip reader, optical character recognition device, biometric device, numerical keyboard (e.g., for entering a token identification number) or other device configured to interrogate, interpret, capture, or input the data encoded in or on the authentication token.

About contemporaneously with (or, alternatively, prior or subsequent to) the interpretation of the authentication token, a request for an electronic wallet transaction by a point of sale transaction unit 104 is made. The point of sale transaction unit 104 can comprise a human, an electronic input device, a register or terminal, a computer processing unit ("CPU"), a personal computer, a personal digital assistant (e.g., smart phone) or other means of requesting or messaging interpreted by the point of sale interpretation unit 101 and/or point of sale processing unit 105. In some embodiments, the actions performed by the point of sale interpretation unit 101 and the point of sale transaction unit 104 may be performed by one unit capable of performing both actions that would be performed by the individual units, for example a point of sale register/terminal or a personal computer during an on-line, web-based transaction.

The point of sale interpretation unit 101 and the point of sale transaction unit 104 communicate with the point of sale processing unit 105. The point of sale processing unit 105 can comprise a CPU or other type of processing device accepted for use in the industry. The point of sale interpretation unit 101 communicates authentication information 102 to the point of sale processing unit 105. The point of sale transaction unit 104 communicates the request 103 for an electronic wallet transaction to the point of sale processing unit 105. The point of sale processing unit 105 may combine this information to communicate with the electronic value token transaction computer 150 (e.g., transmits a message requesting an electronic wallet transaction along with the associated transaction and/or authentication data). In an embodiment, the point of sale processing unit 105 stores and/or receives from the electronic value token transaction computer 150 (or a sub-administrator or unit associated therewith, such as a sub-wallet administrator) a transaction format associated with the POS retailer and/or associated with a given transaction type and/or value token, and such transaction format may be used to format the transaction request or message, to prompt the user for further information, or for other data gathering or transmit/receive features at the point of sale. For example, a user making a purchase at a retailer operates a card reader. A card reader may a display with an input device and a barcode reader or magnetic strip scanner. The card reader may be touch sensitive and may have various buttons used for input. Following the card reader prompts, the user sees the options "Debit," "Credit," and "E-Wallet." The user selects "E-Wallet." The user then sees the options "Purchase," "Add Token," and "Delete Token." The user selects "Purchase." Following additional prompts (which in an embodiment relate to a transaction format specific to the particular retailer of the point of sale), the user enters a PIN number. In some embodiments, the actions performed by the point of sale interpretation unit 101, the point of sale transaction unit 104, and the point of sale processing unit 105 may all be performed by one unit (e.g., an integrated POS device such as a computerized register) capable of performing all the actions that would be performed by the individual units.

The point of sale processing unit 105 is connectable to the electronic value token transaction computer 150 via a suitable network, such as the Internet, the public switched telephone network (PSTN), or an independent dedicated network. Each point of sale processing unit 105 has an associated identifier (e.g., a terminal identifier or serial number) that may be transmitted to the electronic value token transaction computer 150 during the course of connecting the point of sale processing unit 105 to the electronic value token transaction computer 150. Each point of sale processing unit 105 may include multiple point of sale transaction units corresponding to individual terminals each with its own terminal identification, for example present within a given store location.

As depicted in FIG. 5A, the electronic value token transaction computer 150 is configured to: (a) form a secure connection with the retailer/merchant and/or vendor (e.g., via the point of sale device 111, customer internet access, or kiosk 189), the issuers' authorization systems 160, and any other entities 190 authorized to access the electronic value token transaction computer 150 by the electronic value token transaction computer administrator 151; (b) to communicate with issuers' authorization systems 160 to request and receive redemption or addition of value tokens into electronic wallets; (c) to communicate with issuers' authorization systems 160 to redeem all or a portion of the electronic value tokens associated with the electronic wallet; (d) generate and maintain a transaction log 170 of all activities performed; (e) generate and maintain an error log 175 of all activities unsuccessfully completed and reasons therefore; (f) communicate to the retailer/merchant and/or vendor (e.g., via the POS unit 111) the redemption or addition of value tokens into electronic wallets and any information concomitant with the redemption or addition of value tokens into electronic wallets; and (g) communicate to the retailer/merchant and/or vendor (e.g., via the POS unit 111) any reasons why transactions cannot not be completed.

The electronic value token transaction computer 150 may comprise a singular processing unit (e.g., a centralized server), a plurality of processing units (e.g., a distributed computing system with various units distributed and in communication with each other), or combinations thereof, with concomitant storage capabilities, each capable of or designated for: accessing the datastore 180; creating a transaction log 170; creating and maintaining an error log 175; communicating with retailers/merchants and/or vendors, e.g., at a point of sale, including via the internet for on-line transactions; communicating with the individual issuers' authorization systems 160; processing individual value token and electronic wallet requests; processing redemption requests; processing value added functions to add additional cash value or add an electronic redemption coupon for a specific product(s) or service(s); processing redemption request for electronic redemption coupons for specific product(s) and/or service(s); and communicating with other systems 190 capable of and authorized to communicate with the electronic value token transaction computer 150.

Datastore 180 maintains records of accounts associated with each electronic wallet indicating: (a) whether each individual value token has been added or redeemed, (b) whether the authentication token has been registered, (c) records and details of each individual redemption request, (d) the amount remaining on the electronic value tokens, (e) rules required for redeeming the electronic value tokens, (f) identity of the issuers of the electronic value tokens, (f) value added bonus awards, (g) rules for redeeming value added bonus awards, and (h) any combination thereof. The datastore may also maintain records of rules required for granting a value added bonus award to an electronic wallet or value token.

Datastore 180 also maintains records associated with each electronic wallet and/or sub-wallet indicating: (a) timing of, and other information related to, registration activities; (b) timing of, and other information related to, management activities; (c) timing of, and other information related to, transaction activities; (e) rules applicable; (f) identity of the issuers electronic value tokens therein; (f) identity of sub-wallets associated therewith; (h) any other records requested by issuers, merchants, vendors, advertisers, users, or other interested parties; and (i) any combination thereof. While a single datastore 180 is shown, it should be understood that a plurality of datastores may be employed, and relevant data divided among the datastores in any suitable manner to meet the various processes and objectives described herein. Also, the various data may be associated with one or more datastores closely coupled to and/or located in proximity to one or more sub-units, sub-processors, third party processors, and the like associated with the electronic value token transaction computer 150, and such datastores preferably have data used by such sub-units, sub-processors, and third party processors.

The electronic value token transaction computer 150 is also configured to generate and maintain a transaction log 170 of all activity involving the electronic value token transaction computer 150. The transaction log may comprise a detailed summary of transaction types such as: (a) requested value token additions; (b) requested value token sales; (c) requested value token redemptions; (d) requested value token exchanges; (e) the monetary amount ascribed to value token additions; (f) the monetary amount ascribed to value token redemptions; (g) the monetary value ascribed to value token exchanges; (h) the value added amounts, products, or services additions; (i) the value added amounts, products, or services redemptions; (j) the time the electronic value tokens were added; (k) the time the electronic value tokens were redeemed; (l) the transaction or communication performed with the issuer for adding value tokens; (m) the transaction or communication performed with the issuer for redeeming value tokens; (n) the PIN communicated to the vendor in response to a request to add a value token requiring the input of a PIN for use; (o) e-wallet registration; (p) e-wallet set-up activities; (q) e-wallet transaction activities; (r) e-wallet savings activities; (s) e-wallet management activities; (t) any other information the electronic value token transaction computer administrator 151 directs the electronic value token transaction computer 150 to maintain as a log entry; and (u) any combination thereof.

The information contained in the transaction log 170 may be used for data mining purposes, e.g., to generate reconciliation reports, settlement reports, payment reports, audit reports, e-wallet registration reports, e-wallet management reports, e-wallet usage reports, e-wallet savings reports, electronic value token purchase reports, electronic value token redemption reports, electronic value token exchange reports, electronic value token sale reports, or other forms of information aggregation for the benefit of, use by, or for provision to, the electronic value token transaction administrator 151, the datastore administrator 181, vendors, issuers, issuers' authorization systems 160, redeeming merchants, or other interested parties. For example, the transaction log 170 contains information about each transaction performed by electronic value token transaction computer 150 (and any sub-components thereof) and may be utilized by the reconciliation unit 155 when reconciling accounts belonging to various vendors, merchants, issuers and the electronic value token transaction processing system administrator(s). Additional data mining considerations that may be recorded, analyzed, and/or provided interested parties (e.g., vendors, merchants, issuers, advertisers, etc.) include data about: (i) the purchase habits of e-wallet users; (ii) electronic value token purchases, sales, redemptions, and exchanges; (iii), special offer and/or value added activities; (iv) loyalty-related activities; and (v) savings-related activities, all of which can be used for marketing, inventory, and other purposes.

Oversight and maintenance of the electronic value token transaction computer is performed by the electronic value token transaction computer administrator 151. Although not required, in an alternative embodiment, the electronic value token transaction computer administrator 151 may also function as the datastore administrator 181. The electronic value token transaction computer 150 is configured to generate and maintain an error log of all transactions that were not completed and reasons therefore. In some embodiments, the error log is administered by the electronic value token transaction computer administrator 151.

The electronic value token transaction computer 150 is also configured to communicate with other entities 190 authorized to access the electronic value token transaction processing system and specifically authorized to access the electronic value token transaction computer 150. These other entities may comprise third party payment management systems, third party audit systems, issuer affiliated entities, vendor affiliated entities, redeeming merchants or redeeming merchant affiliated entities, financial institutions such as banks, credit card agencies, or credit unions, or any other entity provided access by the electronic value token transaction computer administrator 151 or other entity having authority to grant access.

The transaction request from the point of sale device 111, or other access point, associated with an e-wallet may contain one or more of the following pieces of information: (a) authentication information, (b) point of sale terminal identification, (c) amount to be credited or debited, (d) the time of the request, (e) the date of the request, (f) identification of the issuer, (g) identification of the vendor, (h) location of vendor, (i) identification of the product(s) and/or service(s) being purchased, (j) an activation or deactivation request, (k) a wallet management function such as addition of a value token, deletion of a value token, exchange of a value token, changing management or processing rules associated with one or more value tokens, partitioning a wallet into sub-wallets or vice-versa, etc., (l) and any combination thereof. However, the information contained within the request is not limited to the enumerated list but may comprise other items in addition to the items enumerated or in place of the items enumerated above.

Upon receipt of the electronic wallet transaction request from the point of sale, and identification and sorting as such by the sorting unit 198, the electronic value token transaction computer 150 accesses the electronic wallet unit of datastore 180. The electronic value token transaction computer 150 processes the information contained in the datastore 180 and communicates 109, 110 with the individual issuers' authorization systems 160 to effectuate management of the electronic value tokens and corresponding accounts. The message modification unit may adjust the messages and requests so that multiple units, sub-components/processors, or third-party administrators can recognize and correctly interpret the messages. For example, after the electronic value token transaction computer 150 determines the individual issuers' authorization systems 160 associated with the request, the message modification unit 154 accesses the database 180 to determine the appropriate transaction messaging formats for each individual issuers' authorization systems 160 and then formats the subsequent communications to said individual issuers' authorization systems 160 using the individual issuers' authorization systems 160 specified/preferred transaction format and vocabulary. The electronic value token transaction computer's 150 communication with the individual issuers' authorization systems 160 may occur simultaneously or independently. The electronic value token transaction computer 150 is connectable to the individual issuers' authorization systems as via a suitable network, such as the PSTN, the Internet, or an independent dedicated network. The electronic value token transaction computer 150 is configured to send and/or receive communication 110 from the issuers' authorization systems 160 concerning the status of the electronic value tokens.

The reconciliation unit 155 reconciles the accounts of various issuers, selling vendors, and/or redeeming merchants, to credit and debit appropriate merchants, vendors, the electronic value token transaction processing system administrator, and issuers with the value of various transactions to reflect which entities received value from which other entities. For example, if a vendor A sells a value token issued by issuer B for a specified amount and receives payment from a user who adds the electronic value token to the user's electronic wallet, the selling vendor receives a percentage (e.g., retains a percentage) of the purchase amount and/or a predetermined amount, the electronic value token system administrator receives a percentage of the purchase amount and/or predetermined amount for processing the transaction, and the issuer receives the remainder. If a value token issued by issuer Y is redeemed at merchant X to purchase items, then the amount redeemed is debited to the issuer Y and credited to the merchant X, sometimes minus a transaction fee collected by the issuer and/or a transaction or processing fee collected by the electronic value token transaction processing system administrator.

Authorization unit 157 is utilized when the electronic value token transaction computer 150 is also the authorizing system such that the electronic value token transaction computer 150 authorizes electronic wallet requests rather than transmitting the request to the issuers' authorization systems 160 for authorization. The authorization unit 157 may perform the same and/or different functions as described for authorization systems 160 and vice-versa.

The authorization unit 157 will validate the formatting of the e-wallet transaction request (e.g., primary or sub-wallet) received from the POS processor 105 (or other transaction originating device/component/processor). In other words, the authorization unit 157 will check the data fields in the request to confirm that the fields are populated with data and that the data is in the correct format (e.g., length, alphanumeric format). If the request is improperly formatted, the authorization unit 157 will reject the request, or in some embodiments may retrieve the proper format (e.g., from a format database) and modify the transaction request to comply with the proper format. The authorization unit 157 also performs various validation checks on the request. The authorization unit 157 verifies card-related transaction information based on an analysis of several criteria, such as: 1) determining that the UPC code for the product is present in the datastore 180 (or other database such as an issuer's database) for the electronic value token transaction processing system 100; 2) determining that the value amount of the requested transaction corresponds to the customer's payment for the subject transaction request, e.g., whether the UPC information identifies the card as a $25.00 card and that the corresponding transaction request includes a $25.00 payment by the customer; 3) determining that the UPC information identifies the card as being a type of card available for processing by the requesting merchant; and 4) determining that the Bank Identification Number ("BIN") of the card (i.e., the first six digits of the card's identification number), which identifies the card issuer, corresponds to the UPC information identifying the card issuer.

The authorization unit 157 may also verify transactions based on other criteria such as transaction velocity (number/amount per unit time). For example, if a card processor is concerned that multiple void transactions are indicative of fraudulent activity, the card processor could ask that the electronic value token transaction processing system 100 monitor the number of void transactions requested and reject transactions from terminals that exceed a pre-selected amount of void transactions per unit time. Lastly, the authorization unit 157 may be configured to reject transaction requests in the event that the information received by the authorization unit 157 is unintelligible.

If the request is properly formatted and is validated as described above, the electronic value token transaction computer 150 may transmit details of transactions to the issuers' authorization systems rather than authorization requests. Also, in some embodiments, the issuer, the authorizing system (e.g., authorization unit 157), and the transaction computer are part of the same entity and, in such an embodiment, there would be no issuers' authorization systems 160 or the issuers' authorization systems 160 would be under common control with the other units of the electronic value token transaction computer 150 (for example, a commonly owned and operated computing system, that may be centralized (e.g., part of a centralized data center) and/or distributed within a commonly owned or controlled system or network). Furthermore, it should be noted that although units associated with the electronic value token transaction computer 150 (e.g., units 152-157) are depicted as various units within a single data processing system for illustration and conceptual purposes, one or more of units 152-157 could be implemented on separate computers, systems, or servers in a distributed data processing environment.

Figure 7A:
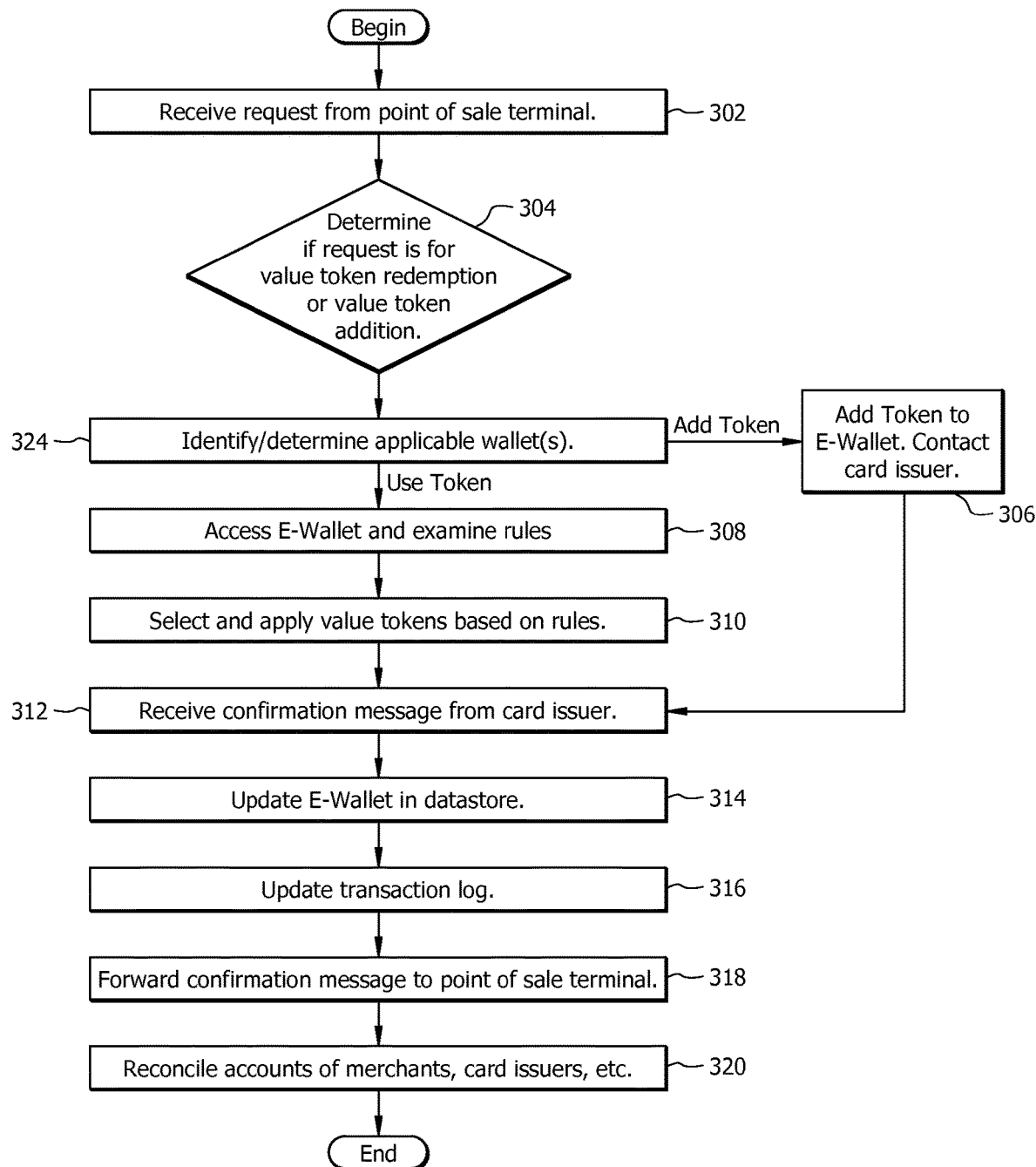
FIG. 7A is a flowchart depicting exemplary processes utilized by an electronic value token transaction computer for creating an electronic wallet or adding/redeeming value tokens to/from the electronic wallet in accordance with at least one embodiment.

An exemplary process utilized by an electronic value token transaction computer 150 for facilitating a purchase using an electronic wallet in accordance with a primary e-wallet transaction processing embodiment is depicted in FIG. 7A. Such an embodiment may be exemplified by the e-wallet transaction processing request being both initially received by and subsequently performed by the electronic value token transaction processing system 100. The actions depicted can be performed in the order shown or in a different order, and two or more of the actions can be performed in parallel.

In block 302, the electronic value token transaction computer 150 receives a request or multiple requests from a point of sale terminal. In at least one embodiment the requests may comprise an electronic wallet transaction request, a balance inquiry request, a registration request, an activation request, or a redemption request, a wallet management request, and contains one or more of the following: (a) identity of the terminal, (b) authentication information, (c) the amount of the purchase, (d) the identity of the electronic value token issuer, (e) the identity of the vendor, (f) the identity of the location, (g) the time of the request, (h) the date of the request, (i) information expressly identifying the request as an e-wallet transaction request (e.g., transaction type data); (j) information identifying a primary e-wallet, sub-wallet(s), or a combination thereof; (k) any other transaction and/or authentication data described herein; and (l) any combination thereof. The request at block 302 may comprise other information, requests or functions, for example of the types described herein, in addition to or in place of the above enumerated items. In at least one embodiment, the authentication information is based on an authentication token selected from the group consisting of proxy card and cellular phone. Using the identity of the electronic value token issuer, transactions may be correctly formatted for communication with the electronic value token issuer.

Using information contained within the electronic wallet transaction received from the point of sale device 111 and/or from information obtained from datastore 180, in block 304, the electronic value token transaction computer 150 determines whether the request is an electronic wallet request containing valid authentication information and whether the request is for redemption of a value token(s), addition of a value token(s), deletion of a value token(s), or management of the electronic wallet. The electronic wallet request may comprise a bank identification number ("BIN") located on the proxy card as part of the authentication information. The sorting unit may decode the BIN number or otherwise verify that the request is an electronic wallet request.

Using information contained within the electronic wallet transaction received from the point of sale device 111 and/or from information obtained from datastore 180, in block 324, the electronic value token transaction computer 150 identifies/determines the primary e-wallet, sub-wallet(s), and/or locations of said e-wallet or sub-wallet(s) indicated/necessary to effectuate the received e-wallet transaction request. If the authorization information received indicates the requested e-wallet transaction involves a primary e-wallet, sub-wallet, or combinations thereof maintained by the electronic value token transaction computer 150, the electronic value token transaction computer 150 may (i) apply its own logic to the request; (ii) apply rules stored in a primary wallet (e.g., rules established by the electronic value token transaction processing system administrator, the primary e-wallet user, or a combination thereof); (iii) apply rules stored in a sub-wallet (e.g., rules established by the electronic value token transaction processing system administrator, the sub-wallet user, or a combination thereof) (iv) apply rules received with the request from the point of sale 111 (e.g., contemporaneous rules submitted with the request by the user of the primary e-wallet/sub-wallet); (v) or any combination thereof.

For example, an embodiment may include the electronic value token transaction computer 150 determining that the entire request is related to value tokens contained in a primary e-wallet. Upon receipt of the request, the electronic value token transaction computer 150 will query its authorization unit 157 (as described more fully herein), its datastore 180, the E-Wallet unit 199, and any other necessary unit to determine whether the primary e-wallet comprises value tokens capable of meeting the subject request (e.g., whether the primary e-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the primary e-wallet corresponding to the request will be applied under the primary e-wallet's rules and/or rules received with the request, and perform or refuse to perform the requested transaction and/or transactions.

Another embodiment may include the electronic value token transaction computer 150 determining that the entire request is related to value tokens contained in a sub-wallet. Upon receipt of the request, the electronic value token transaction computer 150 will query its authorization unit 157 (as described more fully herein), its datastore 180, the E-Wallet unit 199, and any other necessary unit to determine whether the sub-wallet comprises value tokens capable of meeting the subject request (e.g., whether the sub-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the sub-wallet corresponding to the request will be applied under the sub-wallet's rules and/or rules received with the request, and perform or refuse to perform the requested transaction and/or transactions.

In another example, an embodiment may include the electronic value token transaction computer 150 determining that a portion of the entire transaction request is related to electronic value tokens residing in a primary e-wallet while a portion of the transaction request is related to electronic value tokens residing in a sub-wallet(s). Such determination may be made by evaluating the requested transaction type, the electronic value token identification, or any other methods for determining transaction allocation. The electronic value token transaction computer 150 will evaluate the manner in which the electronic value tokens available in the primary e-wallet corresponding to the request will be applied under the primary e-wallet's rules (as those rule may affect payment methods to be employed which are located in the primary e-wallet), the electronic value token transaction computer 150 will evaluate the manner in which the electronic value tokens available in any applicable sub-wallet corresponding to the request will be applied under such sub-wallet's rules and/or rules received with the request, and perform or refuse to perform the requested transaction and/or transactions.

In an exemplary embodiment, at block 324, the electronic value token transaction computer 150 may identify, in response to a received transaction request, one or more value tokens in a primary e-wallet and one or more electronic value tokens in a sub-wallet that, when used together, will cover the entirety of the requested e-wallet transaction. Moreover, one of the electronic value tokens located in the primary e-wallet or sub-wallet may be an electronic representation of a loyalty card and another electronic value token located in either the same or different location of said loyalty card value token may be an electronic representation of a retailer's gift card. In such an example, the electronic value token transaction computer 150 can effectuate the coincidental use of the "loyalty card" token and the "retailer's gift card" token, regardless of the tokens' locations in the primary e-wallet and/or sub-wallet(s) to allow for an enhanced user benefit as opposed to not coincidentally applying the value of the "retailer's gift card" token and the "loyalty card" token for the transaction, e.g., a 5% increase in the value of the "retailer's gift card" token or loyalty point bonus applied to the "loyalty card" token for the use of the "retailer's gift card" token.

A value token may be associated with a closed loop account or open loop account. A closed loop account typically expires after the funds in the account have been depleted, e.g. a gift card account. An open loop account does not typically expire. Rather, there is typically an ongoing obligation for various entities to credit and debit the account, e.g. a branded credit card account or debit card account such as Visa or Mastercard. Closed loop accounts are often associated directly with retailers while open loop accounts are often associated with financial institutions (e.g., Chase or Citi issued Visa). In at least one embodiment, the electronic value tokens comprise closed loop account numbers and open loop account numbers. The closed loop account numbers are associated with retailers able to debit or credit closed loop accounts associated with the closed loop account number. The open loop account numbers are associated with financial institutions able to debit or credit open loop accounts associated with the open loop account numbers. The electronic value token may have an expiration date or specified dates of use that are different from any other value tokens. Furthermore, the electronic value tokens may identify specific merchants, locations, and/or products with which the electronic value tokens may be utilized.

If the request is for value token addition, then in block 306, the electronic wallet is created (if not already created) and the electronic value token is added to the electronic wallet. The following Tables include elements, parameters, and information included in e-wallet transaction communications and used by the electronic value token transaction processing system 100 to facilitate and effectuate e-wallet transactions.

Table 1A illustrates request parameters requested to create a wallet in at least one embodiment. Table 1B illustrates response parameters requested to create a wallet in at least one embodiment.

TABLE 1A

Request Parameters

| Element | Data Type | Suggested Length | Description |
| --- | --- | --- | --- |
| accounttype | String | 200 | Account Type |
| loadamt | decimal | N/A | Amount to be loaded into the wallet account |
| loadamtcurrency | string | 3 | Denomination Type. |
| txn-uniqueidentifier | string | 12 | Unique transaction id. |

TABLE 1B

Response Parameters

| Element | Data Type | Description |
| --- | --- | --- |
| accountid | string | Unique identifier for a account |
| accounttype | string | Type of the account. |
| currency | string | Denomination Type. |
| balance | decimal | Balance available in the account |
| uniqueidentifier | string (numeric) | The unique identifier identifies a transaction. |
| code | string | The Status of the requested transaction. |
| description | string | The Status description of the requested transaction. |

The electronic value token transaction computer 150 preferably allocates memory for the electronic wallet and value token(s) and associates the account number with the electronic wallet and/or authentication information stored in the electronic wallet unit 199 by storing the pieces of information in a data structure on the datastore 180. Table 2 illustrates the parameters for a gift card value token in at least one embodiment.

TABLE 2

| Element and Description | Data Type | Suggested Length |
| --- | --- | --- |
| statusinfo.status.code | String | 7 |
| statusinfo.status.description | String | 500 |
| card.retailer.id | Integer String | 11 |
| card.retailer.name | String | 100 |
| card.number | String | 50 |
| card.securitycode | String | 50 |
| card.expirydate | Integer String | 6 |
| card.activationdate | Date String | 20 |
| card.initialbalance | Decimal String | 10 |
| card.currentbalance | Decimal String | 10 |
| card.currentbalanceasof | Date String | 20 |
| card.customerservice.phone | String | 20 |
| card.customerservice.website | String | 256 |
| card.currency | String | 3 |

Table 3 illustrates more detailed parameters for a gift card electronic value token in an alternative embodiment, including the designation of associated wallet(s) and/or sub-wallet(s).

TABLE 3

| Element and Description | Data Type | Suggested Length |
| --- | --- | --- |
| card.retailer.id | Integer String | 11 |
| card.retailer.name | String | 100 |
| card.number | String | 50 |
| card.securitycode | String | 50 |
| card.expirydate | Integer String | 6 |
| card.registeredto | String | 10 |
| card.activationdate | Date String | 20 |
| card.initialbalance | Decimal String | 10 |
| card.islookedupinitialbalance | String | 1 |
| card.currentbalance | Decimal String | 10 |
| card.islookedupcurrentbalance | String | 1 |
| card.customerservice.phone | String | 20 |
| card.customerservice.website | String | 256 |

TABLE 3-continued

| Element and Description | Data Type | Suggested Length |
| --- | --- | --- |
| card.notes | String | 500 |
| card.nickname | String | 100 |
| card.currency | String | 3 |
| card.user.firstname | String | 50 |
| card.user.lastname | String | 50 |
| card.user.address.line1 | String | 50 |
| card.user.address.line2 | String | 50 |
| card.user.address.city | String | 50 |
| card.user.address.state | String | 50 |
| card.user.address.zip | String | 5 |
| card.user.phone.number | String | 10 |
| card.user.email.address | String | 128 |
| card.additionalinfo1 | String | 300 |
| card.additionalinfo2 | String | 300 |
| card.additionalinfo3 | String | 300 |
| wallet.id Collection of folders | Integer String | 10 |
| wallet.folder.1.id | Integer String | 10 |
| wallet.folder.1.name | String | 100 |
| wallet.folder.2.id | Integer String | 10 |
| wallet.folder.2.name | String | 100 |
| [ . . . More folders] | | |

The request, however, may be modified for other reasons unrelated to the add token decision and forwarded to the appropriate one of the issuers' authorization systems 160 as part of the reconciliation process, for example the request could concern redemption, deletion, reloading value, added value, balance inquiry, or a combination thereof, each of which would be communicated to the issuers' authorization systems 160 for reconciliation.

Table 4 illustrates formatting for authentication communication.

TABLE 4

| Element and Description | Data Type |
| --- | --- |
| client_ref_id | String |
| signature | String |
| timestamp | String(in the format yyMMddHHmmssSSSz) |
| nonce | String |
| encryption_type | String |
| usertoken | String |
| uuid | String |
| user_ip | String |
| channel | String |

Each request is authenticated using the signature, a user is authenticated with username/password or open id, the session is validated using the user token. A client may send client_ref id, timestamp, nonce, encryption_type, channel, user_ip, signature, optionally usertoken with each request to be able to validate each message.

Table 5 illustrates the parameters used to retrieve a user's wallet.

TABLE 5

| Element | Data Type | Description |
| --- | --- | --- |
| accountid | string | Unique identifier for a account |
| accounttype | string | Type of the account. |
| currency | string | Denomination Type. |

TABLE 5-continued

| Element | Data Type | Description |
|---|---|---|
| balance | decimal | Balance available in the account |
| code | string | The Status of the requested transaction. |
| description | string | The Status description of the requested transaction. |

Table 6A illustrates the request parameters used to redeem value from a token in the wallet.

TABLE 6A

Request Parameters

| Element | Data Type | Suggested Length | Description |
|---|---|---|---|
| accountid | String | 100 | Unique identifier for the account |
| redamt | decimal | N/A | Amount to redeem from the account |
| redamtcurrency | string | 3 | Amount Type. |
| txn-uniqueidentifier | string | 12 | Unique transaction id. |
| txn-istimeoutreversal | bool | N/A | 0, if it is not a reversal of any transaction type 1, if it is a reversal transaction. |

Table 6B illustrates the response parameters used to redeem value from a token in the wallet.

TABLE 6B

Response Parameters

| Element | Data Type | Suggested Length | Description |
|---|---|---|---|
| accountid | string | 100 | Unique identifier for a account |
| accounttype | string | 50 | Type of the account. |
| currency | string | 3 | Denomination Type. |
| balance | decimal | N/A | Balance available in the account |
| uniqueidentifier | string | 12 | Unique identifier for the transaction. |
| code | string | 7 | The Status of the requested transaction. |
| description | string | 500 | The Status description of the requested transaction. |

Table 7A illustrates the request parameters used to load a value token into the wallet.

TABLE 7A

Request Parameters

| Element | Data Type | Suggested Length | Description |
|---|---|---|---|
| accountid | string | 100 | Unique identifier for a account |
| amount | decimal | N/A | Amount to load on the account |
| amountcurrency | string | 3 | Amount Type. |
| txn-istimeoutreversal | bool | N/A | 0, if it is not a reversal of any transaction type 1, if it is a reversal transaction. |
| txn-uniqueidentifier | string | 12 | Unique transaction id. |

Table 7B illustrates the response parameters used to load a value token into the wallet.

TABLE 7B

Response Parameters

| Element | Data Type | Suggested Length | Description |
|---|---|---|---|
| accountid | string | 100 | Unique identifier for a account |
| accounttype | string | 50 | Type of the account. |
| balance | decimal | N/A | Balance available in the account |
| uniqueidentifier | string (numeric values [0-9] only) | 12 | Unique identifier for the transaction. |
| code | string | 7 | The Status of the requested transaction. |
| description | string | 500 | The Status description of the requested transaction. |
| currency | string | 3 | Denomination Type. |

If the request is for value token redemption, then in block 308, the electronic value token transaction computer 150 accesses the electronic wallet previously determined to be associated with the authentication information and examines the rules associated with the electronic wallet. In at least one embodiment, examining the rules comprises examining priorities of value tokens configurable by the user. For example, the user may prefer to use any closed loop value tokens corresponding to the retailer originating the purchase request. If none is found or if the token will not cover the purchase, then the user may prefer to use an open loop value token for the remainder. As a result of these preferences, the closed loop value tokens may all have higher priority than the open loop value tokens. Among the open loop value tokens, one may have priority over another. For example, the user prefers to pay for any remainder with a credit card rather than a debit card. In at least one embodiment, the user may configure these rules via the Internet or mobile application and save the priorities as default preferences. In an alternative embodiment, the user selects the electronic value tokens to apply to the electronic wallet request at the POS device, for example at a vendor or retailer location such as a check-out lane, customer service counter, or kiosk. As such, selecting the electronic value tokens comprises selecting value tokens with the highest priority that, when used together, will cover the purchase amount. As can be seen in the example, one purchase transaction has been split into two redemptions without compromising efficiency of the purchase. Similarly, one or more electronic wallet transactions can be split into two or more transactions without compromising efficiency. In an embodiment, at least one of the electronic value tokens is associated with a closed loop prepaid account (e.g., an electronic prepaid, gift, or stored value card) and the rules associated with a primary wallet invoke a sub-transaction processed by a third party administrator associated with a sub-wallet.

In at least one embodiment, examining the rules comprises examining percentages of the electronic wallet request to which different value tokens should be applied and wherein applying the electronic value tokens comprises applying the electronic value tokens to the electronic wallet request in according to the percentages. In block 310, the electronic value token transaction computer 150 then selects, based on the rules, value tokens in the electronic wallet that, when used together, will cover the electronic wallet request. For example, the user may configure the rules such that each purchase is split evenly between two credit cards. As such, selecting the electronic value tokens comprises selecting two open loop tokens between which to split the purchase amount. Similar to the above example, efficiency is preserved because where a single authorization token (e.g., only the proxy card or a mobile device) was used at the point of sale, not the two credit cards corresponding to the electronic value tokens. Other rules can be implemented, and the rules can be used in various combinations and permutations with each other. The electronic value token transaction processing system can also implement "if-then" rules based on the information transmitted in the electronic wallet request. For example, a purchase at a gas station can result in a gas credit card value token selection, and the like. In such am embodiment, the electronic value token computer 150 may query the rule(s) 802, 817, 818, and 819 of the subject e-wallet 10 and/or sub-wallets 807 (e.g., for credit card-type electronic value tokens), 808 (e.g., for debit card-type electronic value tokens), and 809 (e.g., for stored value-type electronic value tokens) and determine, based on transaction request information which includes a transaction type, e.g., purchase at a gas station, that rule(s) established for the subject e-wallet 10 and/or sub-wallets 807, 808, and 809 require that the transaction type request be first satisfied with a first electronic value token type, e.g. a gas card-related electronic value token 829, and upon the occasion that the subject e-wallet 10 and/or sub-wallet(s) 807, 808, and 809 do not comprise a sufficient amount of the first value token type to satisfy the entire transaction request, the electronic value token computer 150 may satisfy the remainder of the transaction request with a second electronic value token type, e.g., a debit card-related electronic value token 828.

The electronic value token transaction computer 150 also applies the electronic value tokens to the electronic wallet request. In applying the electronic value tokens to the request, the electronic value token transaction computer 150 can generate and send debit and credit messages to be performed on the accounts administered by the retailers and financial institutions using the appropriate account numbers, or the electronic value token transaction computer 150 can credit or debit the accounts directly if the electronic value token transaction computer has such administrative authority.

In at least one embodiment, the electronic value token transaction computer 150 modifies the request (e.g., applies a required format) and forwards the modified request to the appropriate one of the issuers' authorization systems 160, which receives the modified request and acts upon same, for example authorizing and/or processing the request to redeem the electronic value token and updating a datastore accordingly. The authorization system 160 is not at the same location from where the electronic wallet request was received in at least one embodiment. For example, if the electronic wallet request was received from a retail store, the authorization system may be owned and operated by the retailer, but will not be at the retail store. Rather, the authorization system may be located at a data center for example. As such, neither the retail store nor the retailer in general need be aware of some or all the contents of the wallet. In at least one embodiment, the retail store is unaware of even the presence of the electronic wallet, as it merely recognizes that some transaction authorizing action has been communicated to its point of sale (e.g., swipe of a proxy card, digital personal assistant interaction with point of sale device, entry of a PIN at a keypad at point of sale, or other authorizing activity). In other words, access and use of the e-wallet at the point of sale is seamless and does not require any special or custom actions in order to process the transaction in comparison to traditional physical tender. The issuers' authorization systems 160 sends a response message back to the electronic value token transaction computer 150. In an alternative embodiment where the electronic value token transaction computer 150 performs the functions of the issuers' authorization systems 160, the method may proceed directly from block 306 or 310 to block 314.

The electronic value token transaction computer 150 receives the confirmation message from the appropriate one of the issuers' authorization systems 160 in block 312. At block 314, the electronic value token transaction computer 150 updates electronic wallet in the electronic wallet unit 199 and datastore 180 to reflect that the electronic wallet is activated and to reflect any debit, credit, addition, or deletion to/of the electronic value token(s). FIGS. 9A-D illustrate a series of user interface screens and prompts in at least one embodiment. For example, the user may see the illustrated prompts when managing the user's electronic wallet via a computer connected to the Internet, and/or kiosk 189.

A transaction log 170 may be updated by the electronic value token transaction computer 150 in block 316 to record the details about the transaction. The details recorded in the transaction log may include (a) the type, time and date of the transaction, (b) whether the electronic wallet was activated, (c) the reason electronic wallet was not activated if the request was denied, (d) the credit, debit, addition, or deletion to/of the electronic value token(s), (e) a change in rules associated with the electronic value token(s), (f) the identity of the vendor, (g) the identity of the issuer, (h) the location of the vendor, (i) the identity of the terminal adding the electronic value token, (j) the identity of the entity granting the electronic value token, and (k) any combination thereof. The transaction log may include other information (e.g., transaction and/or authentication data) in addition to or in place of the items enumerated above.

The electronic value token transaction computer 150, in block 318, then forwards the confirmation message to the point of sale device 111. The electronic value token transaction computer 150, prior to forwarding the confirmation message to the point of sale device 111, may modify the confirmation message, for example as necessary to include information that may be printed on a receipt for the customer and/or presented on a display to the store clerk operating the point of sale device 111. At block 320, the electronic value token transaction computer 150 reconciles the accounts of the various vendors, merchants, issuers, the electronic value token transaction processing system administrator, and other entities involved with issuing, selling, redeeming, and marketing the electronic value tokens to debit and credit appropriate accounts and, in some embodiments, initiates funds transfers between appropriate bank accounts belonging to the various entities. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various value tokens thus requiring fewer funds transfers to be initiated. In an embodiment, information in transaction log 170 is used to match transactions and the like. For example, grouping all transactions from a given location or a given merchant, or grouping transaction types (e.g., credit, debit, etc.). In various embodiments, the sequence of events depicted in may be varied, and thus may be carried out in any desired order, sequentially or simultaneously.

FIG. 5B illustrates an exemplary electronic value token transaction processing system 1100 in accordance with an embodiment wherein the electronic wallet processing system comprises the electronic value token transaction computer 150, functioning as an electronic sub-wallet transaction processor, integrated with a primary electronic wallet transaction processor such as depicted by E-Wallet Aggregator System 1000. E-Wallet Aggregator System 1000 may be further understood to have the same functionalities, capabilities, database access, networked connections, and operative components as the herein described electronic value token transaction computer 150, and in some embodiments an electronic value token transaction computer 150 and its associated components (e.g., electronic value token transaction processing system 100) may serve as, or be substituted for, the E-Wallet Aggregator System 1000. In an embodiment, the E-Wallet Aggregator System 1000 may be controlled, maintained, operated, owned, and/or otherwise managed by a common entity or entities which control, maintain, operate, own, and/or otherwise manage the electronic value token transaction computer 150. i.e., the primary electronic wallet transaction processor and the electronic sub-wallet transaction processor share a common controller, maintainer, operator, owner, and/or manager. In an embodiment, the E-Wallet Aggregator System 1000 may be controlled, maintained, operated, owned, and/or otherwise managed by an entity or entities that are separate, distinct, and/or unrelated to the entity and/or entities which control, maintain, operate, own, and/or otherwise manage the electronic value token transaction computer 150, i.e., the primary electronic transaction processor and the electronic sub-wallet transaction processor do not share a common controller, maintainer, operator, owner, and/or manager. As shown, when functioning in an electronic sub-wallet transaction processing capacity, the electronic value token transaction processing system 1100 comprises: (a) an electronic value token transaction computer 150; (b) an E-Wallet Aggregator System interface 1052; (c) a datastore 180 containing an electronic wallet unit 199 storing electronic value tokens, e.g., 804, 827, 828, and 829, such as account numbers, electronic wallet account information, value added award conditions (herein "value added award" is synonymous with "value added bonus," "value added bonus award," "value added award bonus," and "value differentiation"), and other information related to adding, redeeming, and managing the electronic value tokens, as described in detail herein; (d) at least one individual issuers' authorization system 160; and (e) any other unit included in the system by the electronic value token transaction computer administrator 151. In one embodiment, the electronic value token transaction computer 150 comprises a value added determination unit 153, an E-Wallet Aggregator System interface 1052, a message modification unit 154, a reconciliation unit 155, an issuer system interface 156, an authorization unit 157, and a sorting unit 198. The E-Wallet Aggregator System interface 1052 provides a means for the electronic value token transaction computer 150 to communicate with the E-Wallet Aggregator System 1000 via, for example, the Internet, a Public Switched Telephone Network ("PSTN"), or an independent dedicated network. Likewise, the electronic value token transaction computer 150 may communicate via issuer system interface 156 with the issuers' authorization system 160 via, for example, the Internet, a Public Switched Telephone Network (PSTN), or an independent dedicated network. Communications 116, 117 between the E-Wallet Aggregator System interface 1052 and the E-Wallet Aggregator System 1000 and communications 109, 110 between the issuer system interface 156 and the issuers' authorization systems 160 may be encrypted for added security and/or may utilize a virtual private network ("VPN"). The sorting unit 198 may sort the communications into various types for routing in various ways. For example, the sorting unit 198 may identify and sort sub-wallet requests (e.g., upon receipt of authorization information with a transaction request, the sorting unit 198 can route the requested transaction to a specific electronic sub-wallet maintained by the system and/or to a specific section or sections maintained within the electronic sub-wallet), balance inquiry requests, registration requests, activation requests, redemption requests, and management requests for routing to the various units of FIG. 5B. The electronic value token transaction computer 150 or sorting unit 198 may also generate messages based on the requests for similar routing.

As can be seen in FIG. 5B, at the point of sale device 111 (typically located at a vendor and/or redeeming merchant or retailer, but alternatively located at a kiosk 189 or at a user's home or office where a personal computer is configured to act as a point of sale, for example during an on-line transaction), the authentication token is interpreted by a point of sale interpretation unit 101 (e.g., a card reader). The point of sale interpretation unit 101 can comprise a human, a bar code scanner, magnetic strip reader, optical character recognition device, biometric device, numerical keyboard (e.g., for entering a token identification number) or other device configured to interrogate, interpret, capture, or input the data encoded in or on the authentication token.

About contemporaneously with (or, alternatively, prior or subsequent to) the interpretation of the authentication token, a request for an electronic wallet transaction by a point of sale transaction unit 104 is made. The point of sale transaction unit 104 can comprise a human, an electronic input device, a register or terminal, a computer processing unit ("CPU"), a personal computer, a personal digital assistant, smart phone, or other means of requesting or messaging interpreted by the point of sale interpretation unit 101 and/or point of sale processing unit 105. In some embodiments, the actions performed by the point of sale interpretation unit 101 and the point of sale transaction unit 104 may be performed by one unit capable of performing both actions that would be performed by the individual units, for example a point of sale register/terminal or a personal computer during an on-line, web-based transaction.

The point of sale interpretation unit 101 and the point of sale transaction unit 104 communicate with the point of sale processing unit 105. The point of sale processing unit 105 can comprise a CPU or other type of processing device accepted for use in the industry. The point of sale interpretation unit 101 communicates authentication information 102 to the point of sale processing unit 105. The point of sale transaction unit 104 communicates the request 103 for an electronic wallet transaction to the point of sale processing unit 105. The point of sale processing unit 105 may combine this information to communicate with the E-Wallet Aggregator System 1000 (e.g., transmits a message requesting an electronic wallet transaction along with the associated transaction and/or authentication data). In an embodiment, the point of sale processing unit 105 stores and/or receives from the E-Wallet Aggregator System 1000 (or a sub-administrator or unit associated therewith, such as a sub-wallet administrator, e.g., electronic value token transaction computer 150) a transaction format associated with the POS retailer and/or associated with a given transaction type and/or value token, and such transaction format may be used to format the transaction request or message, to prompt the user for further information, or for other data gathering or transmit/receive features at the point of sale. For example, a user making a purchase at a retailer operates a card reader. A card reader may a display with an input device and a barcode reader or magnetic strip scanner. The card reader may be touch sensitive and may have various buttons used for input. Following the card reader prompts, the user sees the options "Debit," "Credit," and "E-Wallet." The user selects "E-Wallet." The user then sees the options "Purchase," "Add Token," and "Delete Token." The user selects "Purchase." Following additional prompts (which in an embodiment relate to a transaction format specific to the particular retailer of the point of sale), the user enters a PIN number. In some embodiments, the actions performed by the point of sale interpretation unit 101, the point of sale transaction unit 104, and the point of sale processing unit 105 may all be performed by one unit (e.g., an integrated POS device such as a computerized register) capable of performing all the actions that would be performed by the individual units.

The point of sale processing unit 105 is connectable to the E-Wallet Aggregator System 1000 via a suitable network, such as the Internet, the public switched telephone network (PSTN), or an independent dedicated network. Each point of sale processing unit 105 has an associated identifier (e.g., a terminal identifier or serial number) that may be transmitted to the E-Wallet Aggregator System 1000 during the course of connecting the point of sale processing unit 105 to the E-Wallet Aggregator System 1000. Each point of sale processing unit 105 may include multiple point of sale transaction units corresponding to individual terminals each with its own terminal identification, for example present within a given store location.

As depicted in FIG. 5B, the E-Wallet Aggregator System 1000 is configured to: (a) form a secure connection with the retailer/merchant and/or vendor (e.g., via the point of sale device 111), the electronic value token transaction computer 150, and the issuers' authorization systems 160; (b) to communicate with issuers' authorization systems 160 to request and receive redemption or addition of value tokens into electronic wallets; (c) to communicate with issuers' authorization systems 160 to redeem all or a portion of the electronic value tokens associated with the electronic wallet; (d) communicate with the electronic value token transaction computer 150 to facilitate transactions concerning value tokens residing in an electronic sub-wallet maintained by the electronic value token transaction processing system 1100; (e) communicate to the retailer/merchant and/or vendor (e.g., via the POS unit 111) the redemption or addition of value tokens into electronic wallets and any information concomitant with the redemption or addition of value tokens into electronic wallets and/or sub-wallets; and (f) communicate to the retailer/merchant and/or vendor (e.g., via the POS unit 111) any reasons why transactions cannot not be completed.

The electronic value token transaction computer 150 may comprise a singular processing unit (e.g., a centralized server), a plurality of processing units (e.g., a distributed computing system with various units distributed and in communication with each other), or combinations thereof, with concomitant storage capabilities, each capable of or designated for: accessing the datastore 180; creating a transaction log 170; creating and maintaining an error log 175; communicating with the E-Wallet Aggregator System 1000; communicating with the individual issuers' authorization systems 160; processing individual value token and electronic wallet requests; processing redemption requests, processing value added functions to add additional cash value or add an electronic redemption coupon for a specific product(s) or service(s), processing redemption request for electronic redemption coupons for specific product(s) and/or service(s), and communicating with other systems 190 capable of and authorized to communicate with the electronic value token transaction computer 150.

Datastore 180 maintains records of accounts associated with each electronic sub-wallet indicating: (a) whether each individual value token has been added or redeemed, (b) whether an authentication token for an individual value token has been registered, (c) records and details of each individual redemption request, (d) the amount remaining on the electronic value tokens, (e) rules required for redeeming the electronic value tokens, (f) identity of the issuers of the electronic value tokens, (g) value added bonus awards, (h) rules for redeeming value added bonus awards, and (i) any combination thereof. The datastore may also maintain records of rules required for granting a value added bonus award to an electronic wallet or value token.

Datastore 180 also maintains records associated with each electronic wallet and/or sub-wallet indicating: (a) timing of, and other information related to, registration activities; (b) timing of, and other information related to, management activities; (c) timing of, and other information related to, transaction activities; (d) rules applicable; (e) identity of the issuers electronic value tokens therein; (f) identity of sub-wallets associated therewith; (g) any other records requested by issuers, merchants, vendors, advertisers, users, or other interested parties; and (h) any combination thereof. While a single datastore 180 is shown, it should be understood that a plurality of datastores may be employed, and relevant data divided among the datastores in any suitable manner to meet the various processes and objectives described herein. Also, the various data may be associated with one or more datastores closely coupled to and/or located in proximity to one or more sub-units, sub-processors, third party processors, and the like associated with the electronic value token transaction computer 150, and such datastores preferably have data used by such sub-units, sub-processors, and third party processors.

The electronic value token transaction computer 150 is also configured to generate and maintain a transaction log 170 of all activity involving the electronic value token transaction computer 150. The transaction log may comprise a detailed summary of transaction types such as: (a) requested value token additions; (b) requested value token sales; (c) requested value token redemptions; (d) requested value token exchanges; (e) the monetary amount ascribed to value token additions; (f) the monetary amount ascribed to value token redemptions; (g) the monetary value ascribed to value token exchanges; (h) the value added amounts, products, or services additions; (i) the value added amounts, products, or services redemptions; (j) the time the electronic value tokens were added; (k) the time the electronic value tokens were redeemed; (l) the transaction or communication performed with the issuer for adding value tokens; (m) the transaction or communication performed with the issuer for redeeming value tokens; (n) the PIN communicated to the vendor in response to a request to add a value token requiring the input of a PIN for use; (o) e-wallet registration; (p) e-wallet set-up activities; (q) e-wallet transaction activities; (r) e-wallet savings activities; (s) e-wallet management activities; (t) any other information the electronic value token transaction computer administrator 151 directs the electronic value token transaction computer 150 to maintain as a log entry; and (u) any combination thereof.

The information contained in the transaction log 170 may be used for data mining purposes, e.g., to generate reconciliation reports, settlement reports, payment reports, audit reports, e-wallet registration reports, e-wallet management reports, e-wallet usage reports, e-wallet savings reports, electronic value token purchase reports, electronic value token redemption reports, electronic value token exchange reports, electronic value token sale reports, or other forms of information aggregation for the benefit of, use by, or for provision to, the electronic value token transaction administrator 151, the datastore administrator 181, the E-Wallet Aggregator System 1000 (e.g., for communication to vendors or other purposes), vendors, issuers, issuers' authorization systems 160, redeeming merchants, or other interested parties. For example, the transaction log 170 contains information about each transaction performed by electronic value token transaction computer 150 (and any sub-components thereof) and may be utilized by the reconciliation unit 155 when reconciling accounts belonging to various E-Wallet Aggregator System 1000 associated vendors, merchants, issuers, as well as vendors, merchants, and issuers not associated with the E-Wallet Aggregator System 1000, and also the electronic value token transaction processing system administrator 151. Additional data mining considerations that may be recorded, analyzed, and/or provided interested parties (e.g., vendors, merchants, issuers, advertisers, etc.) include data about: (i) the purchase habits of e-wallet users; (ii) electronic value token purchases, sales, redemptions, and exchanges; (iii), special offer and/or value added activities; (iv) loyalty-related activities; and (v) savings-related activities, all of which can be used for marketing, inventory, and other purposes.

Oversight and maintenance of the electronic value token transaction computer is performed by the electronic value token transaction computer administrator 151. Although not required, in an alternative embodiment, the electronic value token transaction computer administrator 151 may also function as the datastore administrator 181. The electronic value token transaction computer 150 is configured to generate and maintain an error log of all transactions that were not completed and reasons therefore. In some embodiments, the error log is administered by the electronic value token transaction computer administrator 151.

The electronic value token transaction computer 150 is also configured to communicate with other entities 190 authorized to access the electronic value token transaction processing system and specifically authorized to access the electronic value token transaction computer 150. These other entities may comprise E-Wallet Aggregator System 1000, third party payment management systems, third party audit systems, issuer affiliated entities, vendor affiliated entities, redeeming merchants or redeeming merchant affiliated entities, financial institutions such as banks, credit card agencies, or credit unions, or any other entity provided access by the electronic value token transaction computer administrator 151 or other entity having authority to grant access.

In an embodiment, the transaction request from the E-Wallet Aggregator System 1000 may contain one or more of the following pieces of information: (a) authentication information, (b) point of sale terminal identification, (c) amount to be credited or debited, (d) the time of the request, (e) the date of the request, (f) identification of the issuer, (g) identification of the vendor, (h) location of vendor, (i) identification of the product(s) and/or service(s) being purchased, (j) an activation or deactivation request, (k) a wallet management function such as addition of a value token, deletion of a value token, exchange of a value token, changing management or processing rules associated with one or more value tokens, partitioning a wallet into sub-wallets or vice-versa, etc., (l) and any combination thereof. However, the information contained within the request is not limited to the enumerated list but may comprise other items in addition to the items enumerated or in place of the items enumerated above.

Upon receipt of the electronic wallet transaction request from the E-Wallet Aggregator System 1000, and identification and sorting as such by the sorting unit 198, the electronic value token transaction computer 150 accesses the electronic wallet unit of datastore 180. The electronic value token transaction computer 150 processes the information contained in the datastore 180 and communicates 109, 110 with the individual issuers' authorization systems 160 to effectuate management of the electronic value tokens and corresponding accounts. The message modification unit may adjust the messages and requests so that multiple units, sub-components/processors, or third party administrators can recognize and correctly interpret the messages. For example, after the electronic value token transaction computer 150 determines the individual issuers' authorization systems 160 associated with the request, the message modification unit 154 accesses the database 180 to determine the appropriate transaction messaging formats for each individual issuers' authorization systems 160 and then formats the subsequent communications to said individual issuers' authorization systems 160 using the individual issuers' authorization systems 160 specified/preferred transaction format and vocabulary. The electronic value token transaction computer 150 can also provide the appropriate messaging formatting information, e.g., a template, to the E-Wallet Aggregator System 1000 to facilitate that system's processing of information related to the request. The electronic value token transaction computer's 150 communication with the individual issuers' authorization systems 160 may occur simultaneously or independently. The electronic value token transaction computer 150 is connectable to the individual issuers' authorization systems as via a suitable network, such as the PSTN, the Internet, or an independent dedicated network. The electronic value token transaction computer 150 is configured to send and/or receive communication 110 from the issuers' authorization systems 160 concerning the status of the electronic value tokens.

The reconciliation unit 155 reconciles the accounts of various issuers, selling vendors, and/or redeeming merchants, to credit and debit appropriate merchants, vendors, the electronic value token transaction processing system administrator, and issuers with the value of various transactions to reflect which entities received value from which other entities. For example, if a vendor A sells a value token issued by issuer B for a specified amount and receives payment from a user who adds the electronic value token to the user's electronic wallet, the selling vendor receives a percentage (e.g., retains a percentage) of the purchase amount and/or a predetermined amount, the E-Wallet Aggregator System 1000 and/or the electronic value token system administrator receives a percentage of the purchase amount and/or predetermined amount for processing the transaction, and the issuer receives the remainder. If a value token issued by issuer Y is redeemed at merchant X to purchase items, then the amount redeemed is debited to the issuer Y and credited to the merchant X, sometimes minus a transaction fee collected by the issuer and/or a transaction or processing fee collected by the electronic value token transaction processing system administrator.

Authorization unit 157 is utilized when the electronic value token transaction computer 150 is also the authorizing system such that the electronic value token transaction computer 150 authorizes electronic sub-wallet requests rather than transmitting the request to the issuers' authorization systems 160 for authorization. The authorization unit 157 may perform the same and/or different functions as described for authorization systems 160 and vice-versa.

The authorization unit 157 will validate the formatting of the wallet (e.g., primary or sub-wallet) transaction request received from the E-Wallet Aggregator System 1000. In other words, the authorization unit 157 will check the data fields in the request to confirm that the fields are populated with data and that the data is in the correct format (e.g., length, alphanumeric format). If the request is improperly formatted, the authorization unit 157 will reject the request, or in some embodiments may retrieve the proper format (e.g., from a format database) and modify the transaction request to comply with the proper format. The authorization unit 157 also performs various validation checks on the transaction request. The authorization unit 157 verifies card-related transaction information based on an analysis of several criteria, such as: 1) determining that the UPC code for the product is present in the datastore 180 (or other datastore such as an issuer's database) for the electronic value token transaction processing system 1100; 2) determining that the value amount of the requested transaction corresponds to the customer's payment for the subject transaction request, e.g., whether the UPC information identifies the card as a $25.00 card and that the corresponding transaction request includes a $25.00 payment by the customer; 3) determining that the UPC information identifies the card as being a type of card available for processing by the requesting merchant; and 4) determining that the Bank Identification Number ("BIN") of the card (i.e., the first six digits of the card's identification number), which identifies the card issuer, corresponds to the UPC information identifying the card issuer.

The authorization unit 157 may also verify transactions based on other criteria such as transaction velocity (number/amount per unit time). For example, if a card processor is concerned that multiple void transactions are indicative of fraudulent activity, the card processor could ask that the electronic value token transaction processing system 1100 monitor the number of void transactions requested and reject transactions from terminals that exceed a pre-selected amount of void transactions per unit time. Lastly, the authorization unit 157 may be configured to reject transaction requests in the event that the information received by the authorization unit 157 is unintelligible.

If the request is properly formatted and is validated as described above, the electronic value token transaction computer 150 may transmit details of transactions to the issuers' authorization systems rather than authorization requests. Also, in some embodiments, the issuer, the authorizing system 9 e.g., authorization unit 157), and the transaction computer are part of the same entity and, in such an embodiment, there would be no issuers' authorization systems 160 or the issuers' authorization systems 160 would be under common control with the other units of the electronic value token transaction computer 150 (for example, a commonly owned and operated computing system, that may be centralized (e.g., part of a centralized data center) and/or distributed within a commonly owned or controlled system or network). Furthermore, it should be noted that although units associated with the electronic value token transaction computer 150 (e.g., units 152-157) are depicted as various units within a single data processing system for illustration and conceptual purposes, one or more of units 152-157 could be implemented on separate computers, systems, or servers in a distributed data processing environment.

Figure 7B:
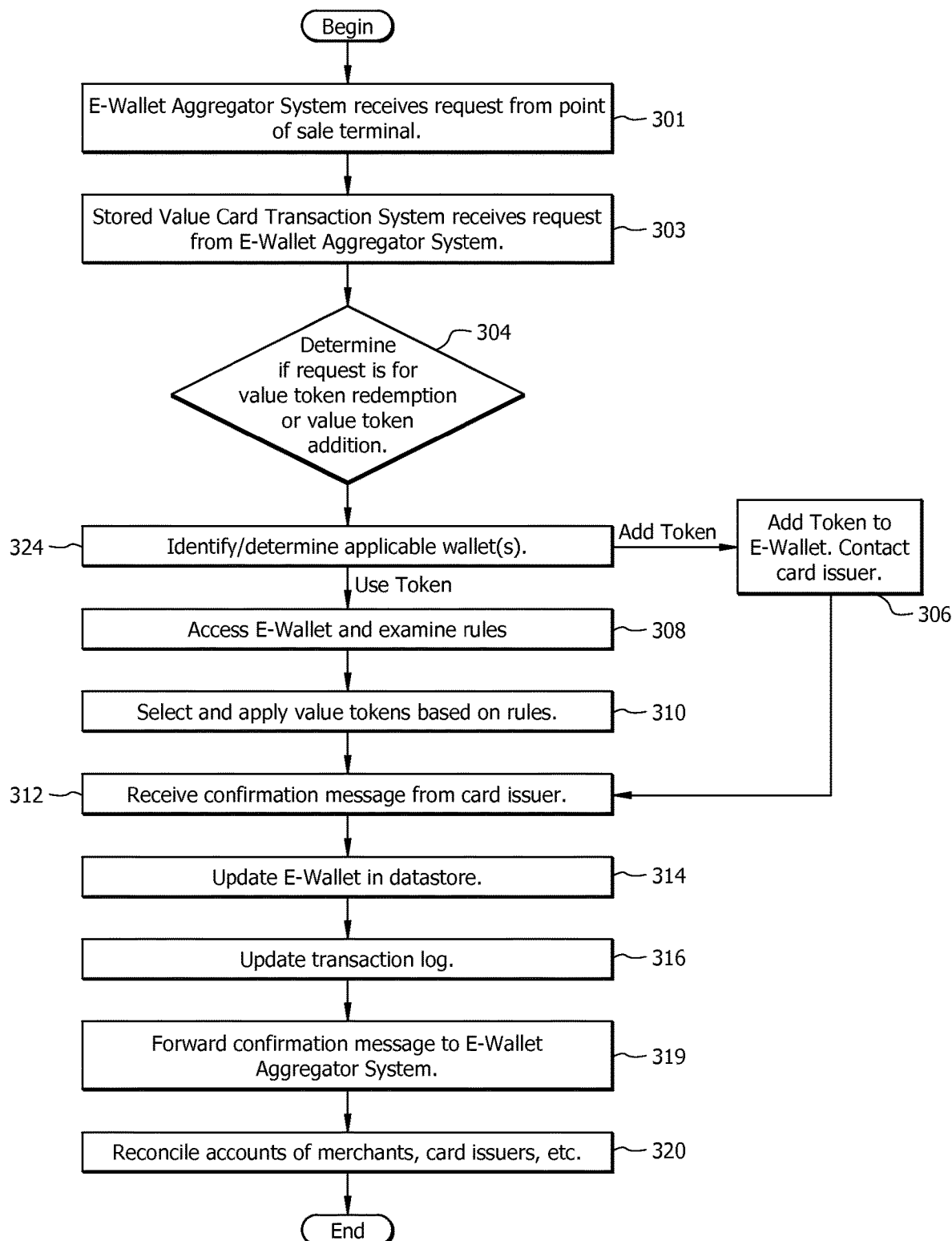
FIG. 7B is a flowchart depicting exemplary processes utilized by an electronic value token transaction computer for creating an electronic sub-wallet or adding/redeeming value tokens to/from the electronic sub-wallet in accordance with at least one embodiment.

An exemplary process utilized by an electronic value token transaction computer 150 for facilitating a purchase using an electronic wallet in accordance with an e-wallet transaction comprising an electronic sub-wallet maintained by a third party electronic value token transaction computer which maintains the sub-wallet as part of a relationship with a primary e-wallet system provider, e.g., the E-Wallet Aggregator System 1000, embodiment is depicted in FIG. 7B. Such an embodiment may be exemplified by the e-wallet transaction processing request being initially received by the E-Wallet Aggregator System 1000 and performed in part by the electronic value token computer 150. The actions depicted can be performed in the order shown or in a different order, and two or more of the actions can be performed in parallel.

In block 301, the E-Wallet Aggregator System 1000 receives a request or multiple requests from the point of sale 111. In at least one embodiment the requests may comprise an electronic wallet transaction request, a balance inquiry request, a registration request, an activation request, or a redemption request, a wallet management request, and contains one or more of the following: (a) identity of the terminal, (b) authentication information, (c) the amount of the purchase, (d) the identity of the electronic value token issuer, (e) the identity of the vendor, (f) the identity of the location, (g) the time of the request, (h) the date of the request, (i) information expressly identifying the request as an e-wallet transaction request (e.g., transaction type data); (j) information identifying a primary e-wallet, sub-wallet(s), or a combination thereof; (k) any other transaction and/or authentication data described herein; and (l) any combination thereof. The request at block 301 may comprise other information, requests or functions, for example of the types described herein, in addition to or in place of the above enumerated items. In at least one embodiment, the authentication information is based on an authentication token selected from the group consisting of proxy card and cellular phone.

Continuing with the process of block 301, the E-Wallet Aggregator System 1000 may determine that a portion of the requested e-wallet transaction may be processed via the E-Wallet Aggregator System 1000 while another portion of the requested e-wallet transaction implicates a sub-wallet which is maintained by a third party administrator, e.g., electronic value token transaction computer 150. If the electronic wallet transaction request information received by the E-Wallet Aggregator System 1000 indicates that the transaction request will require/involve a sub-wallet maintained by a third party administrator's system to fully effectuate a response to the transaction request, and the rules applicable to the associated primary e-wallet maintained by the E-Wallet Aggregator System 1000 so dictate, the E-Wallet Aggregator System 1000 processes the original request, generates a new request, generates a sub-request, or modifies the original request, to send to the sub-wallet which is maintained in association with the primary electronic wallet, e.g., the primary electronic wallet sends the original request, the new request, the sub-request, or the modified original request to the electronic value token transaction computer 150, which maintains the indicated sub-wallet. In processing the original request, generating the new request, generating the sub-request, or modifying the original request to send to the sub-wallet, the E-Wallet Aggregator System 1000 may (i) apply its own logic to the e-wallet transaction request; (ii) apply rules stored in the primary wallet (e.g., rules formulated by the primary e-wallet provider, the primary e-wallet user, or a combination thereof); (iii) apply rules received with the transaction request from the point of sale 111 (e.g., contemporaneous rules submitted with the request by the user of the primary electronic wallet and/or electronic sub-wallet); (iv) or any combination thereof.

In block 303, the electronic value token transaction computer 150 receives a request or multiple requests from the E-Wallet Aggregator System 1000. In at least one embodiment the requests may comprise an electronic sub-wallet request, a balance inquiry request, a registration request, an activation request, or a redemption request, a sub-wallet management request, and contains one or more of the following: (a) identity of the terminal, (b) authentication information, (c) the amount of the purchase, (d) the identity of the electronic value token issuer, (e) the identity of the vendor, (f) the identity of the location, (g) the time of the request, (h) the date of the request, (i) information expressly identifying the request as an e-wallet transaction request (e.g., transaction type data); (j) information identifying a primary e-wallet, sub-wallet(s), or a combination thereof; (k) any other transaction and/or authentication data described herein; and (l) any combination thereof. The request at block 303 may comprise other information, requests or functions, for example of the types described herein, in addition to or in place of the above enumerated items. In at least one embodiment, the authentication information is based on an authentication token selected from the group consisting of proxy card and cellular phone. Using the identity of the proxy card and/or cellular phone, embedded transactions may be correctly formatted for communication with the pertinent electronic value token issuers of the subject transaction request.

Using information received from the E-Wallet Aggregator System 1000 pursuant to the transaction request and from information obtained from datastore 180, in block 304, the electronic value token transaction computer 150 determines whether the request is an electronic sub-wallet request containing valid authentication information and whether the request is for redemption of a value token(s), addition of a value token(s), deletion of a value token(s), or other management of the electronic sub-wallet. The electronic sub-wallet request may comprise a bank identification number ("BIN") as part of the authentication information. The sorting unit may decode the BIN number or otherwise verify that the request is an electronic sub-wallet request concerning an electronic value token residing in the indicated sub-wallet.

Using information contained within the electronic wallet transaction received from the E-wallet Aggregator System 1000, and/or from information obtained from datastore 180, in block 324, the electronic value token transaction computer 150 identifies/determines the sub-wallet(s), and/or locations of said sub-wallet(s) indicated/necessary to effectuate the received e-wallet transaction request. If the authorization information received indicates the requested e-wallet transaction involves a sub-wallet maintained by the electronic value token transaction computer 150, the electronic value token transaction computer 150 may (i) apply its own logic to the request; (ii) apply rules stored in a sub-wallet (e.g., rules established by the electronic value token transaction processing system administrator, the sub-wallet user, or a combination thereof); (iii) apply rules stored in a sub-sub-wallet (e.g., rules established by the electronic value token transaction processing system administrator, the sub-sub-wallet user, or a combination thereof) (iv) apply rules received with the request from the point of sale 111 (e.g., contemporaneous rules submitted with the request by the user of the primary e-wallet/sub-wallet); (v) or any combination thereof.

For example, an embodiment may include the electronic value token transaction computer 150 determining that the entire request received from the E-Wallet Aggregator System 1000 is related to value tokens contained in a singular sub-wallet. Upon receipt of the request, the electronic value token transaction computer 150 will query its authorization unit 157 (as described more fully herein), its datastore 180, the E-Wallet unit 199, and any other necessary unit to determine whether the sub-wallet comprises value tokens capable of meeting the subject request (e.g., whether the sub-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the sub-wallet corresponding to the request will be applied under the sub-wallet's rules and/or rules received with the request, and perform or refuse to perform the requested transaction and/or transactions.

Another embodiment may include the electronic value token transaction computer 150 determining that the entire request received from the E-Wallet Aggregator System 1000 is related to value tokens contained in a sub-sub-wallet. Upon receipt of the request, the electronic value token transaction computer 150 will query its authorization unit 157 (as described more fully herein), its datastore 180, the E-Wallet unit 199, and any other necessary unit to determine whether the sub-sub-wallet comprises value tokens capable of meeting the subject request (e.g., whether the sub-sub-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the sub-sub-wallet corresponding to the request will be applied under the sub-sub-wallet's rules and/or rules received with the request, and perform or refuse to perform the requested transaction and/or transactions.

In another example, an embodiment may include the electronic value token transaction computer 150 determining that a portion of the request received from the E-Wallet Aggregator System 1000 is related to electronic value tokens residing in a sub-wallet while another portion of the request is related to electronic value tokens residing in a sub-sub-wallet. Such determination may be made by evaluating the requested transaction type, the electronic value token identification, or any other methods for determining transaction allocation. The electronic value token transaction computer 150 will evaluate the manner in which the electronic value tokens available in the sub-wallet corresponding to the request will be applied under the sub-wallet's rules (as those rule may affect payment methods to be employed which are located in the sub-wallet), the electronic value token transaction computer 150 will evaluate the manner in which the electronic value tokens available in any applicable sub-sub-wallet corresponding to the request will be applied under such sub-sub-wallet's rules and/or rules received with the request, and perform or refuse to perform the requested transaction and/or transactions.

In an exemplary embodiment, at block 324, the electronic value token transaction computer 150 may identify, in response to a received transaction request, one or more value tokens in a sub-wallet and one or more electronic value tokens in a sub-sub-wallet that, when used together, will cover the entirety of the requested e-wallet transaction. Moreover, one of the electronic value tokens located in the sub-wallet or sub-wallet may be an electronic representation of a loyalty card and another electronic value token located in either the same or different location of said loyalty card value token may be an electronic representation of a retailer's gift card. In such an example, the electronic value token transaction computer 150 can effectuate the coincidental use of the "loyalty card" token and the "retailer's gift card" token, regardless of the tokens' locations in the sub-wallet and/or sub-sub-wallet(s) to allow for an enhanced user benefit as opposed to not coincidentally applying the value of the "retailer's gift card" token and the "loyalty card" token for the transaction, e.g., a 5% increase in the value of the "retailer's gift card" token or loyalty point bonus applied to the "loyalty card" token for the use of the "retailer's gift card" token.

An electronic value token may be associated with a closed loop account or open loop account. A closed loop account typically expires after the funds in the account have been depleted, e.g. a gift card account. An open loop account does not typically expire. Rather, there is may be an ongoing obligation for various entities to credit and debit the account, e.g. a branded credit card account or debit card account such as Visa or Mastercard. Closed loop accounts are often associated directly with retailers while open loop accounts are often associated with financial institutions (e.g., Chase or Citi issued Visa). In at least one embodiment, the electronic value tokens comprise closed loop account numbers and open loop account numbers. The closed loop account numbers are associated with retailers able to debit or credit closed loop accounts associated with the closed loop account number. The open loop account numbers are associated with financial institutions able to debit or credit open loop accounts associated with the open loop account numbers. The electronic value token may have an expiration date or specified dates of use that are different from any other value tokens. Furthermore, the electronic value tokens may identify specific merchants, locations, and/or products with which the electronic value tokens may be utilized.

If the request is for electronic value token addition, then in block 306, the electronic sub-wallet is created (if not already created) and the electronic value token is added to the electronic sub-wallet. The following Tables include elements, parameters, and information included in e-wallet transaction communications and used by the electronic value token transaction computer 150 to facilitate and effectuate electronic sub-wallet transactions as part of a coincidental primary e-wallet transaction being processed by a primary e-wallet transaction processing system, e.g. the E-Wallet Aggregator System 1000.

Table 8A illustrates request parameters requested to create a sub-wallet in at least one embodiment. Table 8B illustrates response parameters requested to create a sub-wallet in at least one embodiment.

TABLE 8A

Request Parameters

| Element | Data Type | Suggested Length | Description |
| --- | --- | --- | --- |
| primaryewalletauth | string | variable | Authorization/ID of primary e-wallet provider (e.g., Google or PayPal) |
| accounttype | String | 200 | Account Type |
| loadamt | decimal | N/A | Amount to be loaded into the wallet account |
| loadamtcurrency | string | 3 | Denomination Type. |
| txn-uniqueidentifier | string | 12 | Unique transaction id. |

TABLE 8B

Response Parameters

| Element | Data Type | Description |
| --- | --- | --- |
| accountid | string | Unique identifier for a account |
| accounttype | string | Type of the account. |
| currency | string | Denomination Type. |
| balance | decimal | Balance available in the account |
| uniqueidentifier | string (numeric) | The unique identifier identifies a transaction. |
| code | string | The Status of the requested transaction. |
| description | string | The Status description of the requested transaction. |

The electronic value token transaction computer 150 preferably allocates memory for the electronic sub-wallet and value token(s) and associates the account number with the electronic sub-wallet and/or authentication information stored in the electronic wallet unit 199 by storing the pieces of information in a data structure on the datastore 180. Table 9 illustrates the parameters for a gift card value token in at least one embodiment.

TABLE 9

| Element and Description | Data Type | Suggested Length |
| --- | --- | --- |
| statusinfo.status.code | String | 7 |
| statusinfo.status.description | String | 500 |
| card.retailer.id | Integer String | 11 |
| card.retailer.name | String | 100 |
| card.number | String | 50 |
| card.securitycode | String | 50 |
| card.expirydate | Integer String | 6 |
| card.activationdate | Date String | 20 |
| card.initialbalance | Decimal String | 10 |
| card.currentbalance | Decimal String | 10 |
| card.currentbalanceasof | Date String | 20 |
| card.customerservice.phone | String | 20 |
| card.customerservice.website | String | 256 |
| card.currency | String | 3 |

Table 10 illustrates more detailed parameters for a gift card electronic value token in an alternative embodiment, including the designation of associated sub-wallet(s) and/or sub-sub-wallet(s).

TABLE 10

| Element and Description | Data Type | Suggested Length |
|---|---|---|
| card.retailer.id | Integer String | 11 |
| card.retailer.name | String | 100 |
| card.number | String | 50 |
| card.securitycode | String | 50 |
| card.expirydate | Integer String | 6 |
| card.registeredto | String | 10 |
| card.activationdate | Date String | 20 |
| card.initialbalance | Decimal String | 10 |
| card.islookedupinitialbalance | String | 1 |
| card.currentbalance | Decimal String | 10 |
| card.islookedupcurrentbalance | String | 1 |
| card.customerservice.phone | String | 20 |
| card.customerservice.website | String | 256 |
| card.notes | String | 500 |
| card.nickname | String | 100 |
| card.currency | String | 3 |
| card.user.firstname | String | 50 |
| card.user.lastname | String | 50 |
| card.user.address.line1 | String | 50 |
| card.user.address.line2 | String | 50 |
| card.user.address.city | String | 50 |
| card.user.address.state | String | 50 |
| card.user.address.zip | String | 5 |
| card.user.phone.number | String | 10 |
| card.user.email.address | String | 128 |
| card.additionalinfo1 | String | 300 |
| card.additionalinfo2 | String | 300 |
| card.additionalinfo3 | String | 300 |
| wallet.id | Integer String | 10 |
| Collection of folders | | |
| wallet.folder.1.id | Integer String | 10 |
| wallet.folder.1.name | String | 100 |
| wallet.folder.2.id | Integer String | 10 |
| wallet.folder.2.name | String | 100 |
| [ . . . More folders] | | |

The request, however, may be modified for other reasons unrelated to the add token decision and forwarded to the appropriate one of the issuers' authorization systems 160 as part of the reconciliation process, for example the request could concern redemption, deletion, reloading value, added value, balance inquiry, or a combination thereof, each of which would be communicated to the issuers' authorization systems 160 for reconciliation.

Table 11 illustrates formatting for authentication communication.

TABLE 11

| Element and Description | Data Type |
|---|---|
| client_ref_id | String |
| signature | String |
| timestamp | String(in the format yyMMddHHmmssSSSz) |
| nonce | String |
| encryption_type | String |
| usertoken | String |
| uuid | String |
| user_ip | String |
| channel | String |

Each request is authenticated using the signature, a user is authenticated with username/password or open id, the session is validated using the user token. A client may send client_ref id, timestamp, nonce, encryption_type, channel, user_ip, signature, optionally usertoken with each request to be able to validate each message.

Table 12 illustrates the parameters used to retrieve a user's wallet.

TABLE 12

| Element | Data Type | Description |
|---|---|---|
| accountid | string | Unique identifier for a account |
| accounttype | string | Type of the account. |
| currency | string | Denomination Type. |
| balance | decimal | Balance available in the account |
| code | string | The Status of the requested transaction. |
| description | string | The Status description of the requested transaction. |

Table 13A illustrates the request parameters used to redeem value from a token in the sub-wallet.

TABLE 13A

Request Parameters

| Element | Data Type | Suggested Length | Description |
|---|---|---|---|
| accountid | String | 100 | Unique identifier for the account |
| redamt | decimal | N/A | Amount to redeem from the account |
| redamtcurrency | string | 3 | Amount Type. |
| txn-uniqueidentifier | string | 12 | Unique transaction id. |
| txn-istimeoutreversal | bool | N/A | 0, if it is not a reversal of any transaction type 1, if it is a reversal transaction. |

Table 13B illustrates the response parameters used to redeem value from a token in the sub-wallet.

TABLE 13B

Response Parameters

| Element | Data Type | Suggested Length | Description |
|---|---|---|---|
| accountid | string | 100 | Unique identifier for a account |
| accounttype | string | 50 | Type of the account. |
| currency | string | 3 | Denomination Type. |
| balance | decimal | N/A | Balance available in the account |
| uniqueidentifier | string | 12 | Unique identifier for the transaction. |
| code | string | 7 | The Status of the requested transaction. |
| description | string | 500 | The Status description of the requested transaction. |

Table 14A illustrates the request parameters used to load a value token into the sub-wallet.

TABLE 14A

Request Parameters

| Element | Data Type | Suggested Length | Description |
|---|---|---|---|
| accountid | string | 100 | Unique identifier for a account |
| amount | decimal | N/A | Amount to load on the account |
| amountcurrency | string | 3 | Amount Type. |
| txn-istimeoutreversal | bool | N/A | 0, if it is not a reversal of any transaction type 1, if it is a reversal transaction. |
| txn-uniqueidentifier | string | 12 | Unique transaction id. |

Table 14B illustrates the response parameters used to load a value token into the sub-wallet.

TABLE 14B

Response Parameters

| Element | Data Type | Suggested Length | Description |
| --- | --- | --- | --- |
| accountid | string | 100 | Unique identifier for a account |
| accounttype | string | 50 | Type of the account. |
| balance | decimal | N/A | Balance available in the account |
| uniqueidentifier | string (numeric values [0-9] only) | 12 | Unique identifier for the transaction. |
| code | string | 7 | The Status of the requested transaction. |
| description | string | 500 | The Status description of the requested transaction. |
| currency | string | 3 | Denomination Type. |

If the request is for electronic value token redemption, then in block 308, the electronic value token transaction computer 150 accesses the electronic sub-wallet previously associated with the authentication information and examines the rules associated with the electronic sub-wallet. In at least one embodiment, examining the rules comprises examining priorities of value tokens configurable by the user. For example, the user may prefer to use any closed loop value tokens corresponding to the retailer originating the purchase request. If none is found or if the token will not cover the purchase, then the user may prefer to use an open loop value token for the remainder. As a result of these preferences, the closed loop value tokens may all have higher priority than the open loop value tokens. Among the open loop value tokens, one may have priority over another. For example, the user prefers to pay for any remainder with a credit card rather than a debit card. In at least one embodiment, the user may configure these rules via the Internet or mobile application and save the priorities as default preferences. In an alternative embodiment, the user selects the electronic value tokens to apply to the electronic wallet request in at the POS device, for example at a vendor or retailer location such as a check-out lane, customer service counter, or kiosk. As such, selecting the electronic value tokens comprises selecting value tokens with the highest priority that, when used together, will cover the purchase amount. As can be seen in the example, one purchase transaction has been split into two redemptions without compromising efficiency of the purchase. Similarly, one or more electronic wallet transactions can be split into two or more transactions without compromising efficiency.

In at least one embodiment, examining the rules comprises examining percentages of the electronic sub-wallet request to which different electronic value tokens should be applied and wherein applying the electronic value tokens comprises applying the electronic value tokens to the electronic sub-wallet request in according to the percentages. In block 310, the electronic value token transaction computer 150 then selects, based on the rules, value tokens in the electronic sub-wallet that, when used together, will cover the electronic sub-wallet request. For example, the user may configure the rules such that each purchase is split evenly between two credit cards. As such, selecting the electronic value tokens comprises selecting two open loop tokens between which to split the purchase amount. Similar to the above example, efficiency is preserved because where a single authorization token (e.g., only the proxy card or a mobile device) was used at the point of sale, not the two credit cards corresponding to the electronic value tokens. Other rules can be implemented, and the rules can be used in various combinations and permutations with each other. The electronic value token computer 150 can also implement "if-then" rules based on the information transmitted in the electronic sub-wallet request. For example, a purchase at a gas station can result in a gas credit card value token selection, and the like. In such am embodiment, the electronic value token computer 150 may query the rule(s) 802, 817, 818, and 819 of the subject e-wallet 10 and/or sub-wallets 807 (e.g., for credit card-type electronic value tokens), 808 (e.g., for debit card-type electronic value tokens), and 809 (e.g., for stored value-type electronic value tokens) and determine, based on transaction request information which includes a transaction type, e.g., purchase at a gas station, that rule(s) established for the subject e-wallet 10 and/or sub-wallets 807, 808, and 809 require that the transaction type request be first satisfied with a first electronic value token type, e.g. a gas card-related electronic value token 829, and upon the occasion that the subject e-wallet 10 and/or sub-wallet(s) 807, 808, and 809 do not comprise a sufficient amount of the first value token type to satisfy the entire transaction request, the electronic value token computer 150 may satisfy the remainder of the transaction request with a second electronic value token type, e.g., a debit card-related electronic value token 828.

The electronic value token transaction computer 150 also applies the electronic value tokens to the electronic sub-wallet request. In applying the electronic value tokens to the request, the electronic value token transaction computer 150 can generate and send debit and credit messages to be performed on the accounts administered by the retailers and financial institutions using the appropriate account numbers, or the electronic value token transaction computer 150 can credit or debit the accounts directly if the electronic value token transaction computer has such administrative authority.

In at least one embodiment, the electronic value token transaction computer 150 modifies the request and forwards the modified request to the appropriate one of the issuers' authorization systems 160, which receives the modified request and acts upon same, for example authorizing and/or processing the request to redeem the electronic value token and updating a datastore accordingly. The authorization system 160 is not at the same location from where the electronic sub-wallet request was received in at least one embodiment. For example, if the electronic sub-wallet request was received from a retail store, the authorization system may be owned and operated by the retailer, but will not be at the retail store. Rather, the authorization system may be located at a data center for example. As such, neither the retail store nor the retailer in general need be aware of some or all the contents of the sub-wallet. In at least one embodiment, the retail store is unaware of even the presence of the electronic wallet, as it merely recognizes that some transaction authorizing action has been communicated to its point of sale (e.g., swipe of a proxy card, digital personal assistant interaction with point of sale device, entry of a PIN at a keypad at point of sale, or other authorizing activity). The issuers' authorization systems 160 sends a response message back to the electronic value token transaction computer 150. In an alternative embodiment where the electronic value token transaction computer 150 performs the functions of the issuers' authorization systems 160, the method may proceed directly from block 306 or 310 to block 314.

The electronic value token transaction computer 150 receives the confirmation message from the appropriate one of the issuers' authorization systems 160 in block 312. At block 314, the electronic value token transaction computer 150 updates electronic sub-wallet in the electronic wallet unit 199 and datastore 180 to reflect that the electronic sub-wallet is activated and to reflect any debit, credit, addition, or deletion to/of the electronic value token(s). FIGS. 9A-D illustrate a series of user interface screens and prompts in at least one embodiment. For example, the user may see the illustrated prompts when managing the user's electronic wallet via a computer connected to the Internet, and/or kiosk 189.

A transaction log 170 may be updated by the electronic value token transaction computer 150 in block 316 to record the details about the transaction. The details recorded in the transaction log may include (a) the time and date of the transaction, (b) whether the electronic sub-wallet was activated, (c) the reason electronic sub-wallet was not activated if the request was denied, (d) the credit, debit, addition, or deletion to/of the electronic value token(s), (e) a change in rules associated with the electronic value token(s), (f) the identity of the vendor, (g) the identity of the issuer, (h) the location of the vendor, (i) the identity of the terminal adding the electronic value token, (j) the identity of the entity granting the electronic value token, (k) identity of the E-Wallet Aggregator System 1000 from which the sub-wallet request was received, (l) communications between the electronic value token transaction computer 150 and the E-Wallet Aggregator System 1000, and (m) any combination thereof. The transaction log may include other information in addition to or in place of the items enumerated above.

The electronic value token transaction computer 150, in block 319, then forwards the sub-wallet transaction results and associated information in the form of a confirmation message to the E-Wallet Aggregator System 1000. The electronic value token transaction computer 150, prior to forwarding the confirmation message to the E-Wallet Aggregator System 1000, may modify the confirmation message as necessary to include information that may be printed on a receipt for the customer and/or presented on a display to the store clerk operating the point of sale device 111. At block 320, the electronic value token transaction computer 150 reconciles the accounts of the various vendors, merchants, issuers, the electronic value token transaction processing system administrator, and other entities involved with issuing, selling, and marketing the electronic value tokens involved in the sub-wallet request to debit and credit appropriate accounts and, in some embodiments, initiates funds transfers between appropriate bank accounts belonging to the various entities. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various value tokens thus requiring fewer funds transfers to be initiated. In various embodiments, the sequence of events depicted in may be varied, and thus may be carried out in any desired order, sequentially or simultaneously.

Figure 5C:
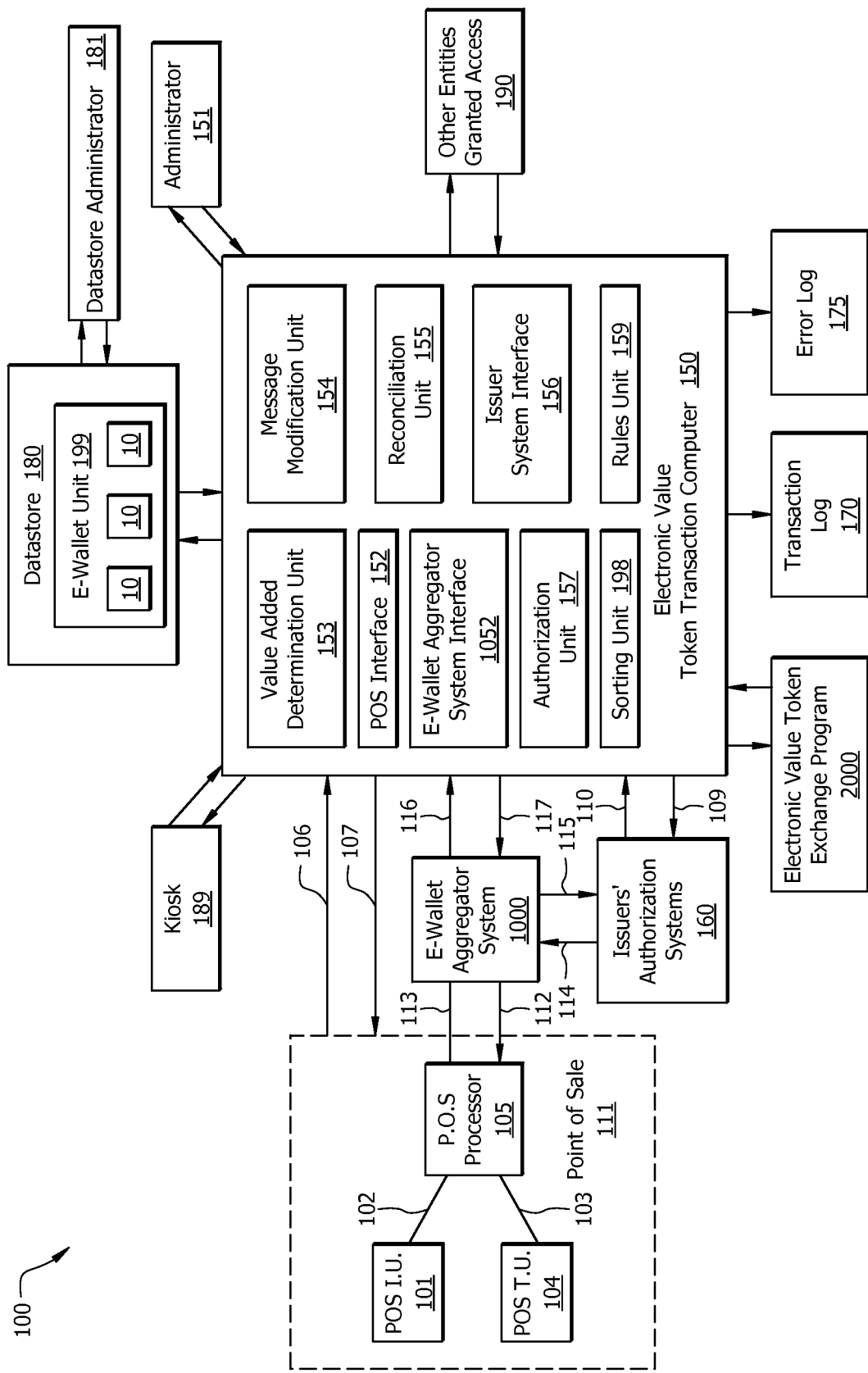

FIG. 5C illustrates an embodiment of the electronic value token transaction processing system 1200 wherein the electronic value token transaction computer 150 communicates with both the point of sale 111 and the E-Wallet Aggregator System 1000. Thus, the electronic value token transaction computer 150 may function as both a primary electronic wallet transaction processor and an electronic sub-wallet transaction processor as described in detail above with respect to FIGS. 5A and 5B.

Electronic wallet management may be carried out via a variety of user interfaces such as smart phone application, personal computer applications, website based applications, point of sale terminals, dedicated terminals at stores or other locations, such as kiosks.

In at least one embodiment, a user can perform numerous functions via the World Wide Web from a computer or mobile phone such as electronic wallet management functions (e.g., balance inquiry, managing loyalty and/or other bonus-type programs); exchange of value tokens such as (i) replace value token in e-wallet with value token not currently present in e-wallet, (ii) exchange between different wallets (such as placing an electronic value token from a sub-wallet configured to allow redemption activities into a sub-wallet configured for savings activities with limited redemption possibilities), and (iii) exchange with another user; purchase electronic value tokens to be placed in e-wallet; opt in or opt out of receiving targeted promotional offers and materials; and payment functions such as splitting the tender of payment between available electronic value tokens in the e-wallet.

Regarding possible exchange possibilities, a user may exchange a value token associated with a retailer that the user is unlikely to frequent with a value token associated with a retailer that the user is likely to frequent. Similarly, users may swap, sell, gift, or re-gift value tokens or bundles of value tokens to each other.

Via e-wallet management functionalities, a user can: (i) determine the amount of value associated with each value token such as reward points, dollar amounts, etc.; (ii) check expiration dates on value tokens, purchase value tokens for others as gifts, and receive notifications from specific retailers; (iii) create, register, and delete their electronic wallet or specific value tokens in their electronic wallet; (iv) request that the e-wallet provide or make available a physical representation of an electronic value token in the user's electronic wallet (e.g., in an embodiment, a print-on-demand service is provided to allow the user to print out a chit, coupon, check, or other physical representation of an electronic value token at a kiosk 189 or other accessible printer); and (v) allow the e-wallet to send the user specific value tokens, e.g., by using a GPS service in the user's mobile phone, or via integration with the user's SMS services.

In at least one embodiment, the user's electronic wallet is integrated with the user's social network services such as Facebook and Twitter. Accordingly, the user can perform management functions via social network platforms or receive value tokens via social network platforms. Full or partial information about the user's electronic wallet can be made available to the user's social network contacts as well.

As depicted in FIG. 9A, a user may access the e-wallet system, e.g., electronic value token transaction processing system 100 or E-Wallet Aggregator System 1000, via such systems' interactive display pages/screens (wherein the interactive display pages/screens are accessed via a user's computer, a user's personal digital assistant or smart phone, point of sale terminal, kiosk 189, or other device. As FIG. 9A depicts, a user may create and/or register an e-wallet or sub-wallet by providing certain requested information and agreeing to certain terms and conditions.

Figure 9B:
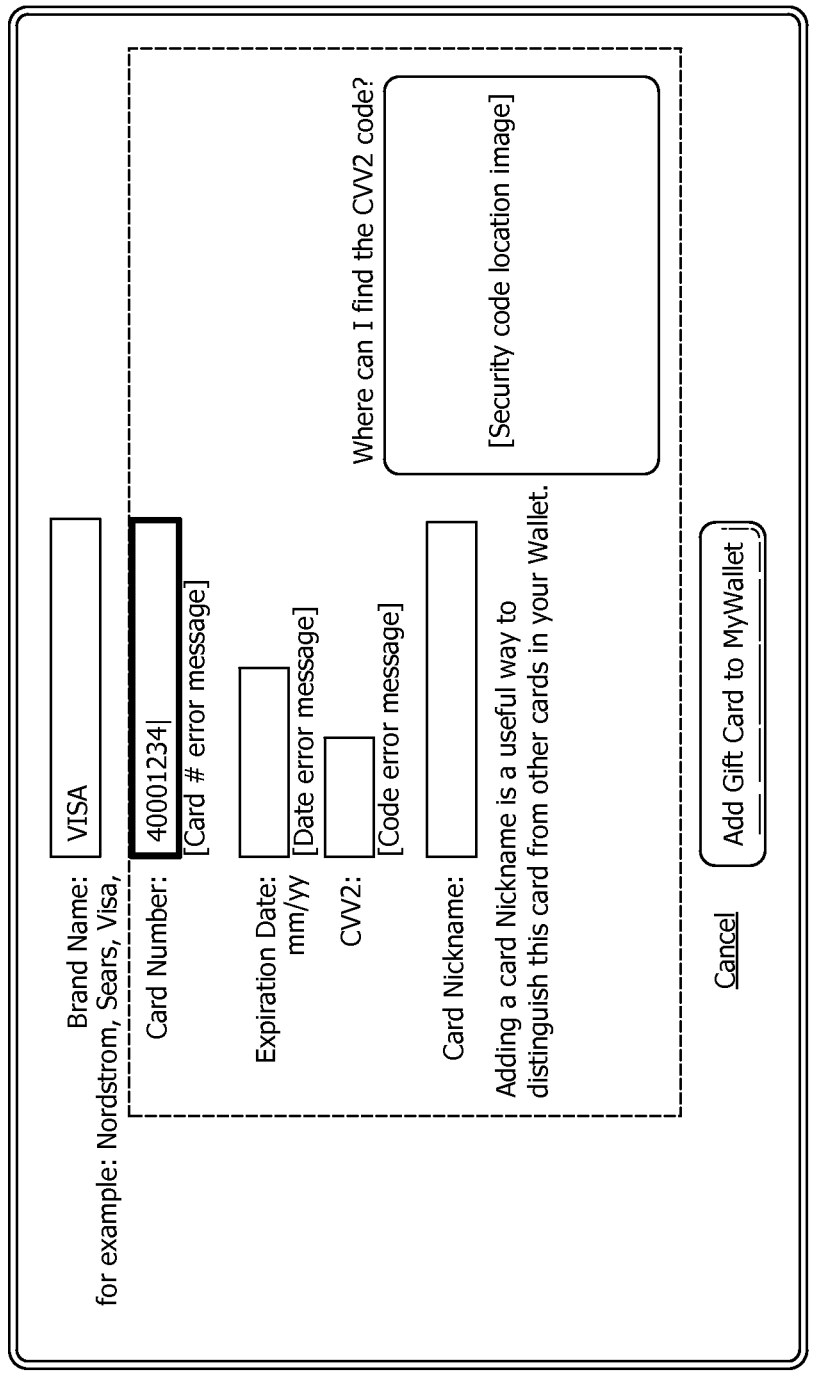

As depicted in FIG. 9B, a user may manage its e-wallet by inputting certain card specific information into the e-wallet systems interactive display page/screen. In an embodiment, a user may register a gift card by inputting the gift card's brand, card number, expiration date, CVV2 code, and card nickname and selecting the "Add Gift Card to MyWallet" button on the screen.

Figure 9C:
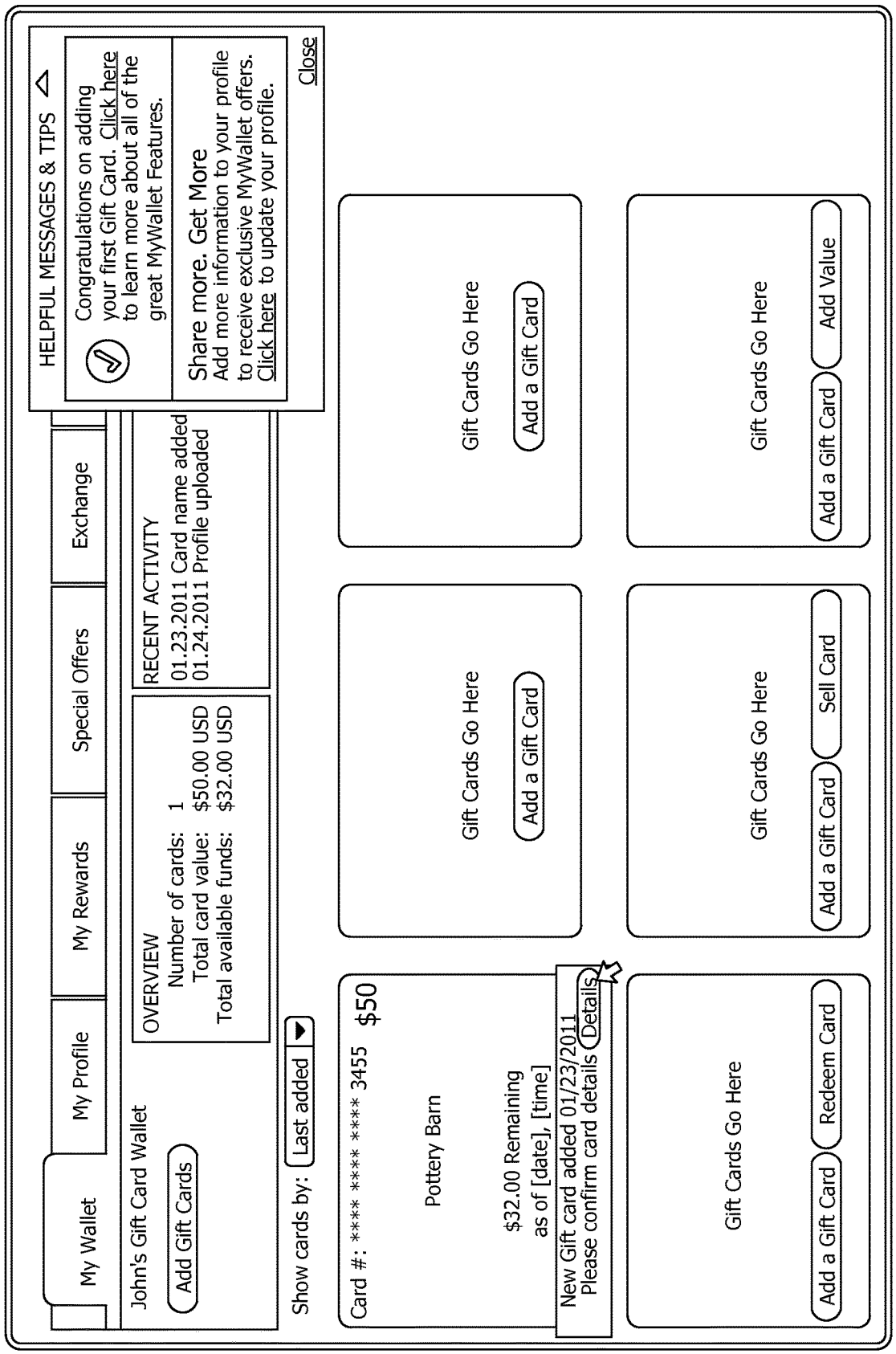

As shown in FIG. 9C, a user is provided many options for managing an e-wallet and its contents. For example, as shown, a user may review the specific details associated with the electronic value tokens (depicted as gift cards in FIG. 9C) present in the e-wallet and/or sub-wallet. Moreover, the user could request that the electronic value tokens be presented as: (i) "Last added" (as shown in FIG. 9C); (ii) as contained in various "Sub-wallets" (sub-wallets could be categorized or nicknamed, such as "Dining," "Home Improvement," "Debit," "Credit," "Loyalty," etc.); (iii) as in highest to lowest remaining value; or (iv) as ranked in regards to preference for use.

As is also shown in FIG. 9C, the user has the ability to "Add a Gift Card," "Add Value," "Redeem Card," and "Sell Card."

The "Add a Gift Card" functionality enables a user to place an electronic value token into the e-wallet. The "Add a Gift Card" selection provides at least two different methods for the user to add an electronic value token to the e-wallet. First, an electronic value token representing a physical card possessed by the user may be added to the e-wallet. As described in reference to FIG. 9B, by selecting "Add a Gift Card" and the subsequent manner of such addition, the screen display of FIG. 9B may be presented to the user. Accordingly, the user may add a "gift card" to the e-wallet by inputting the gift card's brand, card number, expiration date, CVV2 code, and card nickname and selecting the "Add Gift Card to MyWallet" button on the screen. Alternatively, the user may have access to a card reader (e.g., mag stripe reader and/or bar code reader), such as a device attached to a user's computer, personal digital assistant or smart phone, and utilize such device to read information from a physical card, in conjunction with the user's computer, personal digital assistant or smart phone, to enter the card's information into the e-wallet system for conversion into an electronic value token. Second, an electronic value token representing a physical card not already possessed by the user may be added to the e-wallet. In such an embodiment, when the user selects this option, the user may be presented a display screen informing the user of all the different types and value amounts of electronic value tokens that are available for purchase. The availability of electronic value tokens for purchase can be ascribed to the e-wallet system's (e.g., the electronic value token transaction processing system's 100) relationships with card issuers, merchants, vendors, and/or processors (e.g., a GiftCard Mall web-based application as provided by BlackHawk Network which provides users with the ability to select from a variety of different types of gift cards (and varying denominations) and have the cards selected delivered to the user (or to a user's identified recipient) in either tangible form (via mail or other courier) or delivered electronically (e.g., via the electronic value token transaction processing system)) or may be ascribed to the e-wallet system's (e.g., the electronic value token transaction processing system's 100) ability to access an electronic value token exchange program 2000, as will be described more fully below.

The "Add Value" functionality enables a user to select an electronic value token and increase the value of said token. Such "reloading," "topping off," or "recharging" of an electronic value token may be performed as is described in International Application Serial No. PCT/US11/40055, which is incorporated by reference in its entirety. For example, when the e-wallet user desires to reload/recharge/top off a telecom-related electronic value token residing in the e-wallet, the user can select "Add Value" on the display screen which will prompt the system to transmit the reload/recharge/top-up request to the electronic value token computer 150.

In a first embodiment of the reload/recharge/top-up scenario, the electronic value token computer 150 approves the request if the telecom-related electronic value token is activated and associated with a phone number. The electronic value token computer 150 determines the telecom account associated with the phone number and adds the requested reload/recharge/top-up amount to the account. The electronic value token computer 150 sends a response to the request (e.g., indicating that the reload/recharge/top-up amount has been added to the associated account). The electronic value token computer 150 transmits a reload/recharge/top-up transaction request to the phone number's associated telecom carrier. Upon receiving approval of the reload/recharge/top-up transaction request from the telecom carrier, the electronic value token computer 150 modifies the value of the telecom-related electronic value token to reflect the reload/recharge/top-up amount. The electronic value token computer 150 will cause the display accessed by the user to reflect the modification of the electronic value token's value, or if the reload/recharge/top-up transaction request was not approved, the electronic value token computer 150 will cause the display to inform the user as to that result. While the "Add Value" functionality has been described in relation to telecom-related electronic value tokens, the "Add Value" functionality is equally applicable and functionable for reloading/recharging/topping-up electronic value tokens associated with debit cards, prepaid services cards, gift cards, etc.

The "Redeem Card" functionality enables a user to select an electronic value token and use that token to satisfy a purchase, or other transaction. In the "Redeem Card" scenario, if the whole value of the electronic value token is not used in the redemption transaction, the system will modify/reduce the remaining value of the token and cause the display to inform the user of the "new" reduced value of the token, while also informing all interested parties as to the redemption transaction and recording and adjusting any pertinent logs accordingly. Alternatively, when an e-wallet is used in a point of sale-type of transaction context, rather than the above described e-wallet management context, the "Redeem Card" functionality may be automatically invoked via transactional information conveyed from a point of sale and thus, the can be based on predetermined rules.

The "Sell Card" functionality enables a user to select an electronic value token to monetize via offering the card for sale to (i) another e-wallet user, (ii) the e-wallet (or sub-wallet) system provider, or (iii) an electronic value token exchange program 2000 (as more fully described herein). In the "Sell Card" scenario, a user will inform the e-wallet system as to the electronic value token it desires to sell, select the forum for such sale from a list of available forums, instruct the system as to how the proceeds from the sale should be remitted to the e-wallet (e.g., in the form of e-wallet system branded electronic value token, value added to other selected electronic value token(s), and/or delivery of a hard/tangible form of receipt that the user may present for tender, (e.g., chit, coupon, check, or combination thereof)) and, if applicable, instruct the system as to a threshold value for the sale of the electronic value token that the user is not willing to go below e.g., set a reserve price. The system will execute the desired sale transaction, and cause the display to inform the user of the results of the sale of the electronic value token, while also informing all interested parties as to the sale transaction and recording and adjusting any pertinent logs accordingly.

As is further shown in FIG. 9C, a user may choose to manage "My Rewards" which would bring up a screen showing the user options available due to the user's receipt of loyalty or other types of rewards for using the e-wallet and/or electronic value tokens. The user may also select "Special Offers" which would bring up a screen showing the user any promotional-type offerings available to the user via the e-wallet. The user may also select "Exchange" which would bring up a screen showing the user options available for electronic value token exchange via the e-wallet.

In similar fashion as described in reference to the above available e-wallet management abilities and functionalities, a kiosk 189 may be coupled to the electronic value token transaction computer 150 in at least one embodiment and function as a user's interface with an e-wallet transaction system to allow the user to access e-wallet management functionalities.

The kiosk 189 may be placed in a high-traffic area such as a shopping mall, and may perform any electronic wallet management function. For example, users may create, delete, and alter their electronic wallets or sub-wallets. Users may also check the balances of electronic value tokens residing in the e-wallet, add, remove, reload, recharge, print, and exchange value tokens in their electronic wallets or sub-wallets. The kiosk 189 may mirror transactions available through an electronic wallet management website in at least one embodiment, or the functionality of an e-wallet enabled personal digital assistant and/or smart phone. Users may employ a print-on-demand function with their value tokens if a particular retailer does not accept electronic wallet transactions. For example, a user may select a value token to print, and a printer connected to the kiosk 189 will print a physical representation of the selected value token, for example a receipt having a scannable bar code linked to the electronic value token. The physical representation may be a gift card with a magnetic stripe, a paper receipt or coupon with a barcode or matrix code (e.g., QR code), and the like. In an embodiment, kiosk 189 may print a physical card, for example for an additional printing fee. The user may also provision and/or partition (e.g., create sub-wallets) an electronic wallet using the kiosk 189. For example, after authentication of the user and identification of the electronic wallet associated with the user, the user may insert the user's physical stored value cards into the kiosk 189, for example a machine operated kiosk similar to an automatic teller machine or alternatively a manned kiosk having appropriate card readers and the like. The kiosk 189 may convert the physical stored value cards into electronic value tokens in the user's electronic wallet. Afterwards, the physical stored value card may be retained or destroyed by the kiosk 189 or returned to the user. In one embodiment, the physical stored value card is not usable by the user after the conversion. In another embodiment, the user may have the option to use the electronic value token or the physical stored value card. In other words, both will be "active" and available for use. The user may also purchase value tokens to provision a wallet directly from the kiosk 189.

In at least one embodiment, a user is associated with multiple electronic wallets. In order to identify one wallet out of multiple wallets associated with a user, each of the multiple wallets is associated with a unique wallet identification ("ID"). A database or lookup table, for example, may be used to access wallet identifications. In at least one embodiment, the wallet ID is customizable by the user.

As referenced with respect to both the primary e-wallet and sub-wallet embodiments described above, the disclosed e-wallet and sub-wallet methods and systems provide users with the ability to add value to electronic value tokens residing in an e-wallet and/or sub-wallet. In an embodiment, similar value-added capabilities and functionalities of the instantly described electronic value token transaction processing system 100 are detailed and described in International Application Serial No. PCT/US11/20570, which is incorporated by reference in its entirety, such similar value-added capabilities and functionalities may be adapted from the context described in International Application Serial No. PCT/US11/20570 to be applied in the instant e-wallet/electronic value token context.

Customers may be offered incentives to purchase and/or redeem a value token(s) via value differentiation between the purchase and redemption values of said value token(s).

In an embodiment, a value token with a face value of $25 may be purchased by a customer for $25, but the electronic value token may be added to the electronic wallet in the amount of $30–the $25 purchase price plus an additional $5 added as an incentive to purchase the electronic value token. Alternatively, rather than adding cash value to the electronic value token, the electronic value token may be encoded with a redemption coupon code for a specific product or service. For example, a $15 value token to a coffee house may have an electronic redemption coupon code for a free shot of the customer's syrup of choice to be added to any coffee purchased at the coffee house. The free shot of syrup may be redeemed in connection with redeeming a portion, or all, of the electronic value token amount or the free shot of syrup may be redeemed separately.

In another embodiment, a value token vendor is able to offer customers incentives to redeem a value token by adding value in addition to the value of the electronic value token at the time the customer redeems the electronic value token. For example, a merchant could run a promotion in which it offers customers an additional $5 credit when the customer uses a value token for a purchase at one of the merchant's retail stores during a specified period of time.

As noted above, the electronic value token transaction computer 150 communicates with the datastore 180 and/or the issuers' authorization systems 160. The electronic value token transaction computer 150 may compare one or more of the card identification, the terminal identification, vendor identification, and the time and date of the activation request contained within the transaction request to data contained in the datastore 180 to determine whether the electronic value token to be added/redeemed is eligible for a value added award. For example, a vendor may run a promotion to encourage customers to purchase a value token, wherein value tokens purchased within a specified period of time may be purchased for a price less than the value designated by the electronic value tokens description or metadata. Thus, a customer could purchase a $25 value token for some amount less than $25, e.g., $20. In either of the above examples, the value differentiators, e.g., bonus added to a redemption value of a value token and reduction of purchase price for a designated value of a value token, may be applicable to bundled value token packages and the value differentiators distributed amongst and/or across the electronic value tokens, either equally or disproportionately. Similarly, retailers can collaborate for cross-promotions by honoring other retailer's value tokens in full, in part, or for specific products or promotions. By selecting to use an electronic wallet at the point of sale, the user may even receive the benefits of promotions of which the user was unaware. Furthermore, by configuring the rules, the user can be assured of getting the best promotions at various retailers without comparison shopping. As such, retailers can implement and change promotions at a rapid pace and cross-promote with other retailers on a daily or even hourly basis without spending advertising resources to make sure that the user is aware of the promotion and without requiring the user to perform the legwork involved in traditional redemption models such as cutting coupons, inputting various promotional codes, and the like. Moreover, retailers can finely tune promotions to various market segments in order to strengthen relationships by providing for the segment's particular needs.

The message modification unit 154 modifies the messages 106 and 110 to add value added information into the messages. For example, if it is determined by the value added determination unit 153 that a value token to be added is eligible for a value added bonus, the message 106 received from the point of sale device 111 is modified by the message modification unit 154 to include the determined value added bonus and is then forwarded as message 109 to the appropriate issuers' authorization system 160 for authorizing the request for the amount specified in the activation request plus the value added bonus. As another example, if it is determined that the electronic value token is eligible to be purchased at a discount, the message 106 received from the point of sale device 111 is modified by the message modification unit 154 (and forwarded as message 109) to indicate to the appropriate issuers' authorization system 160 that the electronic value token will be added to the electronic wallet for one amount, but that the customer will be charged a lesser amount reflecting the discount associated with the electronic value token.

In an embodiment, the message modification unit 154 also modifies messages 110 from the issuers' authorization systems 160 intended for the point of sale device 111 to include any information regarding value added to the electronic value token that may be printed on the receipt generated for the customer as well as information that may be presented to a cashier on a terminal 101 or 104 that the cashier may communicate to the customer, and such modified messages are forwarded as messages 107 to the point of sale device 111.

As referenced with respect to both the primary e-wallet and sub-wallet embodiments described above, the disclosed e-wallet and sub-wallet methods and systems provide users with the ability to exchange an electronic value token residing in the user's e-wallet or sub-wallet with/for an electronic value token not presently residing in the user's e-wallet or sub-wallet, but made available via the e-wallet's or sub-wallet's transaction system(s).

The electronic value token computer's 150 owner and/or operator may earn revenue via arbitrage-type activities. That is, electronic value token computer's 150 owner and/or operator may keep the difference in going rates between two electronic value tokens, e.g., a first electronic value token being traded/exchanged and a second electronic value token being desired/obtained. In at least one embodiment, the electronic value token transaction computer 150 may charge the user transaction fee for the exchange instead. The transaction fee may be flat or based on the size of the exchange.

The electronic value token transaction computer 150 may also charge either or both of the issuers and/or retailers associated with the exchange a flat transaction fee or one based on the amount of the exchange. These fees may be minimal but generated in high volume. All parties may benefit because the user is receiving value tokens the user will use in exchange for value tokens the user would not use. Moreover, one issuer and/or retailer is eliminating the debt or inventory liability associated with the exchanged value token, thus freeing up capital for other uses. Also, the other issuer and/or retailer may be gaining a customer, retaining a loyal customer, or increasing revenue if the customer spends more than the amount of the electronic value token.

As referenced with respect to both the primary e-wallet and sub-wallet embodiments described above, the disclosed e-wallet and sub-wallet methods and systems provide users with the ability to exchange electronic value tokens located in e-wallets and/or sub-wallets for other electronic value tokens not located in said e-wallets or sub-wallets. Such value token exchange may be initiated (1) by an e-wallet user (i) at a point of sale, (ii) at a kiosk, (iii) via a user's personal digital assistant or smart phone, (iv) via web access to the user's e-wallet, (v) or any other method of accessing the user's e-wallet; or (2) by an application of an e-wallet rule by an e-wallet processing system, wherein the rule is established by (i) the e-wallet user, (ii) the e-wallet provider, (iii) or a combination thereof.

In at least one embodiment, exchanging a first value token associated with a first retailer located in the e-wallet for a second value token associated with a second retailer not located in the e-wallet requires an exchange rate be applied. This exchange rate may be applied against the value of the second value token being sought in the exchange, thus reducing the face value of the second value token is relation to the value of the first value token for which it is exchanged or the exchange rate may be applied against some other valued asset located in the e-wallet (as prescribed by any pertinent rules or directives). The exchange rate may be realized by the e-wallet processing system and/or shared with designated vendors, merchants, and issuers.

The exchange rate may established via an ongoing valuation program operated by the e-wallet processing system or affiliated entity comprising the tracking of the use of and interest in electronic value tokens, gift cards (or other similar instruments), the acquisition of such electronic value tokens, gift cards (or other similar instruments) from other e-wallet users or other sources, and the establishment of dynamically varying values for all such electronic value tokens and gift card-type instruments available to the e-wallet processing system for incorporation into an electronic value token exchange program.

Figure 9D:
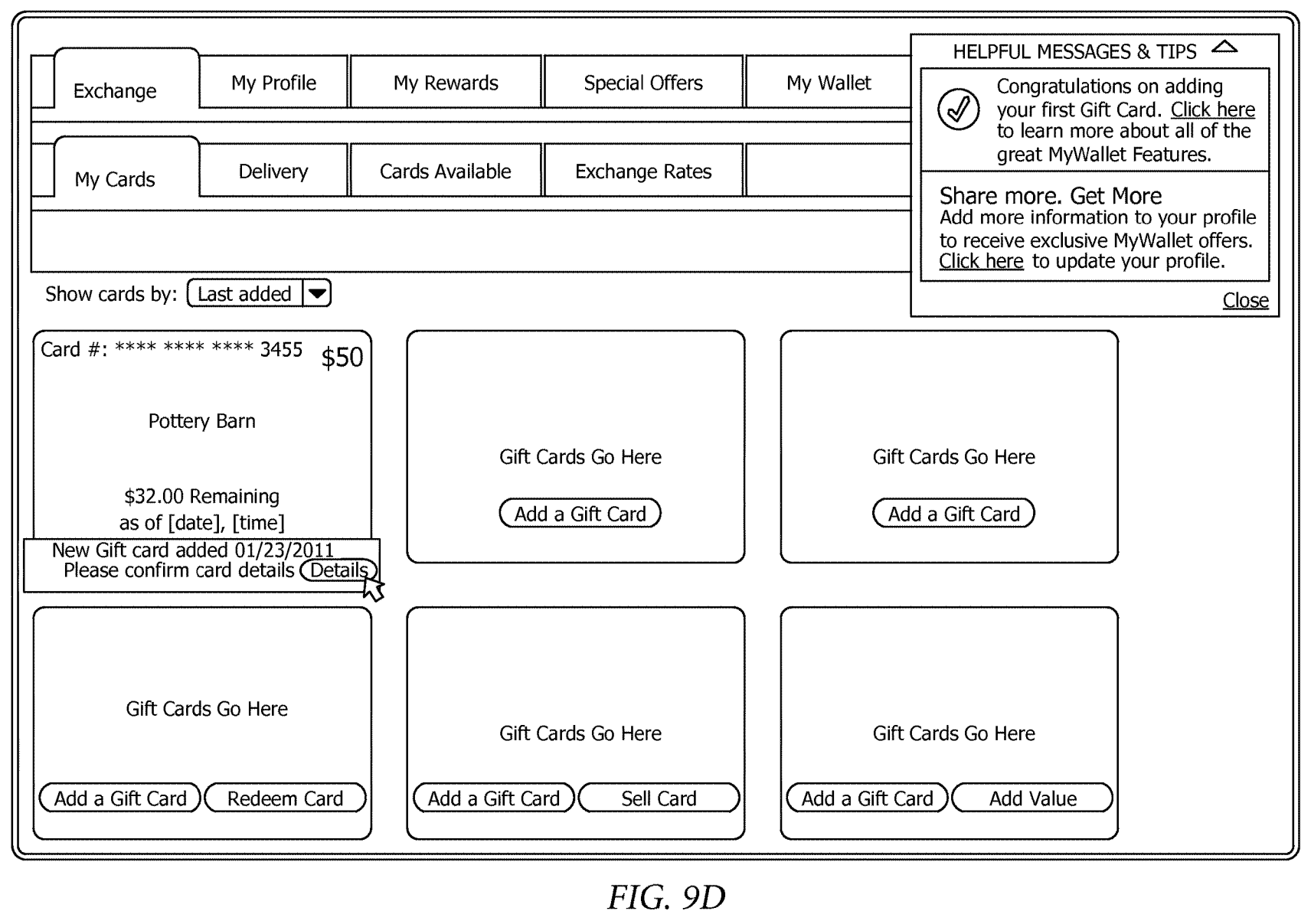

The above-described electronic value token exchange program may be exemplified by the following discussion. An e-wallet user can approach an e-wallet associated kiosk 189 at Retailer A's establishment. The e-wallet user interfaces with the kiosk 189 and provides the kiosk with e-wallet identifying information (e.g., as described in Table 1 herein "accountid"). The provision of identifying information may be made via manual input by the kiosk's user or may be made automatically via communication between the e-wallet user's personal digital assistant (or proxy card 200) and the kiosk 189. The e-wallet user may then use the kiosk 189 to access the e-wallet's electronic value token exchange program and the kiosk 189 may be further used to facilitate and complete any requested electronic value token exchange. In an embodiment, the e-wallet user may wish to exchange an electronic value token issued and/or accepted by Retailer B contained in the user's e-wallet (or a sub-wallet thereof) for an electronic value token issued and/or accepted by Retailer A. The e-wallet user interfacing with kiosk 189 can result in the e-wallet user being presented with a screen display such as is depicted in FIG. 9C. Besides providing the e-wallet user with the ability to review the contents of the e-wallet, the display allows the e-wallet user to select an "Exchange" tab from the available functionalities. The "Exchange" tab will then present the e-wallet user with the options available for electronic value token exchange. As depicted in FIG. 9D, such options can comprise: (1) view a selection of electronic value token(s) available for acquisition; (2) view the selection of electronic value token(s) presently residing in e-wallet; (3) view the various exchange rates for the identified electronic value token(s) for acquisition as calculated in view of the electronic value tokens selected for removal (exchange) from the e-wallet (exchange rates may vary based on types/retailers of electronic value tokens selected for exchange); (4) view options for satisfying exchange rate (e.g., (i) reduction in value of electronic value token selected for acquisition to meet the exchange rate or (ii) application of the amount of the exchange rate to some other asset residing in the e-wallet such as a credit card value token or a debit card value token); (5) view a selection of options for delivery of the electronic value token selected for acquisition such as (i) delivery into the e-wallet (or sub-wallet), (ii) delivery via email, SMS, social media, or other electronic method to a personal digital assistant or computer, (iii) print out of a tangible version of the electronic value token (e.g., via print on receipt-type capability as described in U.S. patent application Ser. No. 12/719,741 which is incorporated by reference in its entirety) at the kiosk or other user-selected print device. The user may make its desired selections in response to the information provided in each of the above-describe screens, as each of the described screen view options include functionality allowing for selection of the displayed options. In this example, the user selects that the Retailer B $25.00 electronic value token residing in the e-wallet is to be exchanged for a Retailer A electronic value token. As a result, the electronic value token exchange program prompts the kiosk 189 to display that the requested exchange will result in the user acquiring a Retailer A electronic value token in the amount of $24.75 if the user selects that the exchange rate be applied against the value of the Retailer A electronic value token (the exchange rate will vary from transaction to transaction, the exchange rate could be any value, e.g., $0.001 to $10.00, or any values below, within, or above this range). The user makes such selection. The electronic value token exchange program prompts the kiosk 189 to display the available delivery methods and the user selects delivery into the e-wallet. The electronic value token exchange program prompts the kiosk 189 to display another screen similar to FIG. 9C, but indicating that the e-wallet now contains a Retailer A electronic value token in the amount of $24.75.

As a result of the above "Exchange" transaction, the e-wallet user received its desired Retailer A electronic value token and the electronic value token exchange program received a Retailer B $25.00 electronic value token. As part of the above-described transaction, the electronic value token exchange program contacted the electronic value token issuing entity of Retailer A electronic value tokens (e.g., in an embodiment issuing entity of Retailer A electronic value tokens could be the electronic value token exchange program 2000) and requested a Retailer A $24.75 electronic value token be provided to meet the e-wallet user's request; alternatively, the electronic value token exchange program modified a Retailer A electronic value token it already controlled, e.g., modified a Retailer A $25.00 electronic value token to only be worth $24.75 and informed the issuing entity of Retailer A electronic value tokens that it could reduce its liability associated with said card by $0.25. Further, the electronic value token exchange program 2000 will contact the Retailer B electronic value token issuer and provide the issuer with the appropriate Retailer B $25.00 electronic value token identification so that the issuer can remove that Retailer B $25.00 electronic value token from its list of liabilities. Thus, as an end result, the electronic value token exchange program's activities have resulted in a $0.25 value (the exchange rate, i.e., difference in value of electronic value token acquired by requesting user and electronic value token surrendered by requesting user as part of the exchange) that may be allocated to interested parties per established contractual obligations.

In an alternative scenario, if the e-wallet requesting user selects the exchange rate to be satisfied by another asset residing in the e-wallet or sub-wallet, such as a credit card electronic value token or a debit card electronic value token, the e-wallet user would be provided with a $25.00 Retailer A electronic value token matching the $25.00 Retailer A electronic value token surrendered in the transaction and the exchange rate of $0.25 would be realized from charging against the credit card electronic value token or debiting against the debit card electronic value token. Such actions would be transacted with communications between the electronic value token exchange program and the credit card electronic value token or the debit card electronic value token requesting that the $0.25 exchange rate value be paid to the electronic value token exchange program. Thus, again as an end result, the electronic value token exchange program's activities would have resulted in a $0.25 value (the exchange rate) that may be allocated to interested parties per established contractual obligations.

The above-described electronic value token exchange transaction (or any described variation thereof), although described in the kiosk 189 context, could also be performed at point of sale, via a personal digital assistant with e-wallet functionality, or via a computer with access the user's e-wallet.

In an alternative electronic value token exchange embodiment, as discussed previously, the e-wallet may automatically direct electronic value token exchange activities. For example, the e-wallet user may manage the e-wallet so that upon the occasion when the user presents the e-wallet to satisfy a transaction at retail establishment, e.g., Retailer Q, and the e-wallet contains no Retailer Q branded electronic value tokens, the e-wallet will automatically, and in real time, initiate an electronic value token exchange process wherein the e-wallet communicates a request for electronic value token exchange to the electronic value token transaction computer 150. In this example, the e-wallet user has managed the e-wallet so that all electronic value tokens associated with prepaid services (gift card-type electronic value tokens) are located in a designated sub-wallet and each of said electronic value tokens were placed/ordered/designated in the sub-wallet via a preferential ranking system, e.g., most preferred electronic value token or token type (e.g., #1) to least preferred electronic value token or token type (e.g., #22, if there are 22 types of electronic value tokens in the sub-wallet. For example, Retailer M branded electronic value tokens may be designated as most preferred and Retailer L branded electronic value tokens may be designated as least preferred. Further in the example, the e-wallet also has been provided with rules by the user that directs the e-wallet, in circumstances wherein the e-wallet has been presented to facilitate a transaction at a retailer in which the e-wallet contains none of said retailer's electronic value tokens (the e-wallet will recognize the retailer based on information exchanged between the e-wallet and the retailer's communication devices at the onset of the original transaction), such as the Retailer Q scenario described above, the e-wallet rules direct the e-wallet to initiate an electronic value token exchange request and to include in said request the exchange of the least preferred electronic value token residing in the e-wallet, i.e., the Retailer L branded electronic value token (#22) and if necessary preferred electronic value token #21, #20, etc., for a Retailer Q electronic value token in an amount sufficient to meet the original transaction's amount. The electronic value token transaction computer 150, upon receipt of the electronic value token exchange request, communicates with an electronic value token exchange program 2000, e.g., an electronic value token distributor, (which is part of the overall electronic value token transaction processing system 100) to effectuate the requested electronic value token exchange. The requested electronic value token exchange is performed, the e-wallet receives the requested Retailer Q branded electronic value token, which is coincidentally used in conducting the original transaction, and the e-wallet surrenders (or makes unavailable for use and only available for modification) the Retailer L branded electronic value token to the electronic value token transaction computer 150, which in this case was actually valued in excess of the requested Retailer Q branded electronic value token. As such, the electronic value token transaction computer 150, modifies the value of the Retailer L branded electronic value token (either internally or via communication with the Retailer L branded electronic value token's issuing system) to reflect the value reduction based on the provided Retailer Q branded electronic value token, extracts the exchange rate for the exchange of the Retailer Q branded electronic value token for the Retailer L branded electronic value token (as will be discussed more fully herein), communicates the transactional information to all interested parties, and returns (or makes available again) the value-modified Retailer L branded value token to the user's e-wallet.

In an alternate embodiment, the e-wallet's electronic value token exchange rules could have provided that the e-wallet query the electronic value token transaction computer 150 regarding the best available exchange rate for the electronic value tokens residing in the e-wallet and make the exchange based on the best exchange rate rather than the ranking of the electronic value tokens. Further the e-wallet user may subjectively determine which electronic token(s) should be exchanged to satisfy a transaction.

In an embodiment, the electronic token exchange program 2000 may survey a user's e-wallets and sub-wallets maintained by the electronic value token transaction computer 150 and make the e-wallet user an offer(s) for electronic value token exchange(s). For example, the electronic token exchange program 2000, as part of the survey may determine, based on (i) the history of the e-wallet's use; (ii) the length of time an unused electronic value token has resided in an e-wallet; (iii) the demand for certain electronic value tokens in the marketplace; (iv) dates for spoilage of electronic value tokens; (v) promotional offers for acquiring electronic value tokens; and (vi) combinations thereof, to offer an e-wallet user to exchange an electronic value token(s) presently residing in the user's e-wallet/sub-wallet for an electronic value token(s) not presently residing in the user's e-wallet/sub-wallet. In an embodiment, the electronic token exchange program 2000 may supplement the offer for exchange with a value added/bonus incentive as described previously herein. In another embodiment, the offer may include an option for the user to place a portion of the exchange value amount into a savings wallet, as will be more fully below.

As referenced with respect to both the primary e-wallet and sub-wallet embodiments described above, the disclosed e-wallet and sub-wallet methods and systems provide users with the ability to designate the locations of value tokens residing in an e-wallet or sub-wallet, as well as rules prescribing the use and/or availability of said e-wallet and/or sub-wallet. As also described herein, electronic value token(s) may be removed from a sub-wallet configured to allow redemption activities (hereinafter "fully-redeemable" designated e-wallet or sub-wallet) and placed into a sub-wallet configured for savings activities with limited redemption possibilities (hereinafter "savings" designated e-wallet or sub-wallet). In fact, the instant system provides for electronic value token(s) to be placed into a "savings" designated e-wallet or sub-wallet at the time the electronic value token is made available to the e-wallet or sub-wallet.

In an embodiment, electronic value tokens may be designated for and/or placed in certain e-wallets and/or sub-wallets which have rules providing that the e-wallets or sub-wallets are to be used for savings activities and thus are not readily available for general access or for redemption/exchange activities. In an embodiment, similar savings capabilities, functionalities, requirements, and limitations of the instantly described electronic value token transaction processing system 100 are detailed and described in International Application Serial No. PCT/US11/49338 which is incorporated by reference in its entirety, such similar savings capabilities, functionalities, requirements, and limitations may be adapted from the context described in International Application Serial No. PCT/US11/49338 to be applied in the instant e-wallet/electronic value token context.

At least in some embodiments, allows a user to easily redistribute electronic value tokens (e.g., debit card-related electronic value tokens) from a "fully-redeemable" designated e-wallet or sub-wallet to a "savings" designated e-wallet or sub-wallet, and vice versa. The user may be limited by law to a given number of, e.g., six, transfers out of the "savings" designated e-wallet or sub-wallet to the "fully-redeemable" designated e-wallet or sub-wallet per calendar month. The user may designate one-time transfers through the e-wallet system's website, IVR, personal digital assistant or smart phone, or with a customer service representative. The user may also establish and automated transfers between the "fully-redeemable" designated e-wallet or sub-wallet and the "savings" designated e-wallet or sub-wallet. To encourage savings, users may be presented with option to automatically fund the "savings" designated e-wallet or sub-wallet from the "fully-redeemable" designated e-wallet or sub-wallet that may be triggered by various transaction events, including: (a) upon receiving a direct deposit, (b) when a reload/recharge/topping up transaction occurs, and/or (c) at a designated time interval (e.g., recurring weekly or monthly). The user can elect all, some, or none of the options available. Moreover, the above events may be transacted regardless of the "fully-redeemable" designated or "savings" designated e-wallet or sub-wallet's current balance. The user may have the ability to select an amount or percent of electronic value tokens loaded onto "fully-redeemable" designated e-wallet or sub-wallet. Where the user chooses a time interval for automatic transfers, the user may be able to select a preferred date. The user would have the flexibility to update, edit, or otherwise change the automatic funding option at any time. Any negative "fully-redeemable" designated e-wallet or sub-wallet may need to be cured prior to initiating any automatic or one-time transfers to "savings" designated e-wallet or sub-wallet. If an automatic transfer cannot be fully funded or cannot be funded at all, any amounts available will be taken from the "fully-redeemable" designated e-wallet or sub-wallet to the "savings" designated e-wallet or sub-wallet and a notification will be provided to the e-wallet user describing the transaction. Automatic transfers will continue thereafter for the designated transfer option and amount.

The electronic value token transaction computer 150 above may be implemented on any particular machine with sufficient processing power, memory resources, and network throughput capability to handle the necessary workload placed upon it.

Figure 8:
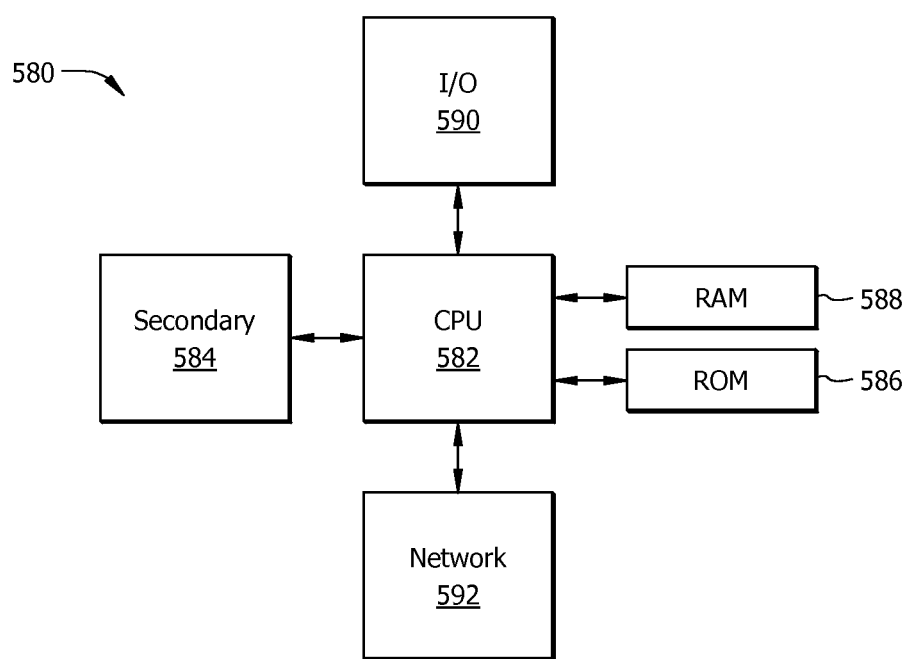
FIG. 8 illustrates a particular machine suitable for implementing the several embodiments of the disclosure.

All of, or a portion of, the system described above may be implemented on any particular machine (or machines), e.g., any particular electronic component (or electronic components), with sufficient processing power, memory resources, and throughput capability to handle the necessary workload placed upon the computer, or computers. FIG. 8 illustrates a computer system 580 suitable for implementing all, or a portion of, one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data structures in part by directly accessing the computer program product, for example by reading from a CD-ROM disk inserted into a disk drive peripheral of the computer system 580. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer 580 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed. There has been described herein an systems and methods for providing a security code of an electronic stored-value card such that users may purchase, redeem, and/or exchange value associated with the electronic stored-value card (e.g., electronic value tokens residing in an electronic wallet). It will be apparent to those skilled in the art that modifications may be made without departing from the spirit and scope of the disclosure. The embodiments described are representative only, and are not intended to be limiting. Many variations, combinations, and modifications of the applications disclosed herein are possible and are within the scope of the disclosure. Accordingly, the scope of protection is not limited by the description set out above, but is defined by the claims which follow, that scope including all equivalents of the subject matter of the claims.

What is claimed is:

1. A computer implemented secure proxy card transaction method comprising:
   receiving, by an electronic value token transaction computer, authentication information associated with a proxy card, wherein the proxy card is associated with an electronic wallet, wherein the associated proxy card secures access to the electronic wallet, and wherein the proxy card comprises a smart chip, wherein the smart chip is configured to receive payment information from the electronic wallet, send the payment information to a rewritable magnetic stripe via an interface, and wherein the interface is configured to write the payment information including an electronic wallet-generated virtual stored value number for the proxy card to the rewritable magnetic stripe;
   determining, by the electronic value token transaction computer, that the proxy card has been authenticated;

receiving, by the electronic value token transaction computer, the electronic wallet-generated virtual stored value number for the proxy card, wherein the virtual stored value number provides access to a payment instrument in the electronic wallet;

accessing, by the electronic value token transaction computer, the electronic wallet; and accessing, by the electronic value token transaction computer, the payment instrument for payment to complete a purchase transaction.

2. The method of claim 1, further comprising:
provisioning, by the electronic value token transaction computer, the electronic wallet with an electronic stored-value card.

3. The method of claim 1, wherein the electronic wallet comprises an electronic stored-value card.

4. The method of claim 3, further comprising permitting, by the electronic value token transaction computer, use of the electronic stored-value card as the payment instrument when the proxy card is presented at a point of sale.

5. The method of claim 1, further comprising: storing, by the electronic value token transaction computer, an association of the proxy card with the electronic wallet in a database.

6. The method of claim 1, wherein an association of the proxy card with the electronic wallet is retrieved to verify the proxy card presented at a point of sale is associated with the electronic wallet.

7. The method of claim 1, wherein the proxy card further comprises a barcode, a matrix code, a NFC chip, or combinations thereof.

8. The method of claim 7, wherein the authentication information is configured in response to user input and encoded on the rewritable magnetic stripe, the barcode, the matrix code, the NFC chip, or combinations thereof.

9. The method of claim 1, wherein the proxy card is associated with a plurality of electronic wallets.

10. The method of claim 1, wherein the proxy card is associated with a plurality of electronic stored value cards (eSVCs).

11. The method of claim 7, wherein the proxy card is a virtual proxy card (vPC).

12. The method of claim 1, further comprising: receiving, from a value token user, a request convert a representation of value into a value token, wherein the representation of value is associated with a specific purchasing activity, and wherein the representation of value comprises a code; receiving an indication of the specific purchasing activity; converting the representation of value into the value token; and providing, to the value token user, the value token.

13. A secure proxy card transaction system comprising:
a proxy card comprising authentication information, wherein the proxy card comprises a smart chip, wherein the smart chip is configured to receive payment information from the electronic wallet, send the payment information to a rewritable magnetic stripe via an interface, and wherein the interface is configured to write the payment information including an electronic wallet-generated virtual stored value number for the proxy card to the rewritable magnetic stripe;

the electronic wallet associated with the proxy card; and an electronic wallet-generated virtual stored value number for the proxy card, wherein the virtual stored value number enables access to a payment instrument in the electronic wallet for providing payment to complete a purchase transaction, and wherein the authentication information enables association of the proxy card with the electronic wallet and wherein the association of the electronic wallet with the proxy card secures access to the electronic wallet when the proxy card is presented at a point of sale.

14. The system of claim 13, wherein the electronic wallet comprises at least one electronic stored-value card.

15. The system of claim 13, further comprising a database, wherein an association of the proxy card with the electronic wallet is stored on the database.

16. The system of claim 14, wherein association of the electronic wallet with the proxy card and the electronic wallet-generated virtual stored value number allows use of the electronic stored-value card as a payment instrument when the proxy card is presented at the point of sale.

17. The system of claim 13, wherein the proxy card comprises a barcode, a NFC chip, or combinations thereof.

18. The system of claim 17, wherein the authentication information is encoded on the rewriteable magnetic stripe, the barcode, the NFC chip, or combinations thereof.

19. The system of claim 13, wherein the electronic wallet associated with the proxy card has consumer specified parameters for use and restriction of the proxy card.

20. A wallet redemption card comprising:
a rewriteable magnetic stripe;
a smart chip;
a wireless communicator operably connected to the smart chip; and
an interface operably connected between the rewriteable magnetic stripe and the smart chip;
wherein the smart chip is configured to receive payment information via the wireless communicator, wherein the smart chip comprises a memory, wherein the smart chip is configured to write the payment information to the memory, wherein the smart chip is configured to read the written payment information from the memory, wherein the smart chip is configured to erase the payment information from the memory; wherein the smart chip is configured to send the payment information to the rewriteable magnetic stripe via the interface, wherein the interface is configured to write the payment information to the rewriteable magnetic stripe.

* * * * *